(12) United States Patent
Sato et al.

(10) Patent No.: US 8,244,133 B2
(45) Date of Patent: Aug. 14, 2012

(54) OPTICAL WAVEBAND DEMULTIPLEXER, OPTICAL WAVEBAND MULTIPLEXER, AND OPTICAL WAVEBAND SELECTIVE SWITCH

(75) Inventors: Ken-ichi Sato, Nagoya (JP); Hiroshi Hasegawa, Nagoya (JP); Shoji Kakehashi, Nagoya (JP); Osamu Moriwaki, Musashino (JP); Shin Kamei, Musashino (JP); Kenya Suzuki, Musashino (JP); Yoshihisa Sakai, Musashino (JP); Kouichi Takiguchi, Musashino (JP)

(73) Assignees: National University Corporation, Nagoya (JP); Nippon Telegraph and Telephone Corporation, Tokyo (JP)

( * ) Notice: Subject to any disclaimer, the term of this patent is extended or adjusted under 35 U.S.C. 154(b) by 891 days.

(21) Appl. No.: 12/226,453

(22) PCT Filed: Apr. 18, 2007

(86) PCT No.: PCT/JP2007/058447
§ 371 (c)(1),
(2), (4) Date: Jan. 7, 2009

(87) PCT Pub. No.: WO2007/123157
PCT Pub. Date: Nov. 1, 2007

(65) Prior Publication Data
US 2009/0220234 A1    Sep. 3, 2009

(30) Foreign Application Priority Data

Apr. 20, 2006  (JP) .................................. 2006-117283
Sep. 4, 2006   (JP) .................................. 2006-239633

(51) Int. Cl.
*H04J 14/02*    (2006.01)
*H04J 14/00*    (2006.01)
*G02B 6/34*     (2006.01)

(52) U.S. Cl. ................. 398/82; 398/45; 398/49; 398/50; 398/79; 398/84; 398/85; 398/87; 385/24; 385/37

(58) Field of Classification Search .................... 398/45, 398/48–50, 55, 56, 77, 79, 177, 82–85, 87; 385/15, 24, 37, 46
See application file for complete search history.

(56) References Cited

U.S. PATENT DOCUMENTS 5,452,116 A * 9/1995 Kirkby et al. ................... 398/79
(Continued)

FOREIGN PATENT DOCUMENTS
JP    A-7-248509    9/1995
(Continued)

OTHER PUBLICATIONS

Ockenfuss et al.; "Ultra-low stress coating process: an enabling technology for extreme performance thin film interference filters;" OFC Postdeadline Papers; 2002; pp. FA8-1-FA8-3.
(Continued)

*Primary Examiner* — Loha Ben
(74) *Attorney, Agent, or Firm* — Oliff & Berridge, PLC

(57) ABSTRACT

A simple optical waveband multiplexer/demultiplexer operable to separate a wavelength-division multiplexed light beam WDM consisting of a plurality of wavebands WB each including a plurality of optical channels, into a predetermined plurality of wavebands WB, and output the separated plurality of wavebands WB from a plurality of output ports, wherein the wavelength-division multiplexed light beam WDM is transmitted through two array waveguides each capable of performing a demultiplexing function with a resolution corresponding to wavelengths of the optical channels, and a characteristic of sequentially shifting the output ports by one position with shifting of input ports by one position, whereby the wavelength-division multiplexed light beam WDM is separated into a plurality of wavebands WB each including the mutually different optical channels selected from the optical channels included in the wavelength-division multiplexed light beam WDM, and the separated wavebands WB are outputted from the plurality of output ports, respectively.

64 Claims, 28 Drawing Sheets

U.S. PATENT DOCUMENTS

| | | | |
|---|---|---|---|
| 6,278,813 B1 * | 8/2001 | Takada et al. | 385/24 |
| 6,400,864 B1 * | 6/2002 | Lee | 385/24 |
| 6,415,071 B1 * | 7/2002 | Saito et al. | 385/24 |
| 6,768,827 B2 * | 7/2004 | Yoo | 385/14 |
| 6,788,848 B2 * | 9/2004 | Yoneda | 385/37 |
| 6,792,208 B1 * | 9/2004 | Mukherjee et al. | 398/52 |
| 6,836,591 B2 * | 12/2004 | Kashihara et al. | 385/37 |
| 7,139,455 B1 * | 11/2006 | Gunn et al. | 385/37 |
| 7,340,175 B2 * | 3/2008 | Wang et al. | 398/82 |
| 7,505,686 B2 * | 3/2009 | Jennen | 398/49 |

FOREIGN PATENT DOCUMENTS

| | | |
|---|---|---|
| JP | A-8-46569 | 2/1996 |
| JP | A-8-162836 | 6/1996 |
| JP | A-11-30730 | 2/1999 |
| JP | A-2001-337235 | 12/2001 |
| JP | A-2003-195071 | 7/2003 |
| JP | A-2006-11345 | 1/2006 |
| JP | A-2006-217079 | 8/2006 |

OTHER PUBLICATIONS

Nakazawa et al.; "Recent Progress on AO Devices;" Thesis Journal of Society of Electronic Information and Communication; vol. J86-3; No. 12; pp. 1236-1243; Dec. 2003.

"Full-mesh Network Utilizing Cyclic Characteristic of Wavelength Response;" NTT R & D; vol. 49. No. 6; pp. 300-301; Jun. 2000.

Doerr et al.; "Integrated Band Demultiplexer Using Waveguide Grating Routers;" IEEE Photonics Technology Letters; vol. 15; No. 8; pp. 1088-1090; Aug. 2003.

Chandrasekhar et al.; "Flexible Waveband Optical Networking Without Guard Bands Using Novel 8-Skip-0 Banding Filters;" IEEE Photonics Technology Letters; vol. 17; No. 3; pp. 579-581; Mar. 2005.

Li et al.; "Multiwavelength integrated 2×2 optical cross-connect switch and lambda-partitioner with 2×N phased-array waveguide grating in self-loopback configuration;" OFC Technical Digest; Feb. 24, 1998.

Kakchashi et al.; "Waveband MUX/DEMUX Using Arrayed-Waveguide Gratings;" Department of Electrical Engineering and Computer Science, Nagoya University; 2007.

* cited by examiner

FIG.5
(a) WITHOUT CYCLIC CHARACTERISTIC OF WAVELENGTH RESPONSE
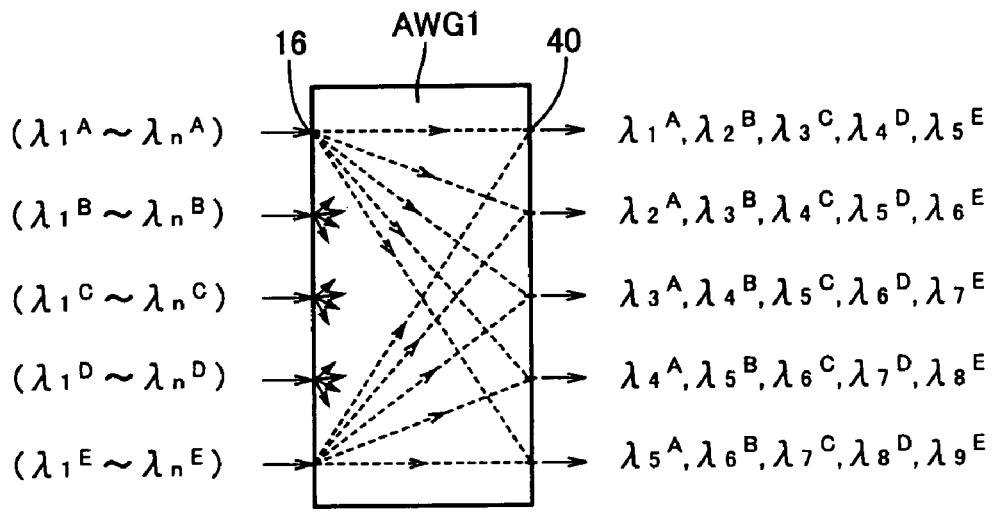
(b) WITH CYCLIC CHARACTERISTIC OF WAVELENGTH RESPONSE
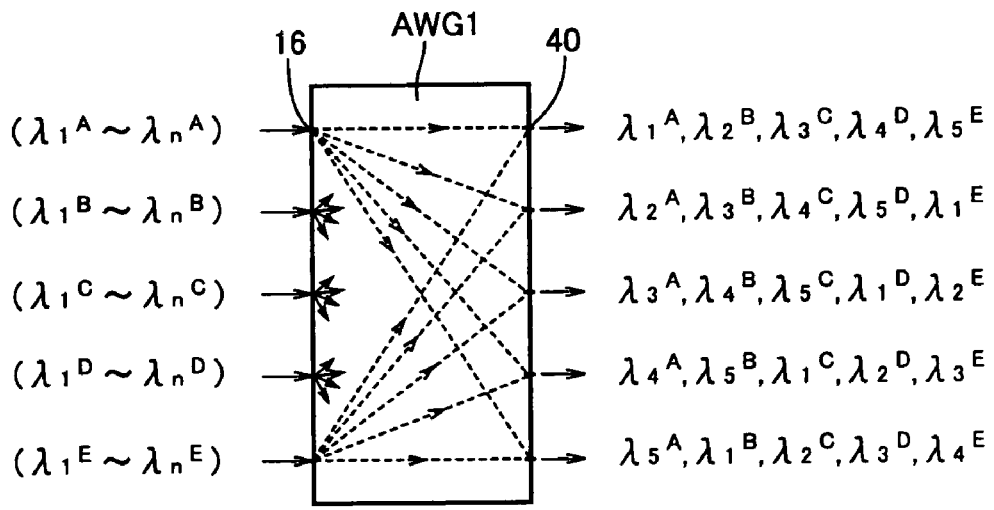

| α \ β | 1 | 2 | 3 | .... | N |
|---|---|---|---|---|---|
| 1 | $\lambda_1$ | $\lambda_2$ | $\lambda_3$ | .... | $\lambda_N$ |
| 2 | $\lambda_2$ | $\lambda_3$ | $\lambda_4$ | .... | $\lambda_{N+1}$ |
| 3 | $\lambda_3$ | $\lambda_4$ | $\lambda_5$ | .... | $\lambda_{N+2}$ |
| ⋮ | ⋮ | ⋮ | ⋮ | ⋱ | ⋮ |
| M | $\lambda_M$ | $\lambda_{M+1}$ | $\lambda_{M+2}$ | .... | $\lambda_{M+N-1}$ |

OPTICAL WAVEBAND DEMULTIPLEXER, OPTICAL WAVEBAND MULTIPLEXER, AND OPTICAL WAVEBAND SELECTIVE SWITCH

TECHNICAL FIELD

The present invention relates to an optical waveband multiplexer/demultiplexer operable to separate a wavelength-division multiplexed light beam consisting of a plurality of wavebands each including a plurality of optical channels, into a predetermined plurality of wavebands, and output the separated plurality of wavebands from a plurality of output ports, or to combine together a plurality of wavebands and output a wavelength-division multiplexed light beam consisting of the plurality of wavebands each including the optical channels, when the direction of optical propagation is reversed with respect to that for the separation of the multiplexed light beam, and also relates to an optical waveband selective switch operable to implement concurrent switching of wavebands (multiple wavelengths).

BACKGROUND ART

An optical network involves transmission of a wavelength-division multiplexed (WDM) light consisting of a plurality of wavelengths corresponding to a plurality of optical channels or light paths arranged at 100-GHz spacing, for example, over a predetermined optical bandwidth. At each node of the above-indicated optical network, optical signals of the wavelengths of the optical channels included in the wavelength-division multiplexed light beam and transmitted through optical fibers or the like are separated and multiplexed, and switched or routed into optical fibers for further transmission in a predetermined direction. Recently, the number of optical channels processed by an optical switching device at the above-indicated node has been increasing with an increase of a required capacity of a communication system, so that the communication system tends to utilize the wavelength-division multiplexed light beam consisting of a plurality of wavebands each including a plurality of optical channels.

In view of the above, there has been considered an optical network wherein each node is configured such that not only the optical channels of the optical signals are separated and multiplexed, and routed into the optical fibers for transmission in the predetermined direction, but also the wavebands of the optical signals are demultiplexed and multiplexed, and routed into the optical fibers for transmission in the predetermined direction. For demultiplexing and multiplexing the plurality of wavebands included in the wavelength-division multiplexed light beam, it has been a conventional practice to use a multi-layered thin-film interference filter type multiplexer/demultiplexer, an acoust-optic tunable filter (AOTF) type multiplexer/demultiplexer, etc., which are disclosed in non-patent Document 1, non-patent Document 2, non-patent Document 3, non-patent Document 4 and non-patent Document 5.

Non-Patent Document 1:
"Ultra-low stress coating process: an enabling technology for extreme performance thin film interference filters" OFC 2002 Postdeadline Papers, PA8-1

Non-Patent Document 2:
"Recent Progress on AO Devices" Thesis Journal of Society of Electronic Information and Communication, VOL. J86-C, pp. 298-308, Published in December, 2003

Non-Patent Document 3:
"Full-mesh Network Utilizing Cyclic Characteristic of Wavelength Response" NTT R & D VOL. 49 No. 6, pp 298-308, Published in June, 2000

Non-patent Document 4:
"Integrated Band Demultiplexer Using Waveguide Grating Routers" IEEE PHOTONICS TECHNOLOGY LETTERS, VOL. 15, NO. 8, AUGUST 2003

Non-Patent Document 5:
"Flexible Waveband Optical Networking Without Guard Bands Using Novel 8-Skip-0 Banding Filters" IEEE PHOTONICS TECHNOLOGY LETTERS, VOL. 17, NO. 3, MARCH 2005

Patent Document 1: JP-11-30730A
Patent Document 2: JP-2006-11345A

DISCLOSURE OF THE INVENTION

Object Achieved By The Invention

However, the conventional multiplexing/demultiplexing devices have the following drawbacks. Namely, the multi-layered thin interference filter type multiplexer/demultiplexer proposed in non-patent Document 1 has a complicated design and requires a large number of films for improving the sharpness of band edges, and are accordingly difficult to manufacture. In addition, this multiplexer/demultiplexer is difficult to exhibit desired characteristics. For instance, the multiplexer/demultiplexer configured as an 8-SKIP-0 band filter providing eight optical channels at 100-GHz spacing constituting each waveband (number of lost channels between the wavebands being zero) requires as many as 409 layers, and has significant nonlinear dispersion at the band edges, resulting in deterioration of its transmission characteristics.

On the other hand, the acouto-optic tunable filter type multiplexer/demultiplexer proposed in non-patent Document 2 is limited, for instance, in the maximum number of optical channels that can be simultaneously processed, which maximum number is as small as 4. Further, this multiplexer/demultiplexer requires a broad guard band not available for communication, and accordingly suffers from a low degree of bandwidth utilization efficiency.

An array waveguide grating (AWG) proposed in non-patent Document 3 is widely used for multiplexing and demultiplexing the optical channels, but suffers from the following drawback when used as a multiplexer/demultiplexer for multiplexing and demultiplexing the wavebands. That is, while a waveband consisting of a bundle of a plurality of optical channels has a broad passband width, this broad passband width realized by an array waveguide grating has a low degree of sharpness of band edges. Accordingly, the required guard band width increases with an increase of the passband width, leading to serious deterioration of the bandwidth utilization efficiency.

Non-patent Document 4 and non-patent Document 5 propose an optical waveband demultiplexer which is a combination of two array waveguide gratings (AWG). However, this demultiplexer requires a complicated design for improving the sharpness of band edges, and has disadvantages of difficult manufacture and incapability to exhibit sufficiently satisfactory characteristics.

Referring to FIG. 22, there is shown a conventional waveband cross-connect switch including a plurality of optical waveband multiplexing/demultiplexing units GB provided for respective input and output fibers. Each unit GB is constituted by the above-described conventional multi-layered thin-film interference filter type multiplexer/demultiplexer or acousto-optic filter type multiplexer/demultiplexer which has one input port and a plurality of output ports. This optical waveband cross-connect switch is configured such that wavelength-division multiplexed light beam beams WDM incident through an "N" number of optical fibers $F_{IN}$ are separated by the "N" number of optical waveband multiplexing/demultiplexing units GB, into an "m" number of wavebands, which are routed in respective predetermined directions by the "m" number of optical switches SW, and combined together by the "N" number of optical waveband multiplexing/demultiplexing units GB and then outputted to the "N" number of optical fibers $F_{OUT}$. The cross-connect switch requires a total of (N+N) number of optical waveband multiplexing/demultiplexing units, undesirably causing a large number of components, and a complicated configuration.

On the other hand, patent Document 1 discloses an optical multiplexing/demultiplexing element which is a series arrangement of a cyclic-characteristic demultiplexer having a cyclic characteristic of wavelength response, and a waveguide array diffraction grating demultiplexer. However, the cyclic-characteristic demultiplexer constituting a front stage of this optical multiplexing/demultiplexing element has output ports the number of which is smaller than the number of the optical channels of the incident wavelength-division multiplexed light beam, so that a group of optical channels superimposed on each other at each output port is outputted. The waveguide array diffraction grating demultiplexer constituting a rear stage of the optical multiplexing/demultiplexing element merely has a multiplexing function. Thus, the optical multiplexing/demultiplexing element disclosed in patent Document 1 functions as a filter for flattening an optical intensity within a selected bandwidth, and is merely able to reduce a power loss.

Patent Document 2 discloses a waveguide type optical multiplexing/demultiplexing circuit which is a combination of a first array waveguide diffraction grating, and a plurality of second array waveguide diffraction gratings which are arranged in parallel to each other and the number of which is equal to that of the desired wavebands. However, the plurality of second array waveguide diffraction gratings arranged in parallel at the rear stage of the circuit merely function as optical couplers, and do not permit the provision of input fibers for introducing a plurality of wavelength-division multiplexed light beam beams having the same optical channels.

An optical communication network is generally arranged to implement switching for each wavelength at each node. However, the switching should be implemented for multiple wavelengths (a group of wavelengths), for coping with an increase of the optical signals to be transmitted. For the multiwavelength switching, there has been proposed an optical waveband selective switch (WBSS) capable of multiplexing a group of desired wavelengths which have been separated from an incident optical waveband. However, the conventional optical waveband selective switch is configured such that the wavelengths of a waveband separated by transmission through a collimator and reflection by a diffraction grating are reflected at desired output ports so as to group the wavelengths into the waveband, by multiple micro mirrors which are arranged so as to define a surface and which are two-dimensionally driven. Thus, the present selective switch is undesirably complicated in construction and large-sized, and is expensive due to requirement for extremely intricate and cumbersome adjustment of each micro mirror.

The present invention was made in view of the background art described above. It is a first object of this invention to provide an optical waveband demultiplexer which is simple in construction and which is operable to separate at least one wavelength-division multiplexed light beam into a predetermined plurality of wavebands, and output the separated plurality of wavebands from a plurality of output ports, and an optical waveband demultiplexer which is simple in construction and which is operable to combine together a plurality of wavebands and output a wavelength-division multiplexed light beam consisting of the plurality of wavebands. It is a second object of this invention to provide an optical waveband selective switch which is simple in construction and small-sized and which is operable to implement selective switching of a group of wavelengths.

Means For Achieving The Object

As a result of various considerations in view of the background art described above, the present inventors have recognized that an array waveguide grating has sufficiently satisfactory characteristics for demultiplexing and multiplexing with a high degree of resolution corresponding to the wavelengths of optical channels, and characteristics that output ports are shifted by one position with shifting of input ports by one position, and the inventors have found that a simple device including two array waveguide gratings arranged in series and connected to each other under a predetermined condition permits demultiplexing of a wavelength-division multiplexed light beam transmitted through the two array waveguide gratings, into a predetermined plurality of wavebands, and outputting of the demultiplexed plurality of wavebands from a plurality of output ports, or permits multiplexing of a plurality of wavebands transmitted through the two array waveguide gratings in the reverse direction, into at least one wavelength-division multiplexed light beam consisting of the predetermined plurality of wavebands. The present invention was made based this fining. It should be noted in particular that a plurality of input and output fibers can be used commonly for the optical waveband multiplexer and the optical waveband demultiplexer according to the present invention, and can significantly contribute to an improvement of economy of optical waveband cross-connect nodes.

The object indicated above may be achieved according to a first form of this invention, which provides an optical waveband demultiplexer operable to separate a wavelength-division multiplexed light beam consisting of a plurality of wavebands each including a plurality of optical channels, into a predetermined plurality of wavebands, and to output the separated plurality of wavebands from a plurality of output ports, respectively, the optical waveband demultiplexer being characterized in that the wavelength-division multiplexed light beam is transmitted through an array waveguide grating capable of performing demultiplexing and multiplexing functions with a resolution corresponding to wavelengths of the optical channels and having a characteristic of sequentially shifting its output ports by one position with shifting of its input ports by one position, and a characteristic of outputting signals of the plurality of optical channels transmitted through one fiber connected to each of the input ports such that the signals are outputted from the respective different output ports, and then transmitted through another array waveguide grating capable of performing demultiplexing and multiplexing functions with a resolution corresponding to the wavelengths of the optical channels and having a characteristic of sequentially shifting its output ports by one position with shifting of its input ports by one position, whereby the wavelength-division multiplexed light beam transmitted through the two array waveguide gratings is separated into a plurality of wavebands each including the mutually different optical channels selected from the optical channels included in the wave-division multiplexed light beam, and the separated plurality of wavebands are respectively outputted concurrently from the plurality of output ports of the latter array waveguide grating.

According to a second form of this invention, there is provided an optical waveband demultiplexer operable to separate a wavelength-division multiplexed light beam consisting of a plurality of wavebands each including a plurality of optical channels, into a predetermined plurality of wavebands, and to output the separated plurality of wavebands from a plurality of output ports, respectively, the optical waveband demultiplexer being characterized in that the wavelength-division multiplexed light beam is transmitted through an array waveguide grating capable of performing demultiplexing and multiplexing functions with a resolution corresponding to wavelengths of the optical channels and having a characteristic of sequentially shifting its output ports by one position with shifting of its input ports by one position, and a characteristic of outputting the signals of the plurality of optical channels transmitted through one fiber connected to each of the input ports such that the plurality of optical channels spaced from each other at a spacing determined by cyclic characteristic of wavelength response are not concurrently outputted from the same output ports, and then transmitted through another array waveguide grating capable of performing demultiplexing and multiplexing functions with a resolution corresponding to the wavelengths of the optical channels and having a characteristic of sequentially shifting its output ports by one position with shifting of its input ports by one position, whereby the wavelength-division multiplexed light beam transmitted through the two array waveguide gratings is separated into a plurality of wavebands each including the mutually different optical channels selected from the optical channels included in the wave-division multiplexed light beam, and the separated plurality of wavebands are respectively outputted concurrently from the plurality of output ports of the latter array waveguide grating.

According to a third form of the invention, the optical waveband demultiplexer according to the first or second form of the invention is configured such that a plurality of mutually different wavelength-division multiplexed light beams which are respectively incident upon the plurality of input ports are separated into the optical channels belonging to the wavebands included in the wavelength-division multiplexed light beams, and the separated optical channels are multiplexed into a predetermined plurality of wavebands, which are outputted from the respective different output ports.

According to a fourth form of the invention, the optical waveband demultiplexer according to any one of the first through third forms of the invention comprises a first array waveguide grating through which the wavelength-division multiplexed light beam is transmitted, a second array waveguide grating having output ports from which the plurality of wavebands are respectively outputted, and optical connecting waveguides which connect output ports of the first array waveguide grating and input ports of the second array waveguide grating.

According to a fifth form of the invention, the optical connecting waveguides according to the fourth form of the invention consist of a plurality of waveguides formed in a plane such that the plurality of waveguides do not intersect each other.

According to a sixth form of the invention, the optical waveband demultiplexer according to the fourth or fifth form of the invention is configured such that each of the first array waveguide grating and the second array waveguide grating is provided with input ports and output ports the number of which is equal to the number of the optical channels included in each of the plurality of wavebands of the wavelength-division multiplexed light beam.

According to a seventh form of the invention, the optical waveband demultiplexer according to the fourth or fifth form of the invention is configured such that at least one wavelength-division multiplexed light beam is incident upon at least one of the output ports of the second array waveguide grating, in a reverse direction, and each incident wavelength-division multiplexed light beam is separated into predetermined wavebands each included in the multiplexed light beam and having predetermined optical channels, the separated wavebands being outputted from input ports of the first array wave guide grating, which input ports are not used to receive the wavelength-division multiplexed light beam, whereby two demultiplexing functions are performed when the wavelength-division multiplexed light beams are incident bidirect6ionally, to separate the wavelength-division multiplexed light beams into the wavebands each including the mutually different optical channels included in the incident wavelength-division multiplexed light beams.

According to an eighth form of the invention, the optical waveband demultiplexer according to any one of the fourth through seventh forms of the invention is configured such that at least one of the first array waveguide grating and the second array waveguide grating has a cyclic characteristic of wavelength response such that an output position at which the wavelength-division multiplexed light beam incident upon one of a plurality of input waveguides is output is cyclically shifted by one position with shifting of an input position by one position.

According to a ninth form of the invention, the optical waveband demultiplexer according to any one of the first through third forms of the invention does not use two separate array waveguide gratings, namely, first and second array waveguide gratings, but uses only one array waveguide grating and is configured such that a part of the output of this array waveguide grating is returned to the input of the array waveguide grating, so that the optical waveband demultiplexer performs the demultiplexing function by transmitting the wavelength-division multiplexed light beam twice through the single array waveguide grating. Namely, the optical waveband demultiplexer according to the ninth form of the invention comprises (a) a single array waveguide grating having a plurality of input ports and a plurality of output ports and configured such that the wavelength-division multiplexed light beam incident upon predetermined ones of the input ports is separated into the plurality of wavebands each including the mutually different optical channels which are selected from the plurality of optical channels included in the incident wave-division multiplexed light beam, and the separated plurality of wavebands are outputted from predetermined ones of the output ports, and (b) return waveguides connecting the above-indicated the other ones of the plurality of output ports to the other ones of the plurality of input ports, for returning a plurality of optical signals of the wavebands separated from the wavelength-division multiplexed light beam incident upon the predetermined ones of the input ports, from the above-indicated other ones of the output ports back to the above-indicated other ones of the input ports, (c) whereby one wavelength-division multiplexed light beam or a plurality of different wavelength-division multiplexed light beams incident upon the above-indicated predetermined ones of the input ports is/are separated into the plurality of wavebands which are included in the incident wavelength-division multiplexed light beam or beams and each of which includes the mutually different optical channels selected from the plurality of optical channels included in the incident wavelength-division multiplexed light beam or beams, the separated wavebands being outputted from the respective different output ports.

According to a tenth form of the invention, the optical waveband demultiplexer according to any one of the first through ninth forms of the invention is configured such that each of the wavebands outputted from the respective output ports consists of the optical channels which are successively spaced apart from each other along an axis of wavelength.

According to an eleventh form of the invention, the optical waveband demultiplexer according to any one of the first through ninth forms of the invention is configured such that each of the wavebands outputted from the respective output ports consists of the optical channels which are non-successively spaced apart from each other along an axis of wavelength.

According to a twelfth form of this invention, the optical waveband demultiplexer according to the fourth or fifth form of the invention is configured such that the first array waveguide grating, the second array waveguide grating, and the optical connecting waveguides connecting the output ports of the first array waveguide grating and the input ports of the second array waveguide grating are integrally provided on a common substrate.

According to a thirteenth form of the invention, the optical waveband demultiplexer according to the twelfth form of the invention is configured such that each of the first array waveguide rating and the second array waveguide grating comprises (a) a plurality of array waveguides having respective different optical path lengths, (b) an input lens waveguide for distributing the wavelength-division multiplexed light beam incident upon the input ports, to input-side ends of the plurality of array waveguides, respectively, and (c) an output lens waveguide for separating the wavelength-division multiplexed light beam outputted from output-side ends of the plurality of array waveguides, into the plurality of optical channels included in the outputted wavelength-division multiplexed light beam, on the basis of a difference of the optical path lengths of the plurality of array waveguides, and for distributing the plurality of optical channels to the predetermined respective output ports.

According to a fourteenth form of the invention, the optical waveband demultiplexer according to any one of the fourth through eighth forms and the tenth through thirteenth forms of the invention further comprises an optical switch inserted in each of at least one of the optical connecting waveguides connecting the output ports of the first array waveguide grating and the input ports of the second array waveguide grating, the optical switch being operable to drop an optical signal outputted from the corresponding output port of the first array waveguide grating and to output an added optical signal a wavelength of which is the same as or different from that of the dropped optical signal.

According to a fifteenth form of the invention, there is provided an optical waveband multiplexer operable to combine together a plurality of wavebands incident through a plurality of input ports and each including a plurality of optical channels, into a wavelength-division multiplexed light beam consisting of the plurality of wavebands, and to output the wavelength-division multiplexed light beam from output ports, characterized in that the above-indicated plurality of wavebands are transmitted through an array waveguide grating capable of performing demultiplexing and multiplexing functions with a resolution corresponding to wavelengths of the optical channels and having a characteristic of sequentially shifting its output ports by one position with shifting of its input ports by one position, and a characteristic of outputting signals of the plurality of optical channels transmitted through one fiber connected to each of the input ports such that the signals are outputted from the respective different output ports, and then transmitted through another array waveguide grating capable of performing demultiplexing and multiplexing functions with a resolution corresponding to the wavelengths of the optical channels and having a characteristic of sequentially shifting its output ports by one position with shifting of its input ports by one position, whereby the plurality of wavebands transmitted through the two array waveguide gratings and each including a plurality of optical channels are combined together into a wavelength-division multiplexed light beam, which is outputted from the plurality of output ports of the latter array waveguide grating.

According to a sixteenth form of the invention, there is provided an optical waveband multiplexer operable to combine together a plurality of wavebands incident through a plurality of input ports and each including a plurality of optical channels, into a wavelength-division multiplexed light beam consisting of the plurality of wavebands, and to output the wavelength-division multiplexed light beam from output ports, characterized in that the above-indicated plurality of wavebands are transmitted through an array waveguide grating capable of performing demultiplexing and multiplexing functions with a resolution corresponding to wavelengths of the optical channels and having a characteristic of sequentially shifting its output ports by one position with shifting of its input ports by one position, and a characteristic of outputting the signals of the plurality of optical channels transmitted through one fiber connected to each of the input ports such that the plurality of optical channels spaced apart from each other at a spacing determined by cyclic characteristic of wavelength response are not concurrently outputted from the same output ports, and then transmitted through another array waveguide grating capable of performing demultiplexing and multiplexing functions with a resolution corresponding to the wavelengths of the optical channels and having a characteristic of sequentially shifting its output ports by one position with shifting of its input ports by one position, whereby the plurality of wavebands transmitted through the two array waveguide gratings and each including a plurality of optical channels are combined together into a wavelength-division multiplexed light beam, which is outputted from the plurality of output ports of the latter array waveguide grating.

According to a seventeenth form of the invention, the optical waveband multiplexer according to the fifteenth or sixteenth form of the invention is configured such that the optical channels belonging to the wavebands incident upon the plurality of input ports are combined together into a plurality of wavelength-division multiplexed light beams each including a plurality of predetermined wavebands, which are respectively outputted from the respective output ports.

According to a eighteenth form of the invention, the optical waveband multiplexer according to any one of the fifteenth through seventeenth forms of the invention comprises a first array waveguide grating through which the wavelength-division multiplexed light beam is transmitted, a second array waveguide grating having output ports from which the plurality of wavebands are respectively outputted, and optical connecting waveguides which connect output ports of the first array wave guide grating and input ports of the second array waveguide grating.

According to a nineteenth form of the invention, the optical waveband multiplexer according to the eighteenth form of the invention is configured such that the optical connecting waveguides consist of a plurality of waveguides formed in a plane such that the plurality of waveguides do not intersect each other.

According to a twentieth form of the invention, the optical waveband multiplexer according to the eighteenth form of the invention is configured such that each of the first array waveguide grating and the second array waveguide grating is provided with input ports and output ports the number of which is equal to the number of the optical channels included in the wavelength-division multiplexed light beam.

According to a twenty first form of the invention, the optical waveband multiplexer according to any one of the eighteenth through twentieth forms of the invention is configured such that at least one of the first array waveguide grating and the second array waveguide grating has a cyclic characteristic of wavelength response such that an output position at which the wavelength-division multiplexed light beam incident upon one of a plurality of input waveguides is output is cyclically shifted by one position with shifting of an input position by one position.

According to a twenty second form of the invention, the optical waveband multiplexer according to any one of the fifteen through eighteenth forms of the invention does not use two separate array waveguide gratings, namely, first and second array waveguide gratings, but uses only one array waveguide grating and is configured such that a part of the output of this array waveguide grating is returned to the input of the array waveguide grating, so that the optical waveband demultiplexer performs the demultiplexing function by transmitting the wavelength-division multiplexed light beam twice through the single array waveguide grating. Namely, the optical waveband multiplexer according to the ninth form of the invention comprises (a) a single array waveguide grating having a plurality of input ports and a plurality of output ports and configured such that the wavelength-division multiplexed light beam incident upon predetermined ones of the input ports is separated into the plurality of wavebands each including the mutually different optical channels which are selected from the plurality of optical channels included in the incident wave-division multiplexed light beam, and the separated plurality of wavebands are outputted from predetermined ones of the output ports, and (b) return waveguides connecting the above-indicated the other ones of the plurality of output ports to the other ones of the plurality of input ports, for returning a plurality of optical signals of the wavebands separated from the wavelength-division multiplexed light beam incident upon the predetermined ones of the input ports, from the above-indicated other ones of the output ports back to the above-indicated other ones of the input ports, (c) whereby one wavelength-division multiplexed light beam or a plurality of different wavelength-division multiplexed light beams incident upon the above-indicated predetermined ones of the input ports is/are separated into the plurality of wavebands which are included in the incident wavelength-division multiplexed light beam or beams and each of which includes the mutually different optical channels selected from the plurality of optical channels included in the incident wavelength-division multiplexed light beam or beams, the separated wavebands being outputted from the respective different output ports.

According to a twenty third form of the invention, the optical waveband multiplexer according to any one of the fifteenth through twenty second forms of the invention is configured such that each of the wavebands outputted from the respective output ports consists of the optical channels which are successively spaced apart from each other along an axis of wavelength.

According to a twenty fourth form of the invention, the optical waveband multiplexer according to any one of the fifteenth through twenty second forms of the invention is configured such that each of the wavebands outputted from the respective output ports consists of the optical channels which are non-successively spaced apart from each other along an axis of wavelength.

According to a twenty fifth form of this invention, the optical waveband multiplexer according to the eighteenth or nineteenth form of the invention is configured such that the first array waveguide grating, the second array waveguide grating, and the optical connecting waveguides connecting the output ports of the first array waveguide grating and the input ports of the second array waveguide grating are integrally provided on a common substrate.

According to a twenty sixth form of the invention, the optical waveband multiplexer according to the twenty fifth form of the invention is configured such that each of the first array waveguide rating and the second array waveguide grating comprises (a) a plurality of array waveguides having respective different optical path lengths, (b) an input lens waveguide for distributing the wavelength-division multiplexed light beam incident upon the input ports, to input-side ends of the plurality of array waveguides, respectively, and (c) an output lens waveguide for separating the wavelength-division multiplexed light beam outputted from output-side ends of the plurality of array waveguides, into the plurality of optical channels included in the outputted wavelength-division multiplexed light beam, on the basis of a difference of the optical path lengths of the plurality of array waveguides, and for distributing the plurality of optical channels to the predetermined respective output ports.

According to a twenty seventh form of the invention, the optical waveband multiplexer according to any one of the fifteenth through twenty first forms and the twenty third through twenty sixth forms of the invention further comprises an optical switch is inserted in each of at least one of the optical connecting waveguides connecting the output ports of the first array waveguide grating and the input ports of the second array waveguide grating, the optical switch being operable to drop an optical signal outputted from the corresponding output port of the first array waveguide grating and to output an added optical signal a wavelength of which is the same as or different from that of the dropped optical signal.

According to a twenty eighth form of the invention, there is provided an optical waveband selective switch characterized by comprising an optical waveband demultiplexer according to any one of the first through fourteenth forms of the invention, and an optical switch configured to input each of at least one waveband outputted from the optical waveband demultiplexer, to any one of input and output ports of the optical waveband demultiplexer, and wherein a combination of wavebands selected from the above-indicated at least one waveband is outputted from selected ones of the output ports.

According to a twenty ninth form of the invention, the optical waveband selective switch according to the twenty eighth form of the invention is configured such that a part of a plurality of input ports of the optical waveband demultiplexer upon which a plurality of wavelength-division multiplexed light beams are incident is used as an input port or ports of the optical waveband selective switch, while another part of the plurality of input ports is used as selected-waveband output ports from which combinations of wavebands selected from the wavebands included in the wavelength-division multiplexed light beams incident upon the above-indicated part of the input ports are outputted.

According to a thirtieth form of the invention, the optical waveband selective switch according to the twenty ninth form of the invention is configured such that the optical switch is provided for each of the plurality of output ports of the optical waveband demultiplexer from which the wavebands included in the wavelength-division multiplexed light beams incident upon the above-indicated part of the plurality of input ports are outputted, and the optical switch is configured to input the wavebands outputted from the plurality of output ports, selectively to a plurality of output ports from which wavebands included in other wavelength-division multiplexed light beams incident upon the above-indicated another part of the plurality of input ports are outputted when the above-indicted other wavelength-division multiplexed light beams are incident upon the another part of the input ports.

According to a thirty first form of the invention, the optical waveband selective switch according to the twenty ninth form of the invention is configured such that that the optical switch is provided for each of the plurality of output ports of the optical waveband demultiplexer from which the wavebands included in the wavelength-division multiplexed light beams incident upon the above-indicated part of the plurality of input ports are outputted, and the optical switch is configured to input the wavebands outputted from the plurality of output ports, selectively to a plurality of output ports from which the same wavebands included in other wavelength-division multiplexed light beams incident upon the above-indicated another part of the plurality of input ports are outputted when the above-indicted other wavelength-division multiplexed light beams are incident upon the another part of the input ports.

According to a thirty second form of the invention, the optical waveband selective switch according to any one of the twenty eighth through thirty first forms of the invention is configured such that the optical switch is provided on the common substrate, integrally with the first array waveguide grating, the second array waveguide grating and the optical connecting waveguides of the optical waveband demultiplexer which are provided on the common substrate.

According to a thirty third form of the invention, the optical waveband selective switch according to any one of the twenty eighth through thirty second forms of the invention is configured such that the optical switch includes a fundamental optical switch having a pair of arm waveguides one of which receives an incident light beam, a directional coupler formed locally between the pair of arm waveguides, and an optical-path-length-difference changing device operable to change a difference between optical path lengths of the pair of arm waveguides, for outputting the incident light beam incident upon the above-indicated one of the pair of arm waveguides, from the other of the pair of arm waveguides.

ADVANTAGES OF THE INVENTION

In the optical waveband demultiplexer constructed according to the first form of this invention, the wavelength-division multiplexed light beam is transmitted through an array waveguide grating capable of performing a demultiplexing function with a resolution corresponding to wavelengths of the optical channels and having a characteristic of sequentially shifting its output ports by one position with shifting of its input ports by one position, and a characteristic of outputting signals of the plurality of optical channels transmitted through one fiber connected to each of the input ports such that the signals are outputted from the respective different output ports, and then transmitted through another array waveguide grating capable of performing demultiplexing and multiplexing functions with a resolution corresponding to the wavelengths of the optical channels and having a characteristic of sequentially shifting its output ports by one position with shifting of its input ports by one position, whereby the wavelength-division multiplexed light beam transmitted through the two array waveguide gratings is separated into a plurality of wavebands each including the mutually different optical channels selected from the optical channels included in the wave-division multiplexed light beam, and the separated plurality of wavebands are respectively outputted concurrently from the plurality of output ports of the latter array waveguide grating. Thus, the optical waveband demultiplexer is considerably simple in construction, and is operable to separate the wavelength-division multiplexed light beam consisting of a plurality of wavebands each including a plurality of optical channels, into a predetermined plurality of wavebands, and output the separated plurality of wavebands from the respective output ports.

In the optical waveband demultiplexer constructed according to the first form of this invention, the wavelength-division multiplexed light beam is transmitted through an array waveguide grating capable of performing demultiplexing and multiplexing functions with a resolution corresponding to wavelengths of the optical channels and having a characteristic of sequentially shifting the output ports by one position with shifting of input ports by one position, and a characteristic of outputting the signals of the plurality of optical channels transmitted through one fiber connected to each of the input ports such that the plurality of optical channels spaced from each other at a spacing determined by cyclic characteristic of wavelength response are not concurrently outputted from the same output ports, and then transmitted through another array waveguide grating capable of performing demultiplexing and multiplexing functions with a resolution corresponding to the wavelengths of the optical channels and having a characteristic of sequentially shifting the output ports by one position with shifting of the input ports by one position, whereby the wavelength-division multiplexed light beam transmitted through the two array waveguide gratings is separated into a plurality of wavebands each including the mutually different optical channels selected from the optical channels included in the wave-division multiplexed light beam, and the separated plurality of wavebands are respectively outputted concurrently from the plurality of output ports of the latter array waveguide grating. Thus, the optical waveband demultiplexer is considerably simple in construction, and is operable to separate the wavelength-division multiplexed light beam consisting of a plurality of wavebands each including a plurality of optical channels, into a predetermined plurality of wavebands, and output the separated plurality of wavebands from the respective output ports.

In the optical waveband demultiplexer according to the third form of the invention, a plurality of different wavelength-division multiplexed light beams which are respectively incident upon the plurality of input ports are separated into the optical channels belonging to the wavebands included in the wavelength-division multiplexed light beams, and the separated optical channels are multiplexed into a predetermined plurality of wavebands, which are outputted from the respective different output ports. Thus, the optical waveband demultiplexer is considerably simple in construction, and is operable to separate the wavelength-division multiplexed light beams incident upon the respective input ports, into the predetermined plurality of wavebands, and output the separated plurality of wavebands from the respective output ports. This form of the invention permits significant reduction of the number of optical waveband demultiplexer units required in an optical waveband cross-connect device (selective switch device), making it possible to reduce the required surface area or space for installation of the cross-connect switch, and the required cost of manufacture of the cross-connect switch.

The optical waveband demultiplexer according to the fourth form of the invention comprises (a) a first array waveguide grating through which the wavelength-division multiplexed light beam is transmitted, (b) a second array waveguide grating having output ports from which the plurality of wavebands are respectively outputted, and (c) optical connecting waveguides which connect output ports of the first array waveguide grating and input ports of the second array waveguide grating. Thus, the optical waveband demultiplexer is considerably simple in construction, and is operable to separate the wavelength-division multiplexed light beam or beams incident upon the plurality of input ports, into the predetermined plurality of wavebands, and output the separated plurality of wavebands from the respective output ports.

In the optical waveband demultiplexer according to the fifth form of this invention, the optical connecting waveguides according to the fourth form of the invention consist of a plurality of waveguides formed in a plane such that the plurality of waveguides do not intersect each other. Accordingly, the optical connecting waveguides as well as the first and second array waveguide gratings can be formed in a plane. For instance, the first and second array waveguide gratings and the optical connecting waveguides can be easily formed on a common substrate formed of quartz or silicon, for example.

In the optical waveband demultiplexer according to the sixth form of the invention, each of the first array waveguide grating and the second array waveguide grating is provided with input ports and output ports the number of which is equal to the number of the optical channels included in each of the plurality of wavebands of the wavelength-division multiplexed light beam. Accordingly, the optical waveband demultiplexer can be simplified in construction. Where the optical demultiplexer has the cyclic characteristic of wavelength response, in particular, the utilization efficiency of the input and output ports can be improved while a plurality of input and output fibers are used commonly.

The optical waveband demultiplexer according to the seventh form of the invention can function such that at least one wavelength-division multiplexed light beam is incident upon at least one of the output ports of the second array waveguide grating, in a reverse direction, and each incident wavelength-division multiplexed light beam is separated into predetermined wavebands each included in the multiplexed light beam and having predetermined optical channels, which wavebands are outputted from input ports of the first array waveguide grating, which input ports are not used to receive the wavelength-division multiplexed light beam, whereby the optical demultiplexer performs two demultiplexing functions when the wavelength-division multiplexed light beams are incident bidirect6ionally, to separate the wavelength-division multiplexed light beams into the wavebands each including the mutually different optical channels included in the incident wavelength-division multiplexed light beams.

In the optical waveband demultiplexer according to the eighth form of the invention, at least one of the first array waveguide grating and the second array waveguide grating has a cyclic characteristic of wavelength response such that an output position at which the wavelength-division multiplexed light beam incident upon one of a plurality of input waveguides is output is cyclically shifted by one position with shifting of an input position by one position. The cyclic characteristic of wavelength response makes it possible to increase the number of the input fibers that can be concurrently connected to the input ports of the first array waveguide grating, and the number of the wavebands that can be outputted from the output ports of the second array waveguide grating, as compared with the numbers where the array waveguide grating is not capable of implementing the cyclic characteristic of wavelength response.

The optical waveband demultiplexer according to the ninth form of this invention comprises (a) a single array waveguide grating having a plurality of input ports and a plurality of output ports and configured such that the wavelength-division multiplexed light beam incident upon predetermined ones of the input ports is separated into the plurality of wavebands each including the mutually different optical channels which are selected from the plurality of optical channels included in the incident wave-division multiplexed light beam, and the separated plurality of wavebands are outputted from predetermined ones of the output ports, and (b) return waveguides connecting the above-indicated other ones of the plurality of output ports to the other ones of the plurality of input ports, for returning a plurality of optical signals of the wavebands separated from the wavelength-division multiplexed light beam incident upon the predetermined ones of the input ports, from the above-indicated other ones of the output ports back to the above-indicated other ones of the input ports, (c) whereby one wavelength-division multiplexed light beam or a plurality of different wavelength-division multiplexed light beams incident upon the above-indicated predetermined ones of the input ports is/are separated into the plurality of wavebands which are included in the incident wavelength-division multiplexed light beam or beams and each of which includes the mutually different optical channels selected from the plurality of optical channels included in the incident wavelength-division multiplexed light beam or beams, the separated wavebands being outputted from the respective different output ports. Thus, the present optical waveband demultiplexer does not use two separate array waveguide gratings, namely, first and second array waveguide gratings, but uses only one array waveguide grating and is configured such that a part of the output of this array waveguide grating is returned to the input of the array waveguide grating, so that the optical waveband demultiplexer performs the demultiplexing function by transmitting the wavelength-division multiplexed light beam twice through the single array waveguide grating. Accordingly, the present optical waveband demultiplexer can be simplified in construction owing to the use of the single array waveguide grating. Where the two array waveguide gratings are and the waveguides connecting these two array waveguide grating are formed as a monolithic structure, the center wavelengths of the optical channels and the demultiplexing characteristics of the two array waveguide gratings should be matched. However, this matching is difficult. The present optical demultiplexer using the single array waveguide grating can be easily fabricated, without a need of matching of the demultiplexing characteristics required in the case of the optical waveband demultiplexer using the two array waveguide gratings.

In the optical waveband demultiplexer according to the tenth form of the invention, each of the wavebands outputted from the respective output ports consists of the optical channels which are successively spaced apart from each other along an axis of wavelength. In this form of the invention, the optical channels of the outputted waveband are successively spaced apart from each other along the axis of waveband.

In the optical waveband demultiplexer according to the eleventh form of the invention, each of the wavebands outputted from the respective output ports consist of the optical channels which are non-successively spaced apart from each other along an axis of wavelength. In this form of the invention, the optical channels of the outputted waveband are non-successively spaced apart from each other along the axis of wavelength.

In the optical waveband demultiplexer according to the twelfth form of the invention, the first array waveguide grating, the second array waveguide grating, and the optical connecting waveguides connecting the output ports of the first array waveguide grating and the input ports of the second array waveguide grating are integrally provided on a common substrate. Thus, the first and second array waveguide gratings and the optical connecting waveguides are formed as a monolithic structure, which permits the optical waveband demultiplexer to be considerably small-sized, as compared with an optical demultiplexer in which the output ports of the first array waveguide grating and the input ports of the second array waveguide grating are connected to each other by optical fibers. For example, the monolithic structure is a silica-based waveguide planar lightwave circuit (PLC) formed of a quartz material on a common substrate of quartz or silicon, in a desired waveguide pattern of cladding and core.

In the optical waveband demultiplexer according to the thirteenth form of this invention, each of the first array waveguide rating and the second array waveguide grating comprises (a) a plurality of array waveguides having respective different optical path lengths, (b) an input lens waveguide for distributing the wavelength-division multiplexed light beam incident upon the input ports, to input-side ends of the plurality of array waveguides, respectively, and (c) an output lens waveguide for separating the wavelength-division multiplexed light beam outputted from output-side ends of the plurality of array waveguides, into the plurality of optical channels included in the outputted wavelength-division multiplexed light beam, on the basis of a difference of the optical path lengths of the plurality of array waveguides, and for distributing the plurality of optical channels to the predetermined respective output ports. Thus, the first and second array waveguide gratings can be easily fabricated by utilizing the silica-based waveguide planar lightwave circuit (PLC).

In the optical waveband demultiplexer according to the fourteenth form of the invention, an optical switch is inserted in each of at least one of the optical connecting waveguides connecting the output ports of the first array waveguide grating and the input ports of the second array waveguide grating. This optical switch is operable to drop an optical signal outputted from the corresponding output port of the first array waveguide grating and to output an added optical signal a wavelength of which is the same as or different from that of the dropped optical signal. Accordingly, it is possible to drop desired ones of the wavebands outputted from the selected output ports of the first array waveguide grating, or selected optical channels of the desired wavebands, when the wavelength-division multiplexed light beams are incident upon the first array waveguide grating, and at the same time insert the desired added optical signals in the form of wavebands or optical channels the wavelength of which is the same as or different from that of the dropped optical signal.

In the optical waveband multiplexer constructed according to the fifteenth form of the invention, the plurality of wavebands are transmitted through an array waveguide grating capable of performing demultiplexing and multiplexing functions with a resolution corresponding to wavelengths of the optical channels and having a characteristic of sequentially shifting its output ports by one position with shifting of its input ports by one position, and a characteristic of outputting signals of the plurality of optical channels transmitted through one fiber connected to each of the input ports such that the signals are outputted from the respective different output ports, and then transmitted through another array waveguide grating capable of performing demultiplexing and multiplexing functions with a resolution corresponding to the wavelengths of the optical channels and having a characteristic of sequentially shifting its output ports by one position with shifting of its input ports by one position, whereby the plurality of wavebands transmitted through the two array waveguide gratings and each including a plurality of optical channels are combined together into a wavelength-division multiplexed light beam, which is outputted from the plurality of output ports of the latter array waveguide grating. Thus, the optical waveband demultiplexer is simple in construction, In the optical waveband multiplexer according to the sixteenth form of the invention, the plurality of wavebands are transmitted through an array waveguide grating capable of performing demultiplexing and multiplexing functions with a resolution corresponding to wavelengths of the optical channels and having a characteristic of sequentially shifting its output ports by one position with shifting of its input ports by one position, and a characteristic of outputting the signals of the plurality of optical channels transmitted through one fiber connected to each of the input ports such that the plurality of optical channels spaced apart from each other at a spacing determined by cyclic characteristic of wavelength response are not concurrently outputted from the same output ports, and then transmitted through another array waveguide grating capable of performing demultiplexing and multiplexing functions with a resolution corresponding to the wavelengths of the optical channels and having a characteristic of sequentially shifting its output ports by one position with shifting of its input ports by one position, whereby the plurality of wavebands transmitted through the two array waveguide gratings and each including a plurality of optical channels are combined together into a wavelength-division multiplexed light beam, which is outputted from the plurality of output ports of the latter array waveguide grating. Thus, the optical waveband multiplexer is simple in construction, In the optical waveband multiplexer according to the seventeenth form of this invention, the optical channels belonging to the wavebands incident upon the plurality of input ports are combined together into a plurality of wavelength-division multiplexed light beams each including a plurality of predetermined wavebands, which are respectively outputted from the respective output ports. Thus, the optical waveband multiplexer is considerably simple in construction, and is operable to combine together the plurality of wavebands incident upon the plurality of input ports into the plurality of wavelength-division multiplexed light beam, which are outputted from the plurality of output ports of the latter array waveguide grating. This form of the invention permits significant reduction of the number of optical waveband multiplexer units required in an optical waveband cross-connect device (selective switch device), making it possible to reduce the required surface area or space for installation of the cross-connect switch, and the required cost of manufacture of the cross-connect switch.

The optical waveband multiplexer according to the eighteenth form of the invention comprises (a) a first array waveguide grating through which the wavelength-division multiplexed light beam is transmitted, (b) a second array waveguide grating having output ports from which the plurality of wavebands are respectively outputted, and (c) optical connecting waveguides which connect output ports of the first array waveguide grating and input ports of the second array waveguide grating. Thus, the optical waveband multiplexer is considerably simple in construction, and is operable to separate the wavelength-division multiplexed light beam or beams incident upon the plurality of input ports, into the predetermined plurality of wavebands, and output the separated plurality of wavebands from the respective output ports.

In the optical waveband multiplexer according to the nineteenth form of this invention, the optical connecting waveguides according to the fourth form of the invention consist of a plurality of waveguides formed in a plane such that the plurality of waveguides do not intersect each other. Accordingly, the optical connecting waveguides as well as the first and second array waveguide gratings can be formed in a plane. For instance, the first and second array waveguide gratings and the optical connecting waveguides can be easily formed on a common substrate formed of quartz or silicon, for example.

In the optical waveband multiplexer according to the twentieth form of the invention, each of the first array waveguide grating and the second array waveguide grating is provided with input ports and output ports the number of which is equal to the number of the optical channels included in each of the plurality of wavebands of the wavelength-division multiplexed light beam. Accordingly, the optical waveband multiplexer can be simplified in construction. Where the optical multiplexer has the cyclic characteristic of wavelength response, in particular, the utilization efficiency of the input and output ports can be improved while a plurality of input and output fibers are used commonly.

The optical waveband multiplexer according to the twenty first form of the invention can function such that at least one of the first array waveguide grating and the second array waveguide grating has a cyclic characteristic of wavelength response such that an output position at which the wavelength-division multiplexed light beam incident upon one of a plurality of input waveguides is output is cyclically shifted by one position with shifting of an input position by one position. The cyclic characteristic of wavelength response makes it possible to change the optical channels included in the wavebands combined together into the wavelength-division multiplexed light beam.

The optical waveband multiplexer according to the twenty second form of this invention comprises (a) a single array waveguide grating having a plurality of input ports and a plurality of output ports and configured such that the wavelength-division multiplexed light beam incident upon predetermined ones of the input ports is separated into the plurality of wavebands each including the mutually different optical channels which are selected from the plurality of optical channels included in the incident wave-division multiplexed light beam, and the separated plurality of wavebands are outputted from predetermined ones of the output ports, and (b) return waveguides connecting the above-indicated other ones of the plurality of output ports to the other ones of the plurality of input ports, for returning a plurality of optical signals of the wavebands separated from the wavelength-division multiplexed light beam incident upon the predetermined ones of the input ports, from the above-indicated other ones of the output ports back to the above-indicated other ones of the input ports, (c) whereby one wavelength-division multiplexed light beam or a plurality of different wavelength-division multiplexed light beams incident upon the above-indicated predetermined ones of the input ports is/are separated into the plurality of wavebands which are included in the incident wavelength-division multiplexed light beam or beams and each of which includes the mutually different optical channels selected from the plurality of optical channels included in the incident wavelength-division multiplexed light beam or beams, the separated wavebands being outputted from the respective different output ports. Thus, the present optical waveband multiplexer does not use two separate array waveguide gratings, namely, first and second array waveguide gratings, but uses only one array waveguide grating and is configured such that a part of the output of this array waveguide grating is returned to the input of the array waveguide grating, so that the optical waveband multiplexer performs the multiplexing function by transmitting the wavelength-division multiplexed light beam twice through the single array waveguide grating. Accordingly, the present optical waveband multiplexer can be simplified in construction owing to the use of the single array waveguide grating. Where the two array waveguide gratings are and the waveguides connecting these two array waveguide grating are formed as a monolithic structure, the center wavelengths of the optical channels and the multiplexing characteristics of the two array waveguide gratings should be matched. However, this matching is difficult. The present optical multiplexer using the single array waveguide grating can be easily fabricated, without a need of matching of the multiplexing characteristics required in the case of the optical waveband multiplexer using the two array waveguide gratings.

In the optical waveband multiplexer according to the twenty third form of the invention, each of the wavebands outputted from the respective output ports consists of the optical channels which are successively spaced apart from each other along an axis of wavelength. In this form of the invention, the optical channels of the outputted waveband are successively spaced apart from each other along the axis of waveband.

In the optical waveband multiplexer according to the twenty fourth form of the invention, each of the wavebands outputted from the respective output ports consist of the optical channels which are non-successively spaced apart from each other along an axis of wavelength. In this form of the invention, the optical channels of the outputted waveband are non-successively spaced apart from each other along the axis of wavelength.

In the optical waveband multiplexer according to the twenty fifth form of the invention, the first array waveguide grating, the second array waveguide grating, and the optical connecting waveguides connecting the output ports of the first array waveguide grating and the input ports of the second array waveguide grating are integrally provided on a common substrate. Thus, the first and second array waveguide gratings and the optical connecting waveguides are formed as a monolithic structure, which permits the optical waveband multiplexer to be considerably small-sized, as compared with an optical multiplexer in which the output ports of the first array waveguide grating and the input ports of the second array waveguide grating are connected to each other by optical fibers. For example, the monolithic structure is a silica-based waveguide planar lightwave circuit (PLC) formed of a quartz material on a common substrate of quartz or silicon, in a desired waveguide pattern of cladding and core.

In the optical waveband multiplexer according to the twenty sixth form of this invention, each of the first array waveguide rating and the second array waveguide grating comprises (a) a plurality of array waveguides having respective different optical path lengths, (b) an input lens waveguide for distributing the wavelength-division multiplexed light beam incident upon the input ports, to input-side ends of the plurality of array waveguides, respectively, and (c) an output lens waveguide for separating the wavelength-division multiplexed light beam outputted from output-side ends of the plurality of array waveguides, into the plurality of optical channels included in the outputted wavelength-division multiplexed light beam, on the basis of a difference of the optical path lengths of the plurality of array waveguides, and for distributing the plurality of optical channels to the predetermined respective output ports. Thus, the first and second array waveguide gratings can be easily fabricated by utilizing the silica-based waveguide planar lightwave circuit (PLC).

In the optical waveband multiplexer according to the twenty seventh form of the invention, an optical switch is inserted in each of at least one of the optical connecting waveguides connecting the output ports of the first array waveguide grating and the input ports of the second array waveguide grating. This optical switch is operable to drop an optical signal outputted from the corresponding output port of the first array waveguide grating and to output an added optical signal a wavelength of which is the same as or different from that of the dropped optical signal. Accordingly, it is possible to drop desired ones of the wavebands outputted from the selected output ports of the first array waveguide grating, or selected optical channels of the desired wavebands, when the wavelength-division multiplexed light beams are incident upon the first array waveguide grating, and at the same time insert the desired added optical signals in the form of wavebands or optical channels the wavelength of which is the same as or different from that of the dropped optical signal.

The optical waveband selective switch according to the twenty eighth form of this invention comprises the optical waveband demultiplexer according to any one of the first through fourteenth forms of the invention, and an optical switch configured to input each of at least one waveband outputted from the optical waveband demultiplexer, to any one of input and output ports of the optical waveband demultiplexer, and is configured such that a combination of wavebands selected from the above-indicated at least one waveband is outputted from selected ones of the output ports. This optical waveband selective switch does not have mechanical movable portions as required for selecting reflection ports of multiple micro mirrors of an optical selective switch of a type wherein the multiple micro mirrors are arranged so as to define a surface and three-dimensionally driven to reflect incident wavebands and to input the reflected wavebands to either input ports or output ports of an optical waveband demultiplexer. Accordingly, the present optical waveband selective switch does not require complicated adjustments, ensure a stable waveband selecting switching operation and is simple in construction, extremely small-sized, and economical to manufacture. This provides high economical advantages owing to reduced size and cost of manufacture of an optical waveband cross-connect device (optical waveband selective switch device) or optical waveband dropping/adding device (optical waveband add/drop multiplexer) required to implement switching of wavebands at each node of an optical communication network arranged to cope with an increased number of optical signals to be handled.

In the optical waveband selective switch according to the twenty ninth form of this invention, a part of a plurality of input ports of the optical waveband demultiplexer upon which a plurality of wavelength-division multiplexed light beams are incident is used as an input port or ports of the optical waveband selective switch, while another part of the plurality of input ports is used as selected-waveband output ports from which combinations of wavebands selected from the wavebands included in the wavelength-division multiplexed light beams incident upon the above-indicated part of the input ports are outputted. In this form of the invention, the optical waveband selective switch can be made simple in construction, small-sized and economical to manufacture, like the optical waveband demultiplexer.

In the optical waveband selective switch according to the thirtieth form of the invention, the optical switch is provided for each of the plurality of output ports of the optical waveband demultiplexer from which the wavebands included in the wavelength-division multiplexed light beams incident upon the above-indicated part of the plurality of input ports are outputted, and the optical switch is configured to input the wavebands outputted from the plurality of output ports, selectively to a plurality of output ports from which wavebands included in other wavelength-division multiplexed light beams incident upon the above-indicated another part of the plurality of input ports are outputted when the above-indicted other wavelength-division multiplexed light beams are incident upon the another part of the input ports. In this form of the invention, the optical waveband selective switch can be made simple in construction, small-sized and economical to manufacture, like the optical waveband demultiplexer.

In the optical waveband selective switch according to the thirty first form of the invention, the optical switch is provided for each of the plurality of output ports of the optical waveband demultiplexer from which the wavebands included in the wavelength-division multiplexed light beams incident upon the above-indicated part of the plurality of input ports are outputted, and the optical switch is configured to input the wavebands outputted from the plurality of output ports, selectively to a plurality of output ports from which the same wavebands included in other wavelength-division multiplexed light beams incident upon the above-indicated another part of the plurality of input ports are outputted when the above-indicted other wavelength-division multiplexed light beams are incident upon the another part of the input ports. In this form of the invention, the optical waveband selective switch can be made simple in construction, small-sized and economical to manufacture, like the optical waveband demultiplexer.

In the optical waveband selective switch according to the thirty second form of the invention, that the optical switch is provided on the common substrate, integrally with the first array waveguide grating, the second array waveguide grating and the optical connecting waveguides of the optical waveband demultiplexer which are provided on the common substrate. Accordingly, the present optical waveband selective switch can be made further small-sized, and does not have any mechanical movable portions, assuring an improved degree of reliability.

In the optical waveband selective switch according to the thirty third form of this invention, the optical switch includes a fundamental optical switch having a pair of arm waveguides one of which receives an incident light beam, a directional coupler formed locally between the pair of arm waveguides, and an optical-path-length-difference changing device operable to change a difference between optical path lengths of the pair of arm waveguides, for outputting the incident light beam incident upon the above-indicated one of the pair of arm waveguides, from the other of the pair of arm waveguides. Thus, the present optical waveband selective switch does not have any mechanical movable portions, and is small-sized and stable in optical switching operation.

BRIEF DESCRIPTION OF THE DRAWINGS

FIG. 5 is a view for explaining cyclic characteristic of wavelength response of the first array waveguide grating AWG1 of FIG. 4.

| NOMENCLATURE OF ELEMENTS | |
|---|---|
| 10: | Optical waveband multiplexer/demultiplexer |
| 12: | Optical connecting waveguides |
| 14: | Substrate |
| 16: | Input ports |
| 18: | Output ports |
| 20, 30: | Array waveguides |
| 22, 32: | Input-side waveguides |
| 24, 34: | Input lens waveguide |
| 26, 36: | Output-side waveguides |
| 28, 38: | Output lens waveguide |
| 60: | Optical waveband selective switch |
| 62: | Optical switches |
| 64: | Fundamental optical switches |
| 90: | Optical switch |
| AWG1: | First array waveguide grating |
| AWG2: | Second array waveguide grating |
| AWG3: | Array waveguide grating |

BEST MODE FOR CARRYING OUT THE INVENTION

An optical waveband multiplexer/demultiplexer 10 according to one embodiment of the present invention will be described. This optical waveband multiplexer/demultiplexer 10 has a demultiplexing function of demultiplexing or separating an incident wavelength-division multiplexed light beam WDM into a desired one waveband or a plurality of desired wavebands selected from a plurality of wavebands WB included in the incident wavelength-division multiplexed light beam WDM, and outputting the separated waveband or wavebands from output ports. The optical waveband multiplexer/demultiplexer 10 also has a demultiplexing function of multiplexing or combining together a plurality of wavebands WB incident thereupon in a direction opposite to a direction of incidence of the wavelength-division multiplexed light beam WDM during an operation of the optical multiplexer/demultiplexer 10 to perform its demultiplexing function, to output a desired wavelength-division multiplexed light beam WDM. Thus, the optical waveband multiplexer/demultiplexer 10 functions either as a multiplexer or as a demultiplexer, depending upon its mode of operation. It is to be understood that the drawings are schematic views which do not necessarily exactly show detailed mechanical construction and dimensions of component parts, and that intersections of lines showing various waveguides are special intersections of the waveguides.

Embodiment 1

Figure 1:
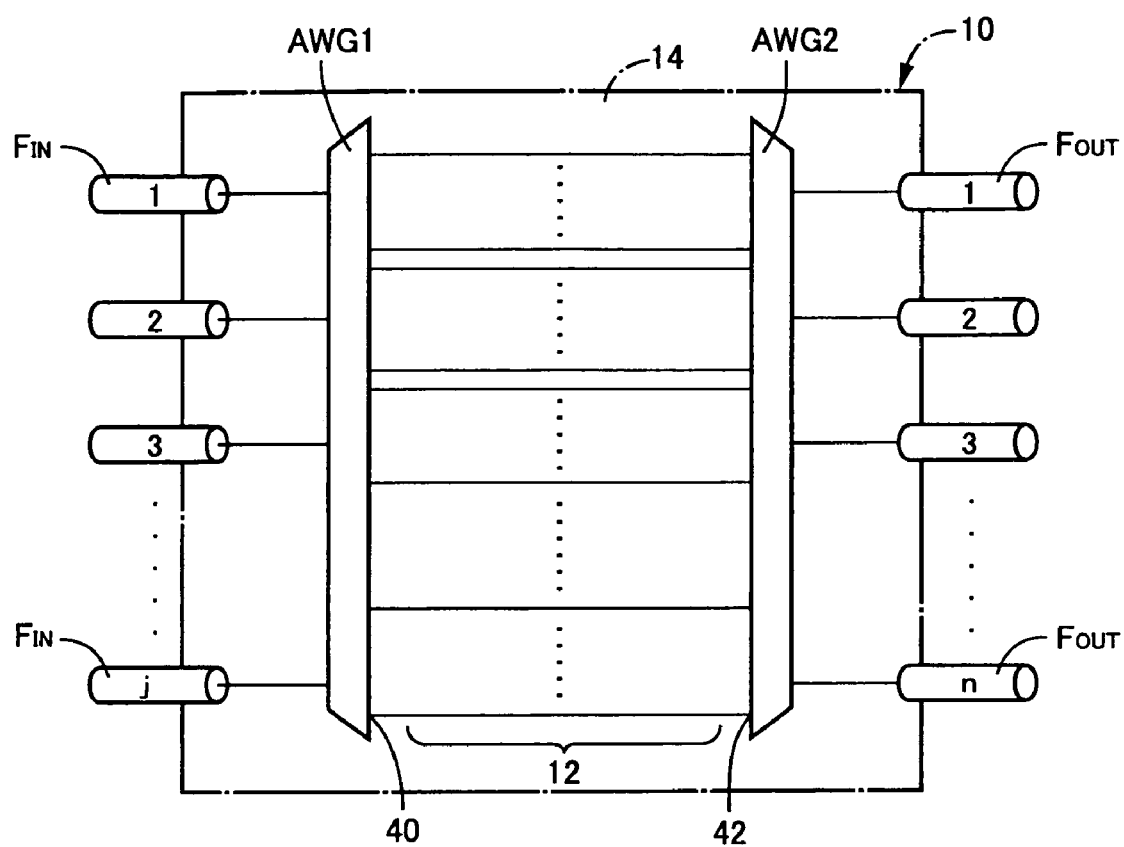
FIG. 1 is a schematic view for explaining an arrangement of an optical waveband multiplexer/demultiplexer constructed according to one embodiment of this invention.

Referring to the schematic view of FIG. 1, there is shown an arrangement of the optical waveband multiplexer/demultiplexer 10, which is provided with a first array waveguide grating AWG1 and a second array waveguide grating AWG2, and optical connecting waveguides 12 connecting the first and second array waveguide gratings AWG1, AWG2. Wavelength-division multiplexed light beams $WDM_1$ through $WDM_j$ incident through a plurality of input fibers $F_{IN1}$ through $F_{INj}$ are transmitted through the first and second array waveguide gratings AWG1, AWG2, whereby predetermined wavebands are separated from a plurality of wavebands $WB_1$ through $WB_m$ which are included in the respective wavelength-division multiplexed light beams $WDM_1$-$WDM_j$ and each of which includes a portion of a plurality of optical channels $\lambda_1$ through $\lambda_k$. The separated wavebands are respectively outputted from a plurality of output fibers $F_{OUT1}$ through $F_{OUTn}$. The subscripts "j", "k", "m" and "n" represent integers.

Figure 2:
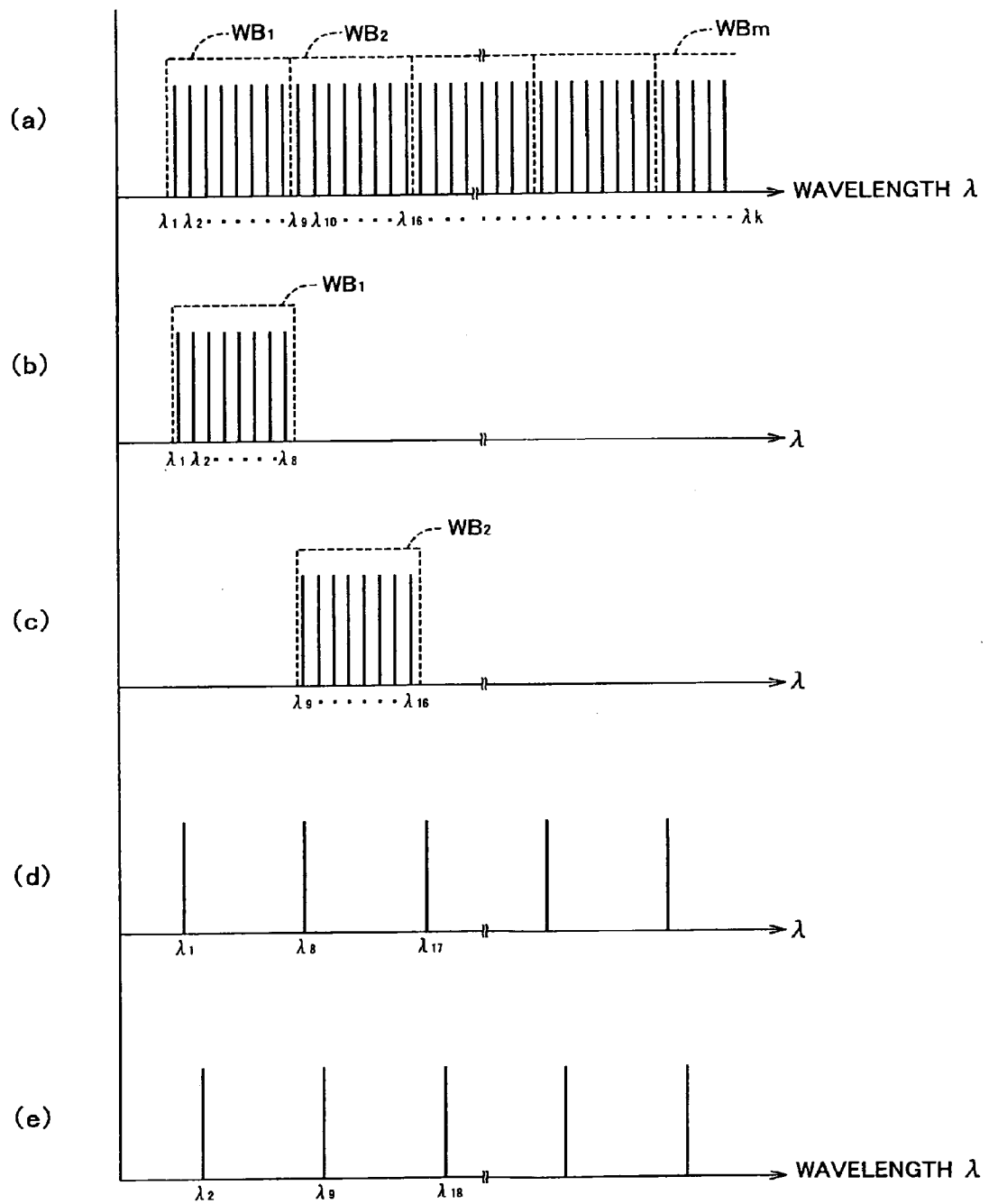
FIG. 2 is a view for explaining a wavelength-division multiplexed light beam WDM incident upon an input port of the optical wavelength multiplexer/demultiplexer of FIG. 1, and four kinds of wavebands WB outputted from output ports.

Each wavelength-division multiplexed light beam WDM includes optical signals of multiple optical channels $\lambda_1$ through $\lambda_k$ which are arranged at 100 GHz spacing, for example, along an axis of wavelength, as indicated at (a) in FIG. 2. Each of the wavebands WB consists of a predetermined number of optical channels, for instance, eight optical channels successively selected from the optical channels $\lambda_1$ through $\lambda_k$. At (b) through (e) of FIG. 2, there are indicated examples of the separated wavebands outputted.

Figure 3:
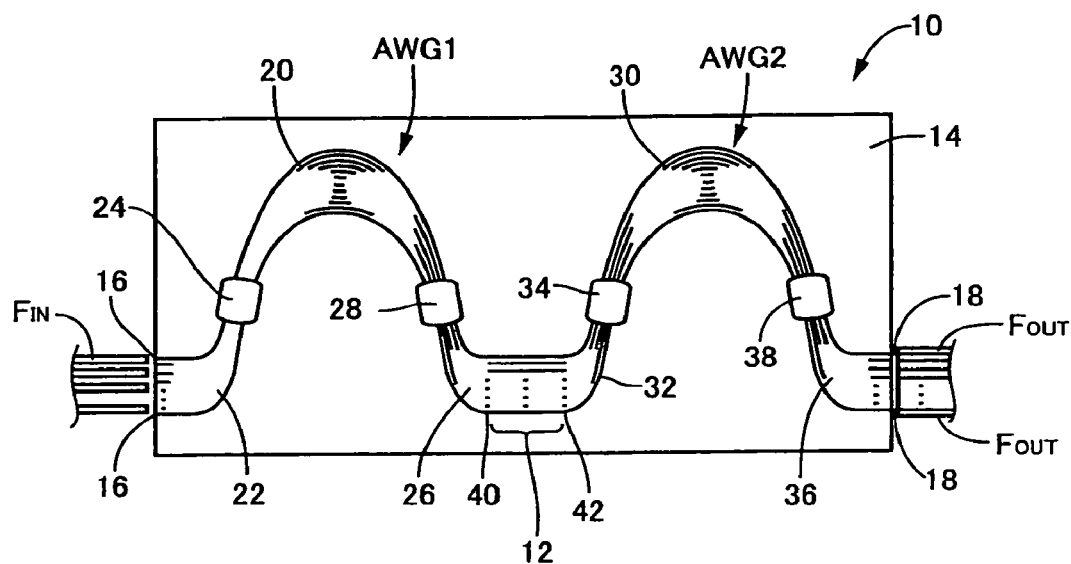
FIG. 3 is a view for explaining an arrangement of components of the optical waveband multiplexer/demultiplexer of FIG. 1 that are formed on a common substrate.
Figure 4:
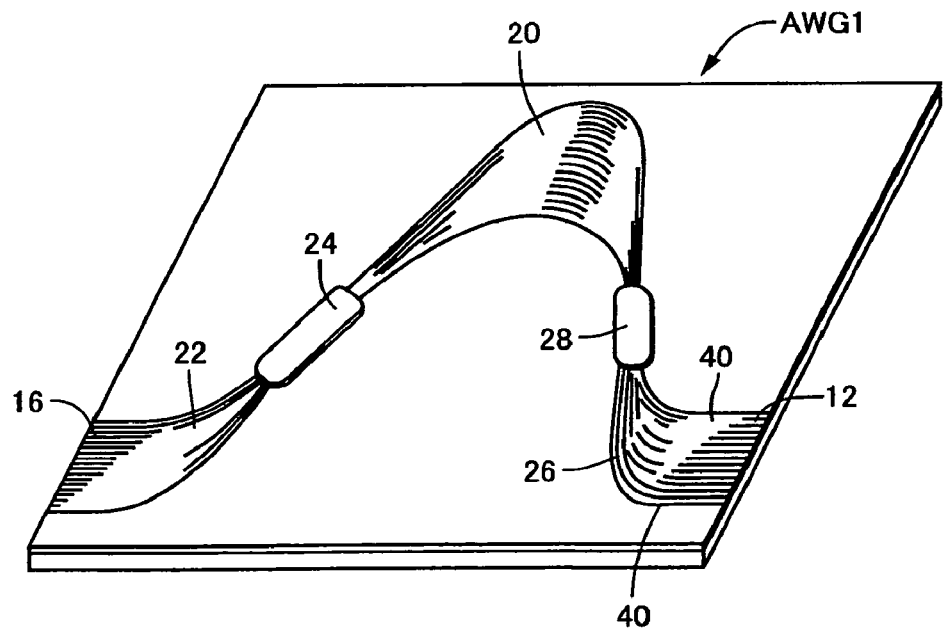
FIG. 4 is a perspective view showing in detail an arrangement of a first array waveguide grating AWG1 of two array waveguide gratings used in the embodiment of FIG. 3.

FIG. 3 shows an exemplary arrangement of the above-indicated optical waveband multiplexer/demultiplexer 10, which is provided with a common substrate 14 formed of quartz (or silica) or silicon, and input ports 16, first array waveguide grating AWG1, second array waveguide grating AWG2, optical connecting waveguides 12 and output ports 18, which are formed on the substrate 14. The optical connecting waveguides 12 connecting the first and second array waveguide gratings AWG1, AWG2. The input ports 16 are respectively connected to the above-described input fibers $F_{IN1}$-$F_{INj}$, while the output ports 18 are respectively connected to the above-described output fibers $F_{IN1}$-$F_{INn}$. The first and second array waveguide gratings AWG1, AWG2, and the optical connecting waveguides 12 connecting these gratings are formed as a monolithic structure of a so-called silica-based waveguide planar lightwave circuit (PLC) formed of a quartz (or silica) material on the substrate 14, in a desired waveguide pattern of cladding and core. The first and second array waveguide gratings AWG1, AWG2 have the same structure. FIG. 4 is a perspective view showing in detail an arrangement of the first array waveguide grating AWG1, by way of example.

As shown in FIG. 4, the first array waveguide grating AWG1 includes a plurality of array waveguides 20 having respective different optical path lengths, a plurality of input-side waveguides 22 having the respective input ports 16, an input lens waveguide 24 disposed between the input-side waveguides 22 and the array waveguides 20 and configured to distribute by diffusion the wavelength-division multiplexed light beams WDM incident upon the input ports 16, to the input ends of the plurality of array waveguides 20, a plurality of output-side waveguides 26 connected to the respective optical connecting waveguides 12, and an output lens waveguide 28 disposed between the output-side waveguides 26 and the array waveguides 20. The output lens waveguide 28 is configured to separate a the wavelength-division multiplexed light beams WDM received from the output ends of the plurality of array waveguides 20, into a plurality of optical channels (a plurality of optical signals of mutually different center wavelengths having a spacing of 100 GHz, for example) included in the incident wavelength-division multiplexed light beams WDM, by diffraction based on the difference of the optical path lengths of the plurality of array waveguides 20, and to direct or distribute the separated optical channels to the input ends of the predetermined output-side waveguides 26, whereby the thus separated optical channels directed to each of the output-side waveguides 26 are multiplexed or combined together. The array waveguides 20, output lens waveguide 28, etc. of the first array waveguide grating AWG1 are designed to have a sufficiently high degree of resolution for separating the optical channels $\lambda_1$ through $\lambda_k$ with a sufficiently high signal intensity. It is noted that the light transmitted through the first array waveguide grating AWG1 in one direction and the light transmitted therethrough in the opposite direction are given mutually reversible effects.

Similarly, the second array waveguide grating AWG2 includes a plurality of array waveguides 30 having respective different optical path lengths, a plurality of input-side waveguides 32 connected to the respective optical connecting waveguides 12, an input lens waveguide 34 disposed between the input-side waveguides 32 and the array waveguides 30, a plurality of output-side waveguides 36 connected to the respective output ports 18, and an output lens waveguide 38 disposed between the output-side waveguides 36 and the array waveguides 30. The second array waveguide grating AWG2 have a sufficiently high degree of resolution corresponding to the wavelengths of the optical channels $\lambda_1$ through $\lambda_k$. As indicated by symbols in FIG. 1 representing the first and second array waveguide gratings AWG1, AWG2, the second array waveguide grating AWG2 performs the same function as described with respect to the first array waveguide grating AWG1 when the direction of optical propagation through the second array waveguide grating AWG2 is opposite to that through the first array waveguide grating AWG1. It will be understood that the points of connection between the output-side waveguides 26 and the optical connecting waveguides 12 are output ports 40 of the first array waveguide grating AWG1, while the points of connection between the optical connecting waveguides 12 and the input-side waveguides 32 are input ports 42 of the second array waveguide grating AWG2. It is noted that the input lens waveguide 24, output lens waveguide 28, input lens waveguide 34 and output lens waveguide 38 are so-called "slab waveguides" in the form of comparatively thick films formed of a transparent material and capable of functioning as lenses.

As shown in FIG. 3, the plurality of optical connecting waveguides 12 connecting the above-described first and second array waveguide gratings AWG1, AWG2 are formed in a plane on the substrate 14, such that the waveguides 12 are parallel to each other, and do not intersect each other. The optical connecting waveguides 12 are formed on the substrate 14, concurrently with the array waveguides 20, 30, input-side waveguides 22, 32 and output-side waveguide 26, 36, in the step of forming the so-called quartz planar lightwave circuits (PLC).

The first array waveguide grating AWG1 and the second array waveguide grating AWG2 are capable of performing demultiplexing and multiplexing functions, with a resolution corresponding to the wavelengths of the optical channels of the wave-division multiplexed light beams, and are configured to have a wavelength separating or demultiplexing function of separating the wavelength-division multiplexed light beam incident upon each one input port into the plurality of optical channels included in the incident light, a characteristic or function of outputting the wavelengths from the output ports such that the output port outputting the same wavelength is sequentially shifted by one position with shifting of the plurality of input ports by one position, and a characteristic of outputting the signals of the plurality of optical channels transmitted through the fiber connected to each one input port such that those signals are outputted from the respective different output ports. The shifting of the output port by one position upon shifting of the input port by one position can be implemented cyclically. This shifting is called "cyclic characteristic of wavelength response". The relationship between the input and output ports is reversible in connection with the direction of optical propagation, so that the array waveguide grating can function as an optical waveband multiplexer when the direction of optical propagation is reversed. Where the first and second array waveguide gratings AWG1, AWG2 have the cyclic characteristic of wavelength response, the array waveguide gratings AWG1, AWG2 have a free spectral range (FSR) equal to or wider than the bandwidth used. That is, the AWG1, AWG2 have a characteristic of outputting the signals of the plurality of optical channels transmitted through one fiber connected to each of the input ports such that the plurality of optical channels spaced apart from each other at a spacing determined by the cyclic characteristic of wavelength response are not concurrently outputted from the same output ports.

FIG. 5 explains at (a) a case in which the first array waveguide grating AGW1, for example, is not capable of implementing the cyclic characteristic of wavelength response, and at (b) a case in which the first array waveguide grating AGW2 is capable of implementing the cyclic characteristic of wavelength response. In the two cases of FIG. 5, the first array waveguide grating AWG1 has a total of five input ports 16 and a total of five output ports 40. When the wavelength-division multiplexed light beams $WDM^A$ through $WDM^E$ each having the optical channels $\lambda_1$ through $\lambda_n$ are incident concurrently upon the respective input ports 16, the wavelength-division multiplexed light beam WDM incident upon each input port 16 is separated into the optical channels. In the case of FIG. 5(a) without the cyclic characteristic of wavelength response, the separated optical channels outputted from the output ports 40 are simply shifted by one channel according to shifting of the output ports 40 by one position. In the case of FIG. 5(b) with the cyclic characteristic of wavelength response, not only the separated optical channels outputted from the output ports 40 are simply shifted by one channel according to shifting of the output ports 40 by one position, but also the optical channels $\lambda_1$ through $\lambda_5$ are cyclically outputted from each of the output ports 40.

The optical channels outputted from each output port 40 are determined according to predetermined rules depending upon the cases of FIG. 5(a) and FIG. 5(b). Namely, the rule in the case of FIG. 5(a) without the cyclic characteristic of wavelength response is represented by the following equation (1), while the rule in the case of FIG. 5(b) with the cyclic characteristic of wavelength response is represented by the following equation (2). Described in detail, where the plurality of input ports 16 upon which the wavelength-division multiplexed light beams $WDM^{\#1}$ through $WDM^{\#N}$ each including the same optical channels $\lambda_1$ through $\lambda_n$ are concurrently incident are represented by numbers A (A=1 through N) while the plurality of output ports 40 are represented by numbers B (B=1 through N), the wavelength of each wave channel outputted from each output port 40 represented by the corresponding number B is represented by the equation (1) in the case without the cyclic characteristic of wavelength response, and by the equation (2) in the case with the cyclic characteristic of wavelength response. A value $\alpha$ mod $\beta$ represents a surplus after dividing $\alpha$ by $\beta$.

$$A+B-1 \qquad (1)$$

$$(A+B-2)_{modN}+1 \qquad (2)$$

In the example of FIG. 5 wherein N=5, one of the optical channels of the wavelength-division multiplexed light beam $WDM^D$ incident upon the input port 16 represented by the number A=4, which one wave channel is outputted from the output port 40 represented by the number B=4, is the wave channel $\lambda_7^D$ in the case without the cyclic characteristic of wavelength response, according to the equation (1), and is the wave channel $\lambda_2^D$ in the case with the cyclic characteristic of wavelength response, according to the equation (2).

Figure 22:
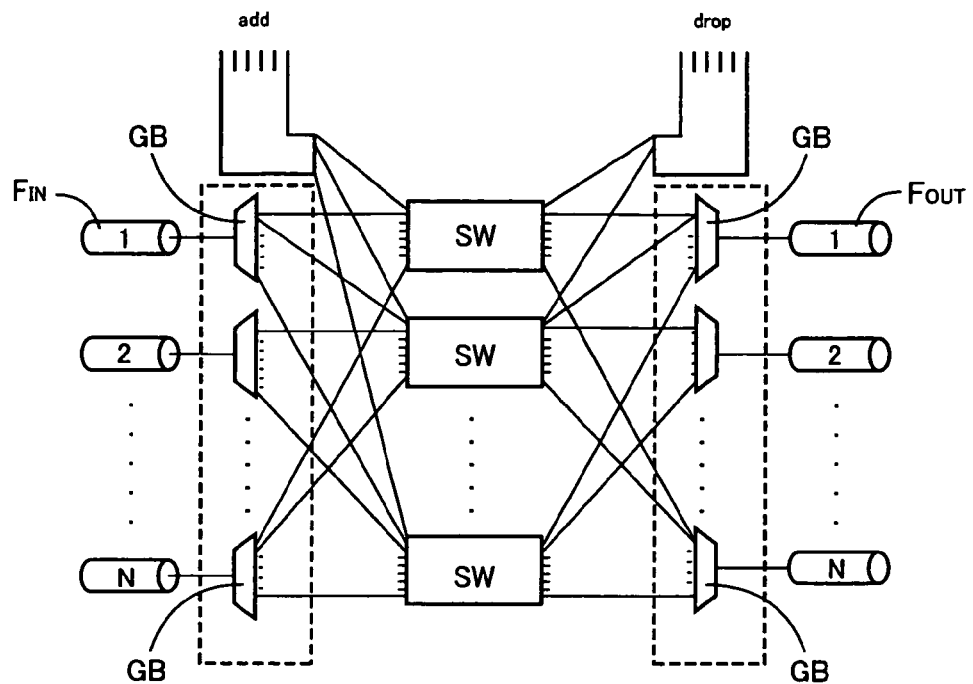
FIG. 22 is a schematic view for explaining an arrangement of a conventional optical waveband multiplexer/demultiplexer.

According to the optical waveband multiplexer/demultiplexer 10 constructed as described above, the wavelength-division multiplexed light beams WDM indicated at (2) in FIG. 2, which are incident upon the input ports 16, are separated into the wavebands WB indicated at (b) through (e), each of which includes a group of predetermined optical channels selected from the multiple optical channels of the wavelength-division multiplexed light beams WDM, and the separated wavebands WB are outputted from the respective output ports 18, and are routed in respective directions by an optical switch disposed at a rear stage of the optical waveband multiplexer/demultiplexer 10. The optical waveband cross-connect switch shown in FIG. 22 by way of example includes an N number of optical waveband multiplexer/demultiplexer units GB (enclosed by broken lines in FIG. 22), which are constituted by multi-layered thin-film interference filters or acouto-optic filters as disclosed in non-patent Documents 1-4 identified above. In the optical waveband multiplexer/demultiplexer 10, the "N" number of optical waveband multiplexer/demultiplexer units GB are replaced by only one optical multiplexer/demultiplexer unit or a plurality of optical multiplexer/demultiplexer units the number of which is smaller than "N". The required number of the multiplexer/demultiplexer units, which is (N+N) in the cross-connect switch of FIG. 22 can be reduced to as small as 2 in the present optical multiplexer/demultiplexer 10 where the light beams are incident upon the optical multiplexer/demultiplexer 10 in one direction, and can be further reduced to as small as 1 where the light beams are incident upon the optical multiplexer/ demultiplexer 10 in two opposite directions as in the case of Embodiment 6 which will be described.

The optical waveband multiplexer/demultiplexer 10 according to the present embodiment of this invention is configured such that the wavelength-division multiplexed light beam WDM is transmitted through the array waveguide gratings AWG1, AWG2 each capable of performing the demultiplexing and multiplexing functions with the resolution corresponding to the wavelengths of the optical channels and having the characteristic of sequentially shifting the output ports by one position with shifting of the input ports 16 by one position, whereby the wavelength-division multiplexed light beam WDM transmitted through the two array waveguide gratings AWG1, AWG2 is separated into the plurality of wavebands WB each including the optical channels selected from the optical channels included in the wave-division multiplexed light beam WDM, and the separated plurality of wavebands WB are respectively outputted concurrently from the plurality of output ports 18. Thus, the optical waveband multiplexer/demultiplexer 10 is considerably simple in construction, and is operable to separate the wavelength-division multiplexed light beam WDM consisting of the plurality of wavebands WB each including a plurality of optical channels, into a predetermined plurality of wavebands, and output the separated plurality of wavebands WB from the respective output ports 18.

The optical waveband multiplexer/demultiplexer 10 according to the present embodiment of this invention is further configured such that the plurality of mutually different wavelength-division multiplexed light beams WDM which are respectively incident upon the plurality of input ports 16 are separated into the optical channels belonging to the wavebands WB included in the multiplexed light beams WDM, and the separated optical channels are multiplexed into the predetermined wavebands WB, which are outputted from the respective different output ports 18. Thus, the optical waveband multiplexer/demultiplexer 10 is considerably simple in construction, and is operable to separate the plurality of wavelength-division multiplexed light beams WDM incident upon the plurality of input ports 16, into a predetermined plurality of wavebands WB, and output the separated plurality of wavebands WB from the respective output ports 18.

The optical waveband multiplexer/demultiplexer 10 according to the present embodiment of this invention comprises the first array waveguide grating AWG1 and second array waveguide grating AWG2, and (c) the optical connecting waveguides 12 which connect the output ports 26 of the first array waveguide grating AWG1 and the input ports 42 of the second array waveguide grating AWG2. With the optical connecting waveguides 12 connecting the two array waveguide gratings AWG1, AWG2, the optical waveband multiplexer/demultiplexer 10 is considerably simple in construction and is operable to separate the plurality of wavelength-division multiplexed light beams WDM incident upon the input port or ports 16, into the predetermined plurality of wavebands WB, and output the separated wavebands WB from the respective output ports 18.

The optical waveband multiplexer/demultiplexer 10 according to the present embodiment of this invention is further configured such that the optical connecting waveguides 12 are formed in a plane, so as not to intersect each other, and so as to establish a predetermined relationship between the first and second array waveguide gratings AWG1, AWG2. The optical connecting waveguides 12 can be easily formed together with the first and second array waveguide gratings AWG1, AWG2, in a plane, for example, as a one-chip monolithic structure on the common substrate 14 formed of a quartz or silicon material.

The optical waveband multiplexer/demultiplexer 10 according to the present embodiment of this invention is further configured such that each of the first array waveguide grating AWG1 and the second array waveguide grating AWG2 comprises the plurality of array waveguides 20, 30 having the respective different optical path lengths, the input lens waveguide 24, 34 for distributing the incident wavelength-division multiplexed light beam to the input-side ends of the plurality of array waveguides, 20, 30 respectively, and the output lens waveguide 28, 38 for separating the wavelength-division multiplexed light beam outputted from output-side ends of the plurality of array waveguides 20, 30, into the plurality of optical channels included in the wavelength-division multiplexed light beam outputted from the output-side ends of the array waveguides 20, 30, on the basis of a difference of the optical path lengths of the array waveguides 20, 30, and for distributing the plurality of optical channels to the predetermined respective output ports. For example, the array waveguide gratings AWG1, AWG2 can be easily formed as a monolithic structure of a so-called silica-based waveguide planar lightwave circuit (PLC) formed of a quartz material on the substrate 14, in a desired pattern of cladding and core.

While the function of the optical waveband multiplexer/demultiplexer 10 operating as a demultiplexer has been described above, the optical waveband multiplexer/demultiplexer 10 can also function as a multiplexer when the light is transmitted through the optical multiplexer/demultiplexer 10 in the direction opposite to the direction of the light transmission described above with respect to the function as the demultiplexer, since the propagation of light is reversible. In this case, the output ports 18 and the input ports 16 of the optical waveband multiplexer/demultiplexer 10 of FIG. 3 respectively function as input ports and output ports, and the second array waveguide grating AWG2 function as a first array waveguide grating while the first array waveguide grating AWG1 function as a second array waveguide grating. Where the optical multiplexer/demultiplexer 10 functions as the multiplexer, the output signals in the form of the plurality of wavebands WB described above are incident upon the input ports (output ports 18), and the wavelength-division multiplexed light beam WDM consisting of the predetermined wavebands WB is outputted from the output ports (input ports 16). Where the optical multiplexer/demultiplexer 10 is used as the multiplexer, it has the same advantages as described above.

Then, other arrangements and examples of the optical waveband multiplexer/demultiplexer 10 will be described. In the following explanation, the same reference signs will be used to identify the elements which are common to the different embodiments.

Embodiment 2

Figure 6:
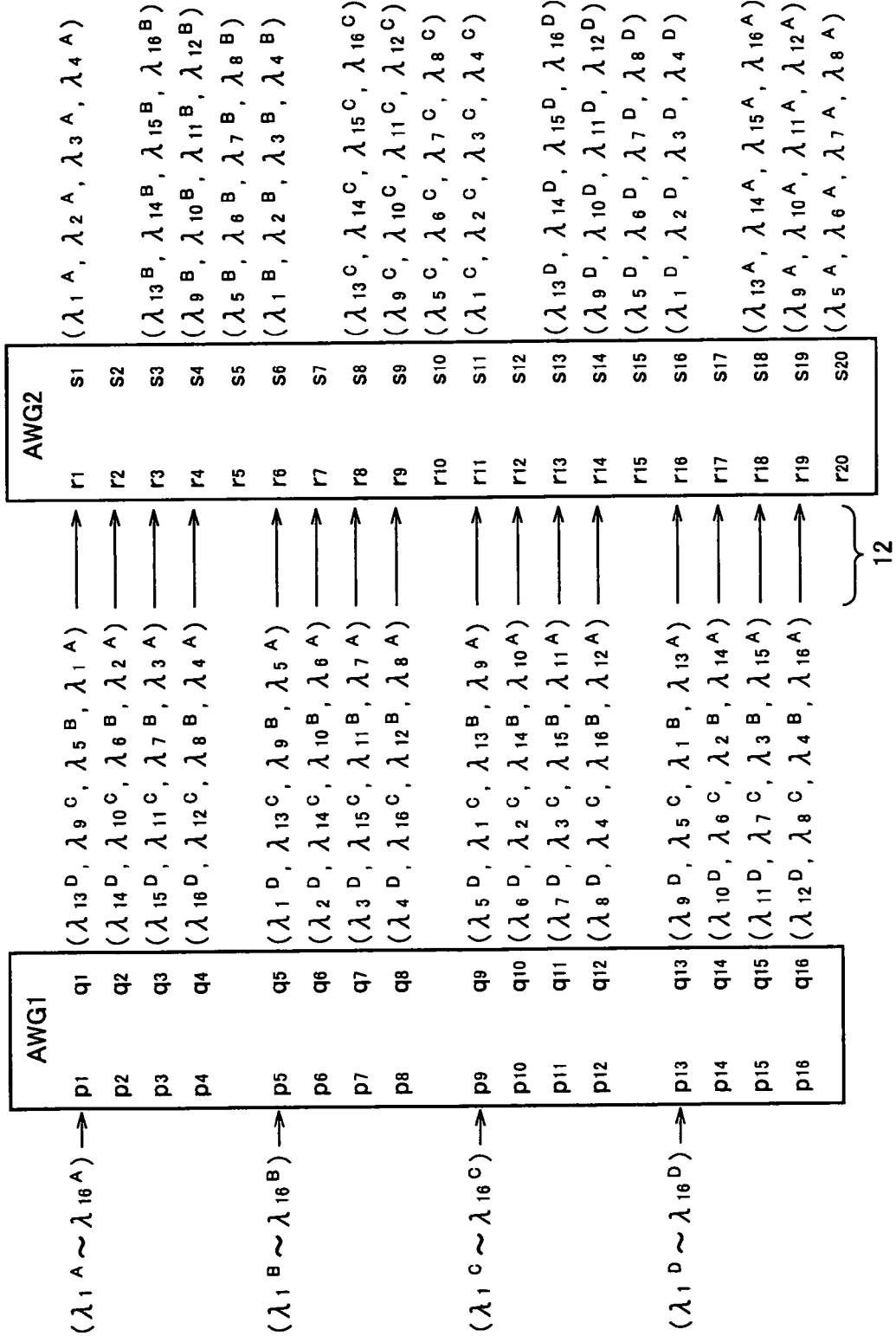
FIG. 6 is a view for explaining input and output characteristics of an optical waveband multiplexer/demultiplexer according to Embodiment 2 of the present invention, which is provided with a first array waveguide grating AWG1 and a second array waveguide grating AWG2 which have cyclic characteristic of wavelength response.

FIG. 6 explains the demultiplexing function of the optical waveband multiplexer/demultiplexer 10 performed when four wavelength-division multiplexed light beams $WDM^A$ through $WDM^D$ which are transmitted through respective four input fibers $F_{IN}$ and each of which includes 16 optical channels $\lambda_1$ through $\lambda_{16}$ are incident upon the optical multiplexer/demultiplexer 10. The optical multiplexer/demultiplexer 10 includes the first array waveguide grating AWG1 and the second array waveguide grating AWG2. The first array waveguide grating AWG1 has 16 input ports $p_1$-$p_{16}$ and 16 output ports $q_1$-$q_{16}$ both corresponding to the 16 optical channels and has a cyclic characteristic of wavelength response, while the second array waveguide grating AWG2 has 20 input ports $r_1$-$r_{20}$ and 20 output ports $s_1$-$s_{20}$, the number of which is larger by four than the number of the optical channels. The second array waveguide grating AWG2 has also a cyclic characteristic of wavelength response. In the present optical waveband multiplexer/demultiplexer 10, the optical connecting waveguides 12 connect the output ports $q_1$-$q_{16}$ of the first array waveguide grating AWG1 to the input ports $r_1$-$r_4$, $r_6$-$r_9$, $r_{11}$-$r_{14}$, and $r_{16}$-$r_{19}$ of the second array waveguide grating AWG2, in a plane, such that the optical connecting waveguides 12 do not intersect each other. The input ports $r_5$, $r_{10}$, $r_{15}$, $r_{20}$, and the output ports $s_2$, $s_7$, $s_{12}$, $s_{17}$ of the second array waveguide grating AWG2 are not used.

When the first wavelength-division multiplexed light beam $WDM^A$ (optical channels $\lambda_1^A$ through $\lambda_{16}^A$), the second wavelength-division multiplexed light beam $WDM^B$ (optical channels $\lambda_1^B$ through $\lambda_{16}^B$), the third wavelength-division multiplexed light beam $WDM^C$ (optical channels $\lambda_1^C$ through $\lambda_{16}^C$), and the fourth wavelength-division multiplexed light beam $WDM^D$ (optical channels $\lambda_1^D$ through $\lambda_{16}^D$) are incident upon the input ports $p_1$, $p_5$, $p_9$ and $p_{13}$, respectively, these four wavelength-division multiplexed light beams $WDM^A$ through $WDM^D$ are transmitted through the first array waveguide grating AWG1 and the second array waveguide grating AWG2, and four groups of wavebands WB are outputted from the respective output ports $s_{18}$-$s_1$. $s_3$-$s_6$, $s_5$-$s_{11}$, $s_{13}$-$s_{16}$ of the second array waveguide grating AWG2, as indicated at (b) and (c) in FIG. 2. Each of the four groups of wavebands WB is included in the corresponding incident wavelength-division multiplexed light beam WDM, and each waveband WB includes four optical channels which are successively spaced apart from each other at a spacing of 100 GHz along an axis of wavelength. The four waveband groups WB consist of a group of wavebands WB4(A)-WB1(A), a group of wavebands WB4(B)-WB1(B), a group of wavebands WB4(C)-WB1(C) and a group of wavebands WB4(D)-WB1(D). For example, each of the four wavebands WB1(A)-WB4(A) includes a portion of the wavelengths (four optical channels) included in the first wavelength-division multiplexed light beam $WDM^A$. The waveband WB1(A) includes the four optical channels $\lambda_1^A$-$\lambda_4^A$, waveband WB2(A) includes the four optical channels $\lambda_5^A$-$\lambda_8^A$, waveband WB3(A) includes the four optical channels $\lambda_9^A$-$\lambda_{12}^A$, and waveband WB4(A) includes the four optical channels $\lambda_{13}^A$-$\lambda_{16}^A$.

A relationship of connection between the output ports $q_1$-$q_{16}$ and the input ports $r_1$-$r_4$, $r_6$-$r_9$, $r_{11}$-$r_{14}$, $r_{16}$-$r_{19}$ of the optical connecting waveguides 12 is represented by the following general equation (3). Further, the position of connection of the input fibers $F_{IN}$ is represented by the following equation (4). In the equation (3), "i" represents an integer indicative of the position of the input port, and "D" represents an integer indicative the number of optical channels of one waveband, while a numerical value within [ ] represents an integer indicative of a sealing or maximum number. Further, $1 \leq r_i \leq m+B$, while k=0 or 1. In the equation (3), "B" represents the number of the wavebands, $1 \leq r_i \leq A$, j=1, 2, ..., and k=1, 2, .... In the equation (4), "B" represents the number of the wavebands, $1 \leq p_i \leq m$, while t=0, 1, 2, ... B−1.

$$r_i = q_0 + j \times [(q_0 - 1)/D] + k \quad (3)$$

(where, $k+j(B-1)+m \leq A$)

$$p_i = 1 \cdot t \times D \quad (4)$$

Although the present Embodiment 2 uses the first array waveguide grating AWG1 having the "m" number of input ports p and "m" number of output ports q, and the second array waveguide grating AWG2 having the "m+B" number of input ports r and the "m+B" number of output ports s, the second array waveguide grating AWG2 may use "m+2B" number of input ports r and the "m+2B number of output ports s, or the "m+3B" number of input ports r and the "m+3B" number of output ports s, provided that the optical connecting waveguides 12 do not intersect each other. Further, the number of the input ports r and the output ports s may be any other number generally represented by "m+(positive integer)×B". Where the optical connecting waveguides 12 intersect each other, various relations of connection are possible with respect to the optical connecting waveguides 12.

The optical waveband multiplexer/demultiplexer 10 according to the present Embodiment 2 has not only the advantages described above with respect to the preceding embodiment, but also an additional advantage that the wavebands each including the optical channels successively spaced apart from each other along the axis of wavelength are outputted from the respective output ports 18.

Where the optical waveband multiplexer/demultiplexer 10 of FIG. 6 according to the Embodiment 2 is used as the optical waveband multiplexer, the four groups of wavebands WB each including the four optical channels successively spaced apart from each other at the spacing of 100 GHz along the axis of the wavelength are incident upon the output ports $s_{18}$-$s_1$. $s_3$-$s_6$, $s_8$-$s_{11}$. $s_{13}$-$s_{16}$ of the second array waveguide grating AWG2, and are transmitted through the second array waveguide grating AWG2 and then through the first array waveguide grating AWG1, so that the wavebands WB are multiplexed into predetermined combinations, whereby the first wavelength-division multiplexed light beam $WDM^A$ (optical channels $\lambda_1^A$-$\lambda_{16}^A$), second wavelength-division multiplexed light beam $WDM^B$ (optical channels $\lambda_1^B$-$\lambda_{16}^B$), third wavelength-division multiplexed light beam $WDM^C$ (optical channels $\lambda_1^C$-$\lambda_{16}^C$), and fourth wavelength-division multiplexed light beam $WDM^D$ (optical channels $\lambda_1^D$-$\lambda_{16}^D$) are outputted from the respective input ports $p_1$. $p_5$. $p_9$ and $p_{13}$ of the first array waveguide grating AWG1.

Embodiment 3

Figure 7:
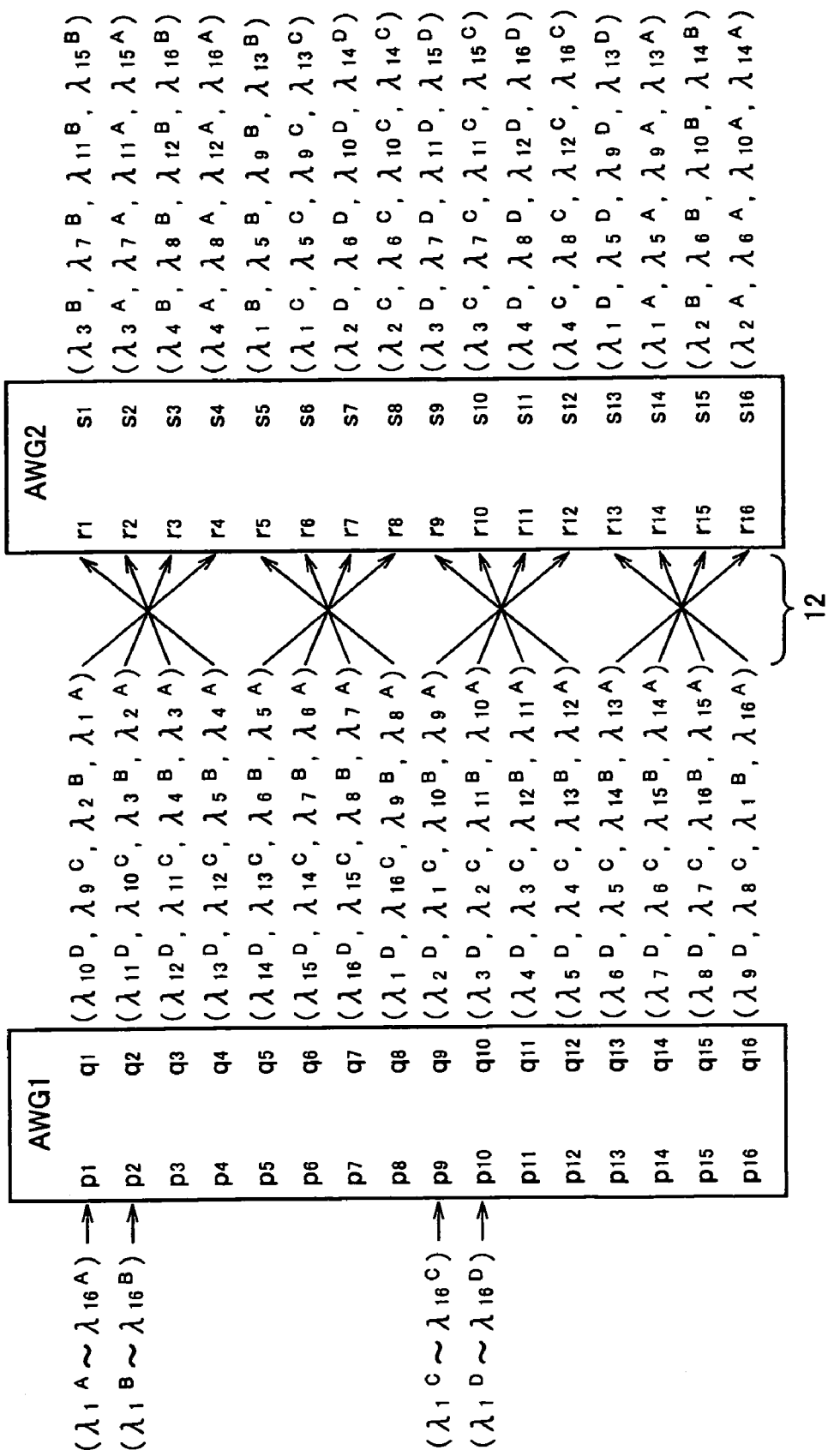
FIG. 7 is a view for explaining input and output characteristics of an optical waveband multiplexer/demultiplexer according to Embodiment 3 of the present invention.

FIG. 7 explains the demultiplexing function of the optical waveband multiplexer/demultiplexer 10 performed when four wavelength-division multiplexed light beams $WDM^A$ through $WDM^D$ which are transmitted through respective four input fibers $F_{IN}$ and each of which includes 16 optical channels $\lambda_1$ through $\lambda_{16}$ are incident upon the optical multiplexer/demultiplexer 10. The optical multiplexer/demultiplexer 10 includes the first array waveguide grating AWG1 and the second array waveguide grating AWG2. The first array waveguide grating AWG1 has 16 input ports $p_1$-$p_{16}$ and 16 output ports $q_1$-$q_{16}$ both corresponding to the 16 optical channels and has cyclic characteristic of wavelength response, and the second array waveguide grating AWG2 also has 16 input ports $r_1$-$r_{16}$ and 16 output ports $s_1$-$s_{16}$. The second array waveguide grating AWG2 has also a cyclic characteristic of wavelength response. In the present optical waveband multiplexer/demultiplexer 10, the optical connecting waveguides 12 are optical fibers or three-dimensional optical waveguides having a cross-over structure, or waveguides which intersect each other in a plane but are fabricated to reduce a cross-talk among the waveguides to a value not higher than an upper limit. The optical connecting waveguides 12 connect the output ports $q_1$-$q_4$, $q_5$-$q_8$, $q_9$-$q_{12}$, and $q_{13}$-$q_{16}$ of the first array waveguide grating AWG1 to the input ports $r_4$-$r_1$, $r_8$-$r_5$, $r_{12}$-$r_9$ and $r_{16}$-$r_{13}$ of the second array waveguide grating AWG2, such that the optical connecting waveguides 12 intersect each other. All of the input ports and output ports of the second array waveguide grating AWG2 are used.

When the first wavelength-division multiplexed light beam $WDM^A$ (optical channels $\lambda_1^A$ through $\lambda_{16}^A$), the second wavelength-division multiplexed light beam $WDM^B$ (optical channels $\lambda_1^B$ through $\lambda_{16}^B$), the third wavelength-division multiplexed light beam $WDM^C$ (optical channels $\lambda_1^C$ through $\lambda_{16}^C$), and the fourth wavelength-division multiplexed light beam $WDM^D$ (optical channels $\lambda_1^D$ through $\lambda_{16}^D$) are incident upon the input ports $p_1$, $p_2$, $p_9$ and $p_{10}$, respectively, these four wavelength-division multiplexed light beams $WDM^A$ through $WDM^D$ are transmitted through the first array waveguide grating AWG1 and the second array waveguide grating AWG2, and four groups of wavebands WB are outputted from the respective output ports ($s_2$, $s_4$, $s_{14}$, $s_{16}$), ($s_1$, $s_3$, $s_5$, $s_{15}$), ($s_6$, $s_8$, $s_{10}$, $s_{12}$) and ($s_7$, $s_9$, $s_{11}$, $s_{13}$), as indicated at (d) and (e) in FIG. 2. Each of the four groups of wavebands WB is included in the corresponding incident wavelength-division multiplexed light beam WDM, and each waveband WB includes four optical channels which are non-successively spaced apart from each other at a spacing of 400 GHz along an axis of wavelength.

Where the optical waveband multiplexer/demultiplexer 10 according to the Embodiment 3 of FIG. 7 is used as the optical waveband multiplexer, the four groups of wavebands WB each including the four optical channels non-successively spaced apart from each other at the spacing of 400 GHz along the axis of the wavelength are incident upon the output ports ($s_2$, $s_4$, $s_{14}$, $s_{16}$), ($s_1$, $s_3$, $s_5$, $s_{15}$), ($s_6$, $s_8$, $s_{10}$, $s_{12}$) and ($s_7$, $s_9$, $s_{11}$, $s_{13}$) of the second array waveguide grating AWG2, and are transmitted through the second array waveguide grating AWG2 and then through the first array waveguide grating AWG1, so that the wavebands WB are multiplexed into predetermined combinations, whereby the first wavelength-division multiplexed light beam $WDM^A$ (optical channels $\lambda_1^A$-$\lambda_{16}^A$), second wavelength-division multiplexed light beam $WDM^B$ (optical channels $\lambda_1^B$-$\lambda_{16}^B$), third wavelength-division multiplexed light beam $WDM^C$ (optical channels $\lambda_1^C$-$\lambda_{16}^C$), and fourth wavelength-division multiplexed light beam $WDM^D$ (optical channels $\lambda_1^D$-$\lambda_{16}^D$) are outputted from the respective input ports $p_1$, $p_2$, $p_9$ and $p_{10}$ of the first array waveguide grating AWG1.

Embodiment 4

Figure 8:
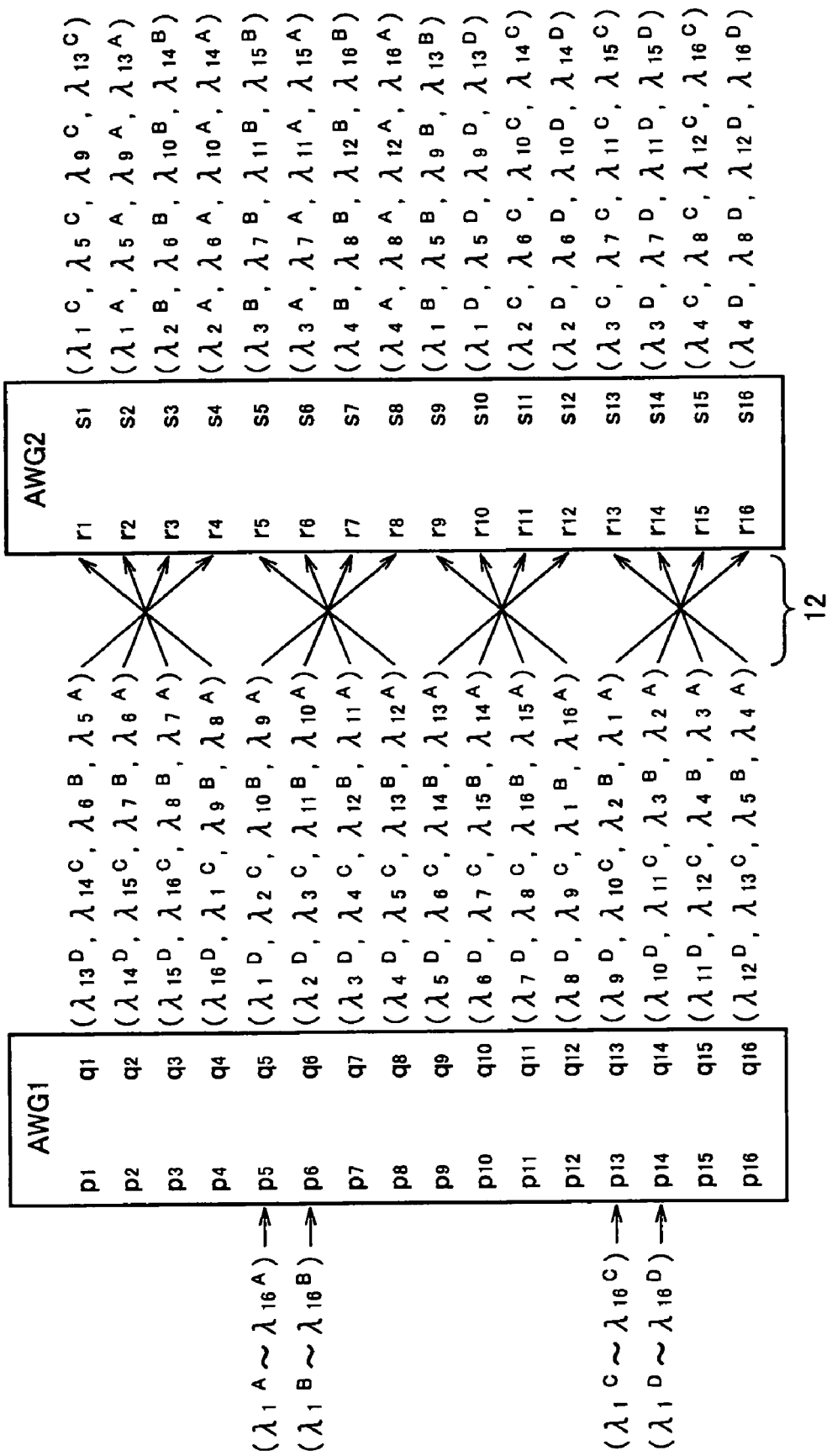
FIG. 8 is a view for explaining input and output characteristics of an optical waveband multiplexer/demultiplexer according to Embodiment 4 of the present invention.

FIG. 8 explains the demultiplexing function of the optical waveband multiplexer/demultiplexer 10 performed when four wavelength-division multiplexed light beams $WDM^A$ through $WDM^D$ which are transmitted through respective four input fibers $F_{IN}$ and each of which includes 16 optical channels $\lambda_1$ through $\lambda_{16}$ are incident upon the optical multiplexer/demultiplexer 10. The optical multiplexer/demultiplexer 10 includes the first array waveguide grating AWG1 and the second array waveguide grating AWG2. The first array waveguide grating AWG1 has 16 input ports $p_1$-$p_{16}$ and 16 output ports $q_1$-$q_{16}$ both corresponding to the 16 optical channels and has a cyclic characteristic of wavelength response, and the second array waveguide grating AWG2 also has 16 input ports $r_1$-$r_{16}$ and 16 output ports $s_1$-$s_{16}$. The second array waveguide grating AWG2 has also a cyclic characteristic of wavelength response. In the present optical waveband multiplexer/demultiplexer 10, the optical connecting waveguides 12 are optical fibers or three-dimensional optical waveguides having a cross-over structure, or waveguides which intersect each other in a plane but are fabricated to reduce a cross-talk among the waveguides to a value not higher than an upper limit. The optical connecting waveguides 12 connect the output ports $q_1$-$q_4$, $q_5$-$q_8$, $q_9$-$q_{12}$ and $q_{13}$-$q_{16}$ of the first array waveguide grating AWG1 to the input ports $r_4$-$r_1$, $r_8$-$r_5$, $r_{12}$-$r_9$ and $r_{16}$-$r_{13}$ of the second array waveguide grating AWG2, such that the optical connecting waveguides 12 intersect each other. All of the input ports and output ports of the second array waveguide grating AWG2 are used.

When the first wavelength-division multiplexed light beam $WDM^A$ (optical channels $\lambda_1^A$ through $\lambda_{16}^A$), the second wavelength-division multiplexed light beam $WDM^B$ (optical channels $\lambda_1^B$ through $\lambda_{16}^B$), the third wavelength-division multiplexed light beam $WDM^C$ (optical channels $\lambda_1^C$ through $\lambda_{16}^C$), and the fourth wavelength-division multiplexed light beam $WDM^D$ (optical channels $\lambda_1^D$ through $\lambda_{16}^D$) are incident upon the input ports $p_5$, $p_6$, $p_{13}$ and $p_{14}$, respectively, these four wavelength-division multiplexed light beams $WDM^A$ through $WDM^D$ are transmitted through the first array waveguide grating AWG1 and the second array waveguide grating AWG2, and four groups of wavebands WB are outputted from the respective output ports ($s_2$, $s_4$, $s_6$, $s_8$), ($s_3$, $s_5$, $s_7$, $s_9$), ($s_1$, $s_{11}$, $s_{13}$, $s_{15}$) and ($s_{10}$, $s_{12}$, $s_{14}$, $s_{16}$) of the second array waveguide grating AWG2, as indicated at (d) and (e) in FIG. 2. Each of the four groups of wavebands WB is included in the corresponding incident wavelength-division multiplexed light beam WDM, and each waveband WB includes four optical channels which are non-successively spaced apart from each other at a spacing of 400 GHz along an axis of wavelength.

A relationship of connection between the output ports $q_1$-$q_{16}$ and the input ports $r_1$-$r_{16}$ of the optical connecting waveguides 12 in the above-described Embodiments 3 and 4 is represented by the following general equation (5). Further, the position of connection of the input fibers $F_{IN}$ is represented by the following equation (6). In the equation (5), "i" represents an integer indicative of the position of the input port, and "D" represents an integer indicative the number of optical channels of one waveband, while a numerical value within [ ] represents an integer indicative of a sealing or maximum number. Further, $1 \leq r_i \leq m$, while k=0, 1, 2, ..., m−1, In the equation (6), "B" represents the number of the wavebands, $1 \leq p_i \leq m$, while t=0, 1, 2, ...

$$r_i = \langle B \times \{2 \times [(q_0-1)/B]+1\} - q_0 + k \rangle_{mod\,m} + 1 \quad (5)$$

$$p_i = \langle 2tB + \alpha \rangle_{mod\,m} + 1 \langle 2tB + \alpha + Z \rangle_{mod\,m} + 1 \quad (6)$$

where, Z=1, 3, 5, ... 2B−1

α=1, 2, 3, ... 2B−1

The present Embodiment 4 wherein the optical connecting waveguides 12 in the form of a plurality of waveguides intersect each other uses the first array waveguide grating AWG1 having the "m" number of input ports p and "m" number of output ports q, and the second array waveguide grating AWG2 having the "m" number of input ports r and the "m" number of output ports s. However, the second array waveguide grating AWG2 may use "m+B" number of input ports r and the "m+B" number of output ports s, or the "m+2B" number of input ports r and the "m+2B number of output ports s, provided that the optical connecting waveguides 12 intersect each other. Further, the number of the input ports r and output ports s may be any other number generally represented by "m+(positive integer)×B".

Where the optical waveband multiplexer/demultiplexer 10 according to the Embodiment 4 of FIG. 8 is used as the optical waveband multiplexer, the four groups of wavebands WB each including the four optical channels non-successively spaced apart from each other at the spacing of 400 GHz along the axis of the wavelength are incident upon the output ports ($s_2$, $s_4$, $s_6$, $s_8$), ($s_3$, $s_5$, $s_7$, $s_9$), ($s_1$, $s_{11}$, $s_{13}$, $s_{15}$) and ($s_{10}$, $s_{12}$, $s_{14}$, $s_{16}$) of the second array waveguide grating AWG2, and are transmitted through the second array waveguide grating AWG2 and then through the first array waveguide grating AWG1, so that the wavebands WB are multiplexed into predetermined combinations, whereby the first wavelength-division multiplexed light beam $WDM^A$ (optical channels $\lambda_1^A$-$\lambda_{16}^A$), second wavelength-division multiplexed light beam $WDM^B$ (optical channels $\lambda_1^B$-$\lambda_{16}^B$), third wavelength-division multiplexed light beam $WDM^C$ (optical channels $\lambda_1^C$-$\lambda_{16}^C$), and fourth wavelength-division multiplexed light beam $WDM^D$ (optical channels $\lambda_1^D$-$\lambda_{16}^D$) are outputted from the respective input ports $p_5$, $p_6$, $p_{13}$ and $p_{14}$ of the first array waveguide grating AWG1.

The optical waveband multiplexer/demultiplexer 10 according to the Embodiment 3 and Embodiment 4 has not only the advantages described above with respect to the preceding embodiments, but also an additional advantage that the size of the optical waveband multiplexer/demultiplexer can be further reduced, owing to the provision of the input and output ports the number of which is equal to the number of the optical channels included in the wavelength-division multiplexed light beam WDM.

In addition, the optical waveband multiplexer/demultiplexer 10 according to the Embodiment 3 and Embodiment 4 permits multiplexing of the wavebands WB each of which includes the optical channels non-successively spaced apart from each other along the axis of the wavelength, as indicated at (d) and (e) in FIG. 2 and which are outputted from the output ports 18.

Embodiment 5

Figure 9:
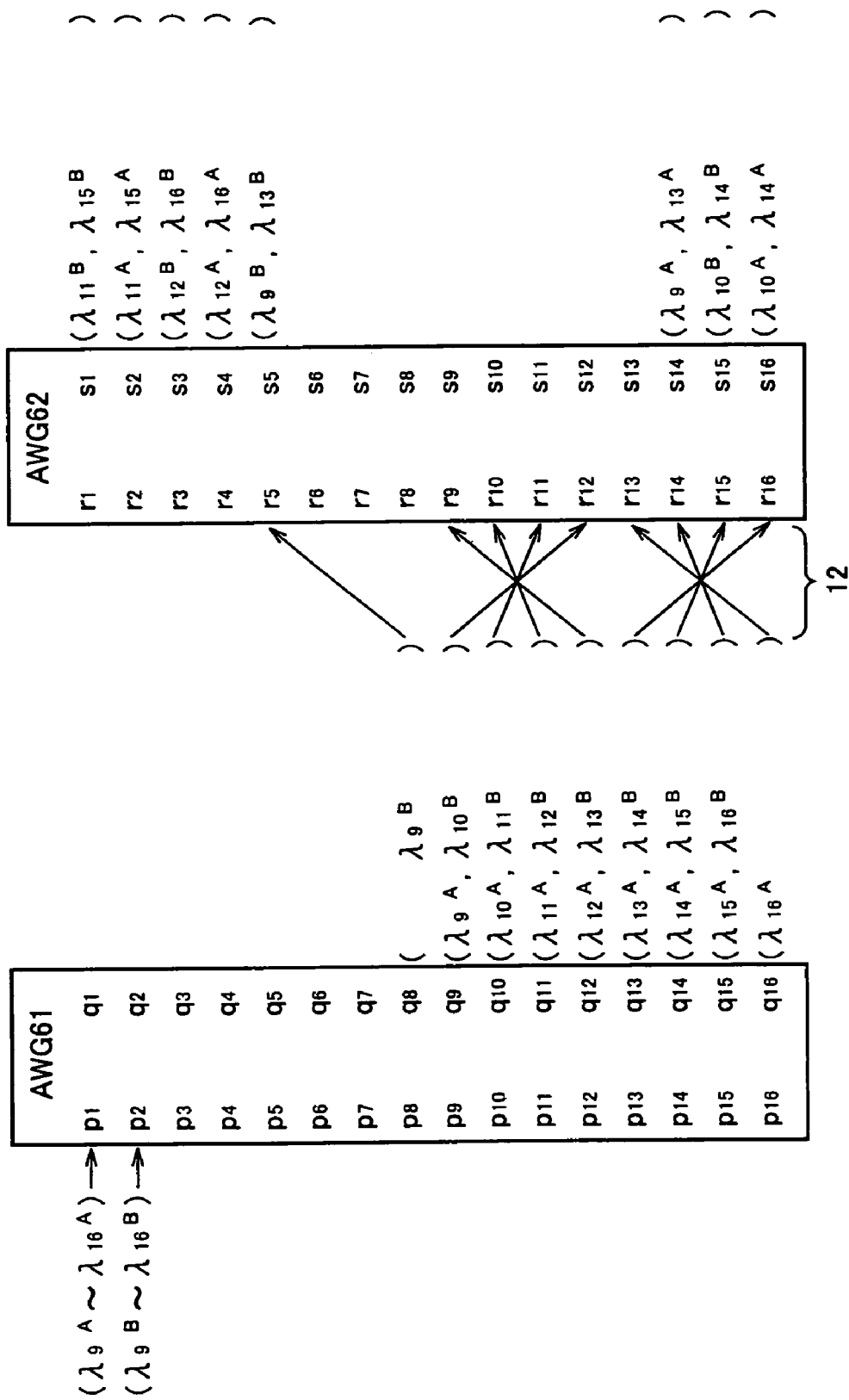
FIG. 9 is a view for explaining input and output characteristics of an optical waveband multiplexer/demultiplexer according to Embodiment 5 of the present invention, which is provided with a first array waveguide grating AWG1 and a second array waveguide grating AWG2 which do not have cyclic characteristic of wavelength response.

FIG. 9 explains the demultiplexing function of the optical waveband multiplexer/demultiplexer 10 performed when four wavelength-division multiplexed light beams $WDM^A$ through $WDM^D$ which are transmitted through respective four input fibers $F_{IN}$ and each of which includes 16 optical channels $\lambda_1$ through $\lambda_{16}$ are incident upon the optical multiplexer/demultiplexer 10. The optical multiplexer/demultiplexer 10 includes the first array waveguide grating AWG1 and the second array waveguide grating AWG2. The first array waveguide grating AWG1 has 16 input ports $p_1$-$p_{16}$ and 16 output ports $q_1$-$q_{16}$ both corresponding to the 16 optical channels and does not have a cyclic characteristic of wavelength response, and the second array waveguide grating AWG2 also has 16 input ports $r_1$-$r_{16}$ and 16 output ports $s_1$-$s_{16}$. The second array waveguide grating AWG2 does not have a cyclic characteristic of wavelength response, either. In the present optical waveband multiplexer/demultiplexer 10, the optical connecting waveguides 12 are optical fibers or three-dimensional optical waveguides having a cross-over structure, or waveguides which intersect each other in a plane but are fabricated to reduce a cross-talk among the waveguides to a value not higher than an upper limit. The optical connecting waveguides 12 connect the output port $q_8$ of the first array waveguide grating AWG1 to the input port $r_5$ of the second array waveguide grating AWG2, and connect the output ports $q_9$-$q_{12}$ and $q_{13}$-$q_{16}$ of the first array waveguide grating AWG1 to the input ports $r_{12}$-$r_9$ and $r_{16}$-$r_{13}$ of the second array waveguide grating AWG2 such that the optical connecting waveguides 12 intersect each other. The output ports $q_1$-$q_7$ of the first array waveguide grating AWG1 and the input ports $r_1$-$r_4$, $r_6$-$r_8$ and the output ports $s_6$-$s_{13}$ of the second array waveguide grating AWG2 are not used.

When the first wavelength-division multiplexed light beam $WDM^A$ (optical channels $\lambda_1^A$ through $\lambda_{16}^A$) and the second wavelength-division multiplexed light beam $WDM^B$ (optical channels $\lambda_1^B$ through $\lambda_{16}^B$) are incident upon the input ports $p_1$ and $p_2$, respectively, these two wavelength-division multiplexed light beams $WDM^A$ and $WDM^B$ are transmitted through the first array waveguide grating AWG1 and the second array waveguide grating AWG2, and four groups of wavebands WB are outputted from the output ports ($s_2$, $s_4$, $s_{14}$, $s_{16}$) and ($s_1$ $s_3$, $s_5$, $s_{15}$), as indicated at (d) and (e) in FIG. 2. Each of the four groups of wavebands WB is included in the corresponding incident wavelength-division multiplexed light beam WDM, and each waveband WB includes four optical channels which are non-successively spaced apart from each other at a spacing of 400 GHz along an axis of wavelength.

Where the optical waveband multiplexer/demultiplexer 10 according to the Embodiment 5 of FIG. 9 is used as the optical waveband multiplexer, the two groups of wavebands WB each including the optical channels non-successively spaced apart from each other at the spacing of 400 GHz along the axis of the wavelength are incident upon the output ports ($s_2$, $s_4$, $s_{14}$, $s_{16}$) and ($s_1$, $s_3$, $s_5$, $s_{15}$) of the second array waveguide grating AWG2, and are transmitted through the second array waveguide grating AWG2 and then through the first array waveguide grating AWG1, so that the wavebands WB are multiplexed into predetermined combinations, whereby the two wavelength-division multiplexed light beams WDM each consisting of the two optical channels selected from the actually used optical channels of the first wavelength-division multiplexed light beam $WDM^A$(optical channels $\lambda_1^A$-$\lambda_{16}^A$) and the second wavelength-division multiplexed light beam $WDM^B$ (optical channels $\lambda_1^A$-$\lambda_{16}^A$) are outputted from the respective input ports $p_1$ and $p_2$ of the first array waveguide grating AWG1.

Embodiment 6

Figure 10:
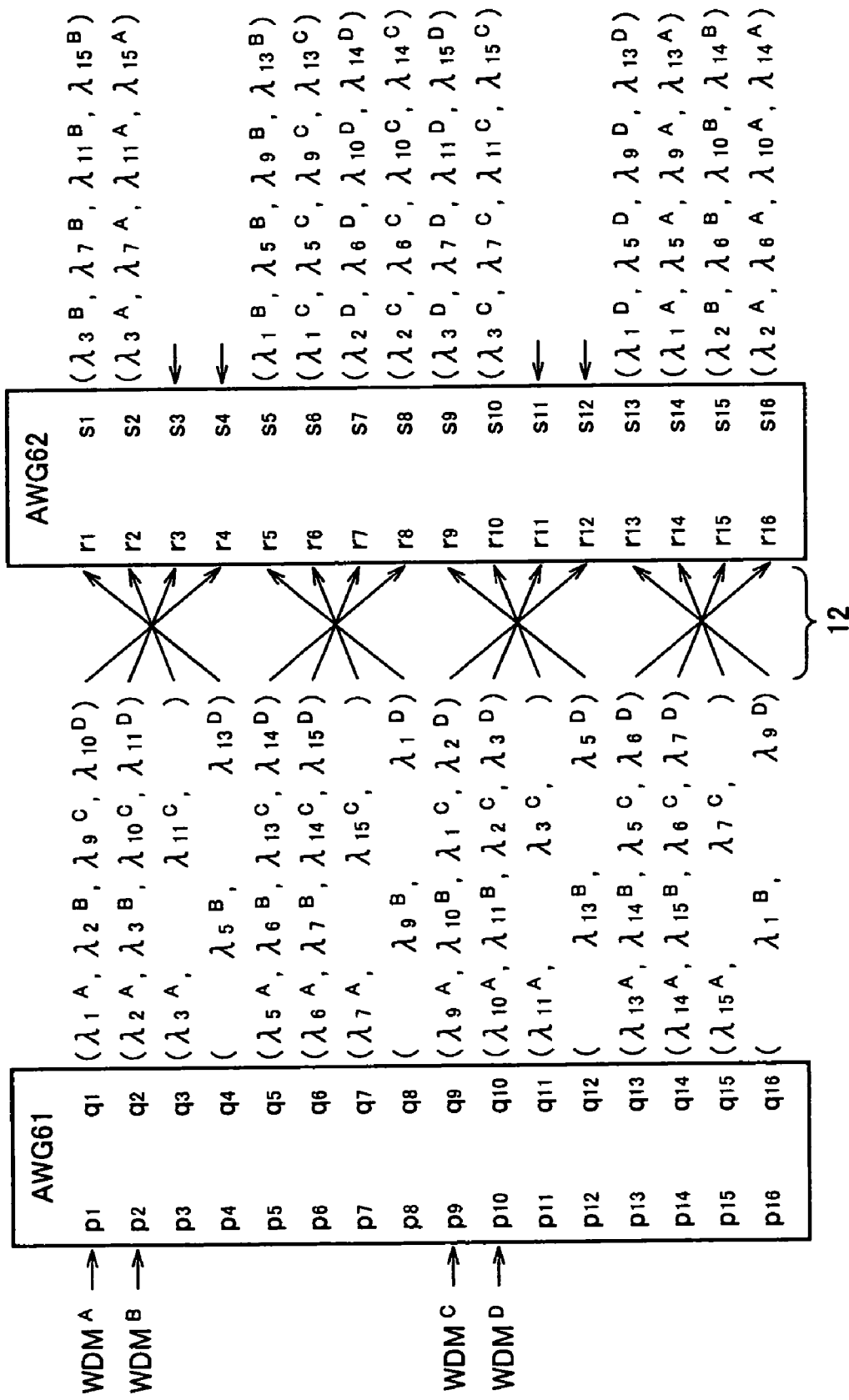
FIG. 10 is a view for explaining input and output characteristics of a bidirectional optical waveband multiplexer/demultiplexer according to Embodiment 6 of the present invention, which characteristics are exhibited when the optical multiplexer/demultiplexer functions as a demultiplexer in one direction of optical incidence.
Figure 11:
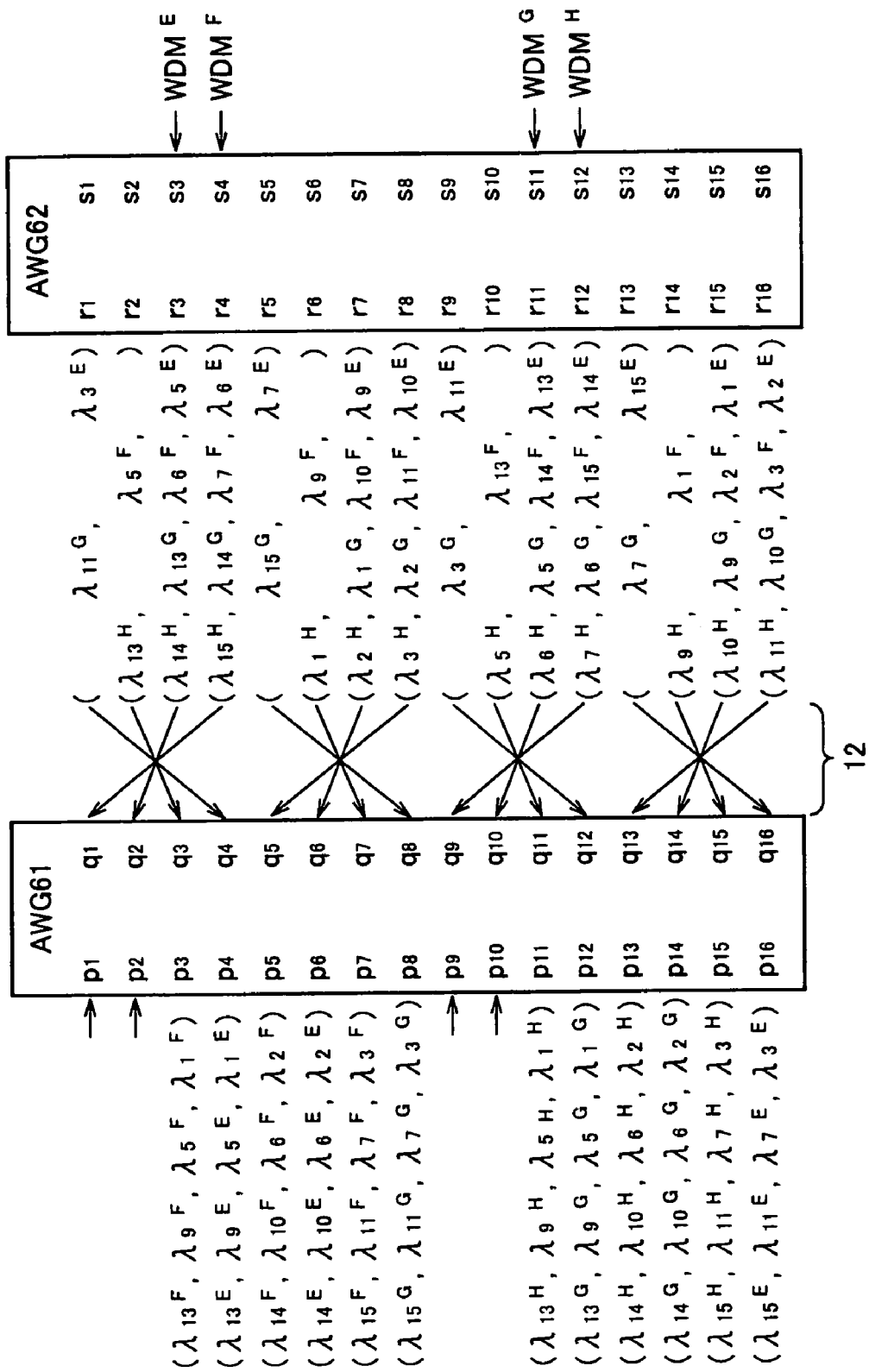
FIG. 11 is a view for explaining input and output characteristics of the bidirectional optical waveband multiplexer/demultiplexer according to the Embodiment 6, which characteristics are exhibited when the optical multiplexer/demultiplexer functions as the demultiplexer in the opposite direction of optical incidence.

FIGS. 10 and 11 respectively explain the demultiplexing function of the optical waveband multiplexer/demultiplexer 10 performed when four wavelength-division multiplexed light beams $WDM^A$ through $WDM^D$ which are transmitted through respective four input fibers $F_{IN}$ and each of which includes 12 optical channels $\lambda_1$-$\lambda_3$, $\lambda_5$-$\lambda_7$, $\lambda_9$-$\lambda_{11}$ and $\lambda_{13}$-$\lambda_{15}$ are incident upon the first and second array waveguide gratings AWG1, AWG2 of the optical multiplexer/demultiplexer 10, and the demultiplexing function concurrently performed when four wavelength-division multiplexed light beams $WDM^E$ through $WDM^H$ which are transmitted through respective four input fibers $F_{IN}$ and each of which includes 12 optical channels $\lambda_1$-$\lambda_3$, $\lambda_5$-$\lambda_7$, $\lambda_9$-$\lambda_{11}$ and $\lambda_{13}$-$\lambda_{15}$ are incident upon the second and first array waveguide gratings AWG2, AWG1, in the reverse direction. These demultiplexing functions are concurrently performed while the four wavelength-division multiplexed light beams $WDM^A$ through $WDM^D$ and the four wavelength-division multiplexed light beams $WDM^E$ through $WDM^H$ are bidirectionally and concurrently incident upon the multiplexer/demultiplexer 10. The first array waveguide grating AWG1 has 16 input ports $P_1$-$P_{16}$ and 16 output ports $q_1$-$q_{16}$ both corresponding to the 16 optical channels and has a cyclic characteristic of wavelength response, and the second array waveguide grating AWG2 also has 16 input ports $r_1$-$r_{16}$ and 16 output ports $s_1$-$s_{16}$ and has also a cyclic characteristic of wavelength response. To explain the present optical waveband multiplexer/demultiplexer 10 capable of performing the demultiplexing functions when the wavelength-division multiplexed light beams are bidirectionally incident, FIG. 10 shows the four wavelength-division multiplexed light beams WDM$^A$ through WDM$^D$ incident upon the input ports of the first array waveguide grating AWG1 in one of the opposite directions, while FIG. 11 shows the four wavelength-division multiplexed light beams WDM$^E$ through WDM$^H$ incident upon the output ports of the second array waveguide grating AWG2 in the other direction.

The optical connecting waveguides 12 of the optical waveband multiplexer/demultiplexer 10 according to the present embodiment are optical fibers or three-dimensional optical waveguides having a cross-over structure, or waveguides which intersect each other in a plane but are fabricated to reduce a cross-talk among the waveguides to a value not higher than an upper limit. The optical connecting waveguides 12 connect the output ports $q_1$-$q_4$, $q_5$-$q_8$, $q_9$-$q_{12}$, and $q_{13}$-$q_{16}$ of the first array waveguide grating AWG1 to the input ports $r_4$-$r_1$, $r_8$-$r_5$, $r_{12}$-$r_9$ and $r_{16}$-$r_{13}$ of the second array waveguide grating AWG2, such that the optical connecting waveguides 12 intersect each other. Unlike the embodiment of FIG. 7, the present embodiment is configured such that the optical channels $\lambda_4$, $\lambda_8$, $\lambda_{12}$ and $\lambda_{16}$ are not used, and are not included in the four wavelength-division multiplexed light beams WDM$^A$-WDM$^D$, so that the output ports $s_3$, $s_4$, $r_{11}$ and $s_{12}$ do not provide outputs, but receive other optical signals in the form of the four wavelength-division multiplexed light beams WDM$^E$-WDM$^H$ each including the 12 optical channels of the 16 optical channels $\lambda_1$-$\lambda_{16}$, which 12 optical channels do not include the optical channels $\lambda_4$, $\lambda_8$, $\lambda_{12}$ and $\lambda_{16}$.

When the first wavelength-division multiplexed light beam WDM$^A$ (12 optical channels of the 16 optical channels $\lambda_1^A$-$\lambda_{16}^A$, which 12 optical channels do not include the optical channels $\lambda_4^A$, $\lambda_8^A$, $\lambda_{12}^A$ and $\lambda_{16}^A$), the second wavelength-division multiplexed light beam WDM$^B$ (12 optical channels of the 16 optical channels $\lambda_1^B$-$\lambda_{16}^B$, which 12 optical channels do not include the optical channels $\lambda_4^B$, $\lambda_8^B$, $\lambda_{12}^B$ and $\lambda_{16}^B$), the third wavelength-division multiplexed light beam WDM$^C$ (12 optical channels of the 16 optical channels $\lambda_1^C$-$\lambda_{16}^C$, which 12 optical channels do not include the optical channels $\lambda_4^C$, $\lambda_8^C$, $\lambda_{12}^C$ and $\lambda_{16}^C$), and the fourth wavelength-division multiplexed light beam WDM$^D$ (12 optical channels of the 16 optical channels $\lambda_1^D$-$\lambda_{16}^D$, which 12 optical channels do not include the optical channels $\lambda_4^D$, $\lambda_8^D$, $\lambda_{12}^D$ and $\lambda_{16}^D$) are incident upon the input ports $p_1$, $p_2$, $p_9$ and $p_{10}$, respectively, these four wavelength-division multiplexed light beams WDM$^A$ through WDM$^D$ are transmitted through the first array waveguide grating AWG1 and the second array waveguide grating AWG2, and four groups of wavebands WB, that is, [WB3(A), WB1(A), WB2(A)], [WB3(B), WB1(B), WB2(B)], [WB1(C), WB2(C), WB3(C)] and [WB2(D), WB3(D), WB1(D)] are outputted from the respective output ports ($s_2$, $s_{14}$, $s_{16}$), ($s_1$, $s_5$, $s_{15}$), ($s_6$, $s_8$, $s_{10}$) and ($s_7$, $s_9$, $s_{13}$) of the second array waveguide grating AWG2, as indicated at (d) and (e) in FIG. 2. Each of the four groups of wavebands WB is included in the corresponding incident wavelength-division multiplexed light beam WDM, and each waveband WB includes four optical channels which are non-successively spaced apart from each other at a spacing of 400 GHz along an axis of wavelength. For example, each of the three wavebands WB of the group [WB1(A), WB1(A), WB3(A)] includes a part of the optical channels ((four optical channels) included in the first wavelength-division multiplexed light beam WDM$^A$. The waveband WB1(A) includes the optical channels $\lambda_1^A$, $\lambda_5^A$, $\lambda_9^A$ and $\lambda_{13}^A$ outputted from the output port $s_{14}$, and the waveband WB2(A) includes the optical channels $\lambda_2^A$, $\lambda_6^A$, $\lambda_{10}^A$ and $\lambda_{14}^A$ outputted from the output port $s_{16}$, while the waveband WB3(A) includes the optical channels $\lambda_3^A$, $\lambda_7^A$, $\lambda_{11}^A$ and $\lambda_{15}^A$ outputted from the output port $s_2$, When the fifth wavelength-division multiplexed light beam WDM$^E$ (12 optical channels of the 16 optical channels $\lambda_1^E$-$\lambda_{16}^E$, which 12 optical channels do not include the optical channels $\lambda_4^E$, $\lambda_8^E$, $\lambda_{12}^E$ and $\lambda_{16}^E$), the sixth wavelength-division multiplexed light beam WDM$^F$ (12 optical channels of the 16 optical channels $\lambda_1^F$-$\lambda_{16}^F$, which 12 optical channels do not include the optical channels $\lambda_4^F$, $\lambda_8^F$, $\lambda_{12}^F$ and $\lambda_{16}^F$), the seventh wavelength-division multiplexed light beam WDM$^G$ (12 optical channels of the 16 optical channels $\lambda_1^G$-$\lambda_{16}^G$, which 12 optical channels do not include the optical channels $\lambda_4^G$, $\lambda_8^G$, $\lambda_{12}^G$ and $\lambda_{16}^G$), and the eighth wavelength-division multiplexed light beam WDM$^H$ (12 optical channels of the 16 optical channels $\lambda_1^H$-$\lambda_{16}^H$, which 12 optical channels do not include the optical channels $\lambda_4^H$, $\lambda_8^H$, $\lambda_{12}^H$ and $\lambda_{16}^H$) are incident upon the output ports $s_3$, $s_4$, $s_{11}$ and $s_{12}$ of the second array waveguide grating AWG2, respectively, these four wavelength-division multiplexed light beams WDM$^E$ through WDM$^H$ are transmitted through the second array waveguide grating AWG2 and the first array waveguide grating AWG1, and four groups of wavebands WB each group including three wavebands WB are outputted from the respective input ports ($p_4$, $p_6$, $p_{16}$), ($p_3$, $p_5$, $p_7$), ($p_8$, $p_{12}$, $p_{14}$) and ($p_{11}$, $p_{13}$, $p_{16}$) of the first array waveguide grating AWG2, as indicated at (d) and (e) in FIG. 2. Each of the four groups of wavebands WB is included in the corresponding incident wavelength-division multiplexed light beam WDM, and each waveband WB includes four optical channels which are non-successively spaced apart from each other at a spacing of 400 GHz along an axis of wavelength.

In the present embodiment, at least one wavelength-division multiplexed light beam is incident upon the output ports $s_3$, $s_4$, $s_{11}$ and $s_{12}$ (at least one output port) of the second array waveguide grating AWG2, in the reverse direction, and each incident wavelength-division multiplexed light beam is separated into the predetermined wavebands each included in the multiplexed light beam. The separated wavebands are outputted from the input ports ($p_4$, $p_6$, $p_{16}$), ($p_3$, $p_5$, $p_7$), ($p_8$, $p_{12}$, $p_{14}$) and ($p_{11}$, $p_{13}$, $p_{16}$) of the first array waveguide grating AWG1, which input ports are not used to receive the wavelength-division multiplexed light beams WDM$^A$, WDM$^B$, WDM$^C$ and WDM$^D$. Thus, the two demultiplexing functions are concurrently performed when the wavelength-division multiplexed light beams are incident bidirect6ionally or in the opposite directions, to separate the wavelength-division multiplexed light beams into the wavebands each including the mutually different optical channels included in the incident light beams.

Where the optical waveband multiplexer/demultiplexer 10 according to the Embodiment 6 is used as the optical waveband multiplexer, the four groups of wavebands WB each including the four optical channels non-successively spaced apart from each other at the spacing of 400 GHz along the axis of the wavelength are incident upon the output ports ($s_2$, $s_{14}$, $s_{16}$), ($s_1$, $s_5$, $s_{15}$), ($s_6$, $s_8$, $s_{10}$) and ($s_7$, $s_9$, $s_{13}$) of the second array waveguide grating AWG2, as indicated in FIG. 10, and are transmitted through the second array waveguide grating AWG2 and then through the first array waveguide grating AWG1, so that the wavebands WB are multiplexed into predetermined combinations, whereby the first wavelength-division multiplexed light beam WDM$^A$ (optical channels $\lambda_1^A$-$\lambda_3^A$, $\lambda_5^A$-$\lambda_7^A$, $\lambda_9^A$-$\lambda_{11}^A$, $\lambda_{13}^A$-$\lambda_{15}^A$), second wavelength-division multiplexed light beam WDM$^B$(optical channels $\lambda_1^B$-$\lambda_3^B$, $\lambda_5^B$-$\lambda_7^B$, $\lambda_8^B$-$\lambda_{11}^B$, $\lambda_{13}^B$-$\lambda_{15}^B$), third wavelength-division multiplexed light beam WDM$^C$ (optical channels $\lambda_1^C$-$\lambda_3^C$, $\lambda_5^C$-$\lambda_7^C$, $\lambda_9^C$-$\lambda_{11}^C$, $\lambda_{13}^C$-$\lambda_{15}^C$), and fourth wavelength-division multiplexed light beam WDM$^D$ (optical channels $\lambda_1^D$-$\lambda_3^D$, $\lambda_5^D$-$\lambda_7^D$, $\lambda_9^D$-$\lambda_{11}^D$, $\lambda_{13}^D$-$\lambda_{15}^D$) are outputted from the respective input ports $p_1$, $p_2$. $p_9$ and $p_{10}$ of the first array waveguide grating AWG1. When the four groups of wavebands WB each including the four optical channels non-successively spaced apart from each other at the spacing of 400 GHz along the axis of the wavelength are incident upon the input ports ($p_4$. $p_6$. $p_{16}$), ($p_3$, $p_5$. $p_7$), ($p_8$, $p_{12}$. $p_{14}$) and ($p_{11}$, $p_{13}$. $p_{15}$) of the first array waveguide grating AWG1, as indicated in FIG. 11, and are transmitted through the first array waveguide grating AWG1 and then through the second array waveguide grating AWG2, so that the wavebands WB are multiplexed into predetermined combinations, whereby the fifth wavelength-division multiplexed light beam $WDM^E$ (optical channels $\lambda_1^E$-$\lambda_3^E$, $\lambda_5^E$-$\lambda_7^E$, $\lambda_9^E$-$\lambda_{11}^E$, $\lambda_{13}^E$-$\lambda_{15}^E$), second wavelength-division multiplexed light beam $WDM^F$ (optical channels $\lambda_1^F$-$\lambda_3^F$, $\lambda_5^F$-$\lambda_7^F$, $\lambda_9^F$-$\lambda_{11}^F$, $\lambda_{13}^F$-$\lambda_{25}^F$), third wavelength-division multiplexed light beam $WDM^G$ (optical channels $\lambda_1^G$-$\lambda_3^G$, $\lambda_5^G$-$\lambda_7^G$, $\lambda_9^G$-$\lambda_{11}^G$, $\lambda_{13}^G$-$\lambda_{15}^G$), and fourth wavelength-division multiplexed light beam $WDM^H$ (optical channels $\lambda_1^H$-$\lambda_3^H$, $\lambda_5^H$-$\lambda_7$H, $\lambda_9^H$-$\lambda_{11}^H$, $\lambda_{13}^H$-$\lambda_{15}^H$) are outputted from the respective output ports $s_3$, $s_4$. $s_{11}$ and $s_{12}$ of the second array waveguide grating AWG2.

Embodiment 7

Figures 12, 13:
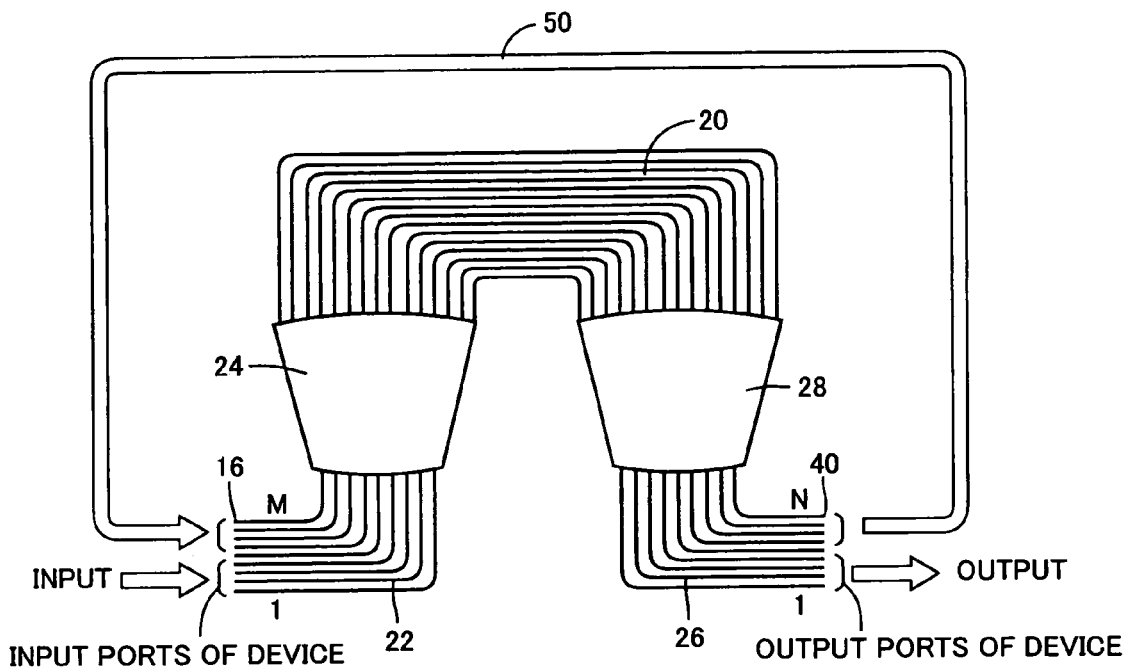
FIG. 12 is a view for explaining an arrangement of an optical waveband multiplexer/demultiplexer according to Embodiment 7 of the present invention.
FIG. 13 is a table indicating wavelengths $\lambda_{A+B-1}$ in relation to position A of input-side waveguides and position B of output side waveguides of an array waveguide grating AWG3 in the embodiment of FIG. 12, wherein all of the input-side waveguides are full-mesh connected to the output-side waveguides.

FIG. 9 is a schematic view showing an example of an optical waveband multiplexer/demultiplexer 10 including a single common array waveguide grating AGW3 and return waveguides 50 which are formed integrally on the substrate 14. Like the first and second array waveguide gratings AWG1, AWG2 described above, the array waveguide grating AWG3 is provided with the array waveguides 20, input-side waveguides 22, input lens waveguide 24 disposed between the input-side waveguides 22 and the array waveguide 20, output-side waveguides 26, and output lens waveguide 28 disposed between the output-side waveguides 26 and the array waveguides 20. Like the first and second array waveguide gratings AWG1, AWG3, the array waveguide grating AWG3 has the characteristic of sequentially shifting the output ports by one position with shifting of the input ports by one position. FIG. 13 is a table indicating wavelengths $\lambda_{(\alpha+\beta-1)}$ which are incident upon position $\alpha$ of the "M" number of input-side waveguides 22 (input ports 16) of the array waveguide grating AWG3 and outputted from position $\beta$ of the "N" number of output-side waveguides 26. The array waveguide grating AWG3 in the present embodiment does not have the cyclic shifting of waveguide.

The optical waveband multiplexer/demultiplexer according to the present embodiment is configured to transmit the wavelength-division multiplexed light beams WDM twice through the single array waveguide grating AWG3, so that the wavelength-division multiplexed light beams WDM incident upon selected ones of the plurality of input ports 16 of the single array waveguide grating AWG3 are separated into the wavebands, which are outputted from respective corresponding ones of the output ports 40. To this end, the optical multiplexer/demultiplexer 10 is provided with the return waveguides 50 which connect the other output ports 40 of the array waveguide grating AWG3 to the other input ports 16. In the present optical waveband multiplexer/demultiplexer 10 using the single array waveguide grating AWG3, the different wavelength-division multiplexed light beams WDM incident upon the selected ones of the input ports 16 are separated into the wavebands WB different from the wavebands WB included in the incident wavelength-division multiplexed light beams WDM, and the separated wavebands WB are outputted from the above-indicated other output ports 40.

In the present embodiment, the total number of optical channels, the number of the input ports of the device, and the number of the output ports of the device are respectively represented by (B×D), A and (A×B), where "M", "N,", "B", "D", and "A" respectively represent the number of the input ports 16 of the array waveguide grating AWG3, the number of the output ports 40 of the array waveguide grating AWG3, the number of the wavebands, the number of the optical channels in each waveband, and the number of 1×B multiplexer/demultiplexer units within the optical waveband demultiplexer/demultiplexer (device) 10.

The connections of the return waveguides 50 to the array waveguide grating AWG3 are represented by the following general equations indicated below at (a) through (d).

(a) The "A" number of input ports are ports a, a+D, ... a+(A−1)D of the array waveguide grating AWG3.

(b) The output ports N−(A+B−1)D+1 to N of the array waveguide grating AWG3 are connected to the input ports of the array waveguide grating AWG3. That is, a difference between the number of the input port and the number of the output port connected to the input port is changed by one for every "D" number of the output ports.

(c) The output and input ports connected to each other through the return waveguides 50 are as follows:

| (OUTPUT PORTS) | | (INPUT PORTS) |
|---|---|---|
| N − D + 1 to N | → | M − D + 1 to M |
| N − 2D + 1 to N − D | → | M − 2D to M − D − 1 |
| N − 3D + 1 to N − 2D | → | M − 3D − 1 to M − 2D − 2 |
| N − 4D + 1 to N − 3D | → | M − 3D − 2 to M − 3D − 3 |
| . | | . |
| (Abbreviated) | | . |
| . | | . |
| N − (A + B − 1)D + 1 to N − (A + B − 2)D | → | M − (A + B − 1)D − (A + B − 3) to M − (A + B − 2)D − (A + B − 2) |

(d) The "AB" number of the output ports of the device are the following ports of the array waveguide grating AWG3:

| |
|---|
| a + N − M to a + N − M + D − 1 |
| a + N − M + D + 1 to a + N − M + 2D |
| a + N − M + 2D + 2 to a + N − M + 3D + 1 |
| . |
| (Abbreviated) |
| . |
| . |
| a + N − M + (A − 1)D + A − 1 to a + N − M + AD + A − 2 |

The connections of the return waveguides 50 represented by the above-indicated general equations should satisfy the following equations (7), (8) and (9). The equation (7) represents a condition that the output port number should be 1 or larger, and the equation (8) represents a condition that the numbers of the output ports connected to the return waveguides 50 should be different from the numbers of the output ports from which the wavebands are outputted, while the equation (8) represent a condition that the numbers of the input ports connected to the return waveguides 50 should be different from the numbers of the input ports upon which the wavelength-division multiplexed light beams WDM are incident.

$$a \geq M-N+1 \quad (7)$$

$$M > (2A+B-1)D+A+a-3 \quad (8)$$

$$M > (2A+B-2)D+(A+B+a-3) \quad (9)$$

There will be described a specific example wherein the number "M" of the input ports 16 and the number "N" of the array waveguide grating AWG3 are equal to 128, the number "B" of the wavebands and the number "n" of the optical channels within each waveband are equal to 8, the number "A" of the 1×B multiplexer/demultiplexer units in the optical waveband multiplexer/demultiplexer 10 is equal to 4, and the number "a" is equal to 1. The condition represented by the equation (7) is satisfied since the left member is equal to 1 while the right member is equal to 128−128+1=1. The condition represented by the equation (8) is satisfied since the left member is equal to 128 while the right member is equal to (2×4+8−1)×8+4+1−3=122. The condition represented by the equation (9) is satisfied since the left member is equal to 128 while the right member is equal to (2×4+8−2)×8+(4+8+1−3)=122. Accordingly, the light beam is incident upon the input ports #1, #9, #17 and #25 of the device, and the incident light beam is outputted from the output ports #1-#8 corresponding to the input port #1, output ports #10-#17 corresponding to the input port #9, output ports #19-#26 corresponding to the input port #17, and output ports #28-#35 corresponding to the input port #25.

By the return waveguides 50, the output ports #41-#48 are connected to the input ports #31-#38, the output ports #49-#56 are connected to the input ports #40-#47, the output ports #57-#64 are connected to the input ports #49-#56, the output ports #65-#72 are connected to the input ports #58-#65, the output ports #73-#80 are connected to the input ports #67-#74, the output ports #81-#88 are connected to the input ports #76-#83, the output ports #89-#96 are connected to the input ports #85-#92, the output ports #97-#104 are connected to the input ports #94-#101, the output ports #105-#112 are connected to the input ports #103-#110, the output ports #113-#120 are connected to the input ports #112-#119, and the output ports #121-#128 are connected to the input ports #121-#128.

The optical waveband multiplexer/demultiplexer 10 according to the present embodiment uses the simple array waveguide grating AWG3 the outputs of which are again incident thereupon through the return waveguides 50, so that the wavelength-division multiplexed light beam is transmitted twice through the array waveguide grating AWG3. Accordingly, the single array waveguide grating AWG3 cooperates with the return waveguide 50 to function as the first and second array waveguide gratings AWG1 and AWG2. Thus, the present embodiment 10 has the same advantages as the preceding embodiments.

The optical waveband demultiplexer 10 according to the present embodiment comprises the single array waveguide grating AWG3 which has the plurality of input ports and the plurality of output ports and which is configured such that the wavelength-division multiplexed light beams WDM incident upon predetermined ones of the input ports are separated into the plurality of wavebands each including the mutually different optical channels which are selected from the plurality of optical channels included in the incident wave-division multiplexed light beams WDM, and the separated plurality of wavebands are outputted from predetermined ones of the output ports, and further comprises the return waveguides 50 connecting the above-indicated other ones of the plurality of output ports to the other ones of the plurality of input ports, for returning a plurality of optical signals of the wavebands separated from the wavelength-division multiplexed light beams incident upon the predetermined ones of the input ports, from the above-indicated other ones of the output ports back to the above-indicated other ones of the input ports, whereby the different wavelength-division multiplexed light beams WDM incident upon the above-indicated predetermined ones of the input ports are separated into the plurality of wavebands WB which are different from the wavebands included in the incident wavelength-division multiplexed light beams, and the separated wavebands are outputted from the respective different output ports. Thus, the present optical waveband demultiplexer 10 using the single array waveguide grating AWG3 and the return waveguides 50 can be simplified in construction.

Where the optical waveband multiplexer/demultiplexer 10 according to the present embodiment of FIG. 12 is used as the multiplexer, the plurality of wavebands WB incident upon the predetermined ones of the output ports 40 are transmitted twice through the single array waveguide grating AWG3 in the directions opposite to the directions of transmission of the light beams in the case of the demultiplexer, so that the wavebands are multiplexed into predetermined combinations, and the thus obtained wavelength-division multiplexed light beams WDM are outputted from the predetermined ones of the input ports 16.

Embodiment 8

Figure 14:
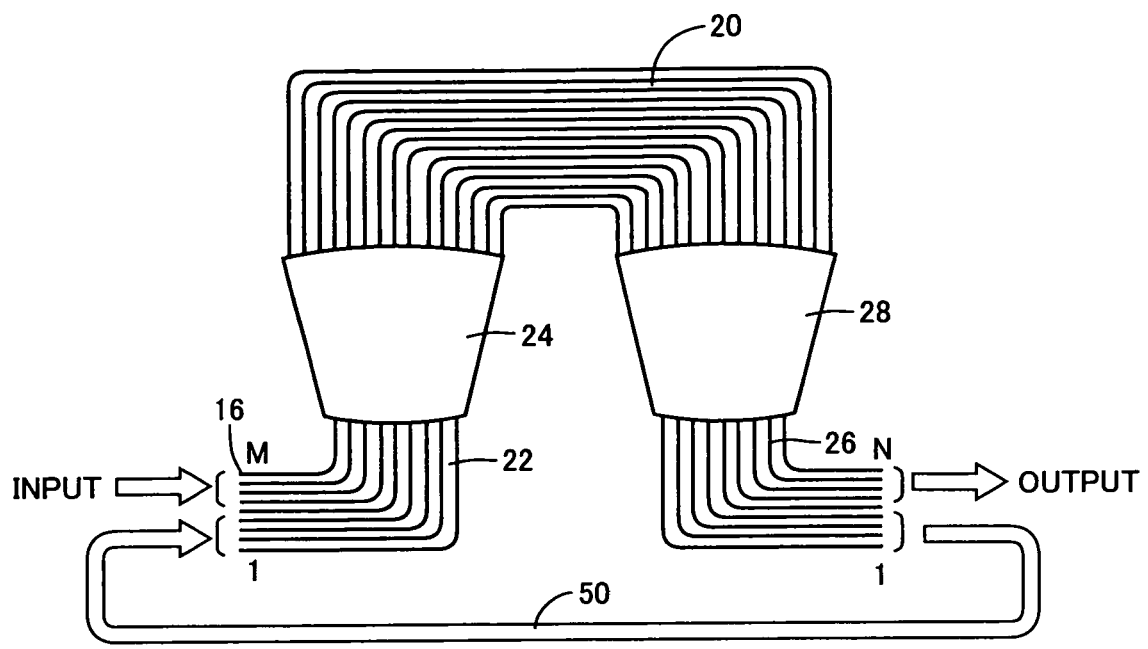
FIG. 14 is a view for explaining an arrangement of an optical waveband multiplexer/demultiplexer according to Embodiment 8 of the present invention.

The optical waveband multiplexer/demultiplexer 10 shown n FIG. 14 is identical with the embodiment of FIG. 12, except for the connections of the return waveguides 50 to the output ports and the input ports. In the embodiment of FIG. 12, the input and output ports of the array waveguide grating AWG which have relatively large numbers are connected to the return waveguides 50, while the input and output ports having relatively small numbers are used as the input and output ports of the device. In the present embodiment, on the other hand, the input and output ports of the array waveguide grating AWG3 which have the relatively small numbers are connected to the return waveguides 50, while the input and output ports having the relatively large numbers are used as the input and output ports of the device. The present embodiment has the same advantages as the embodiment of FIG. 12.

Embodiment 9

Figure 15:
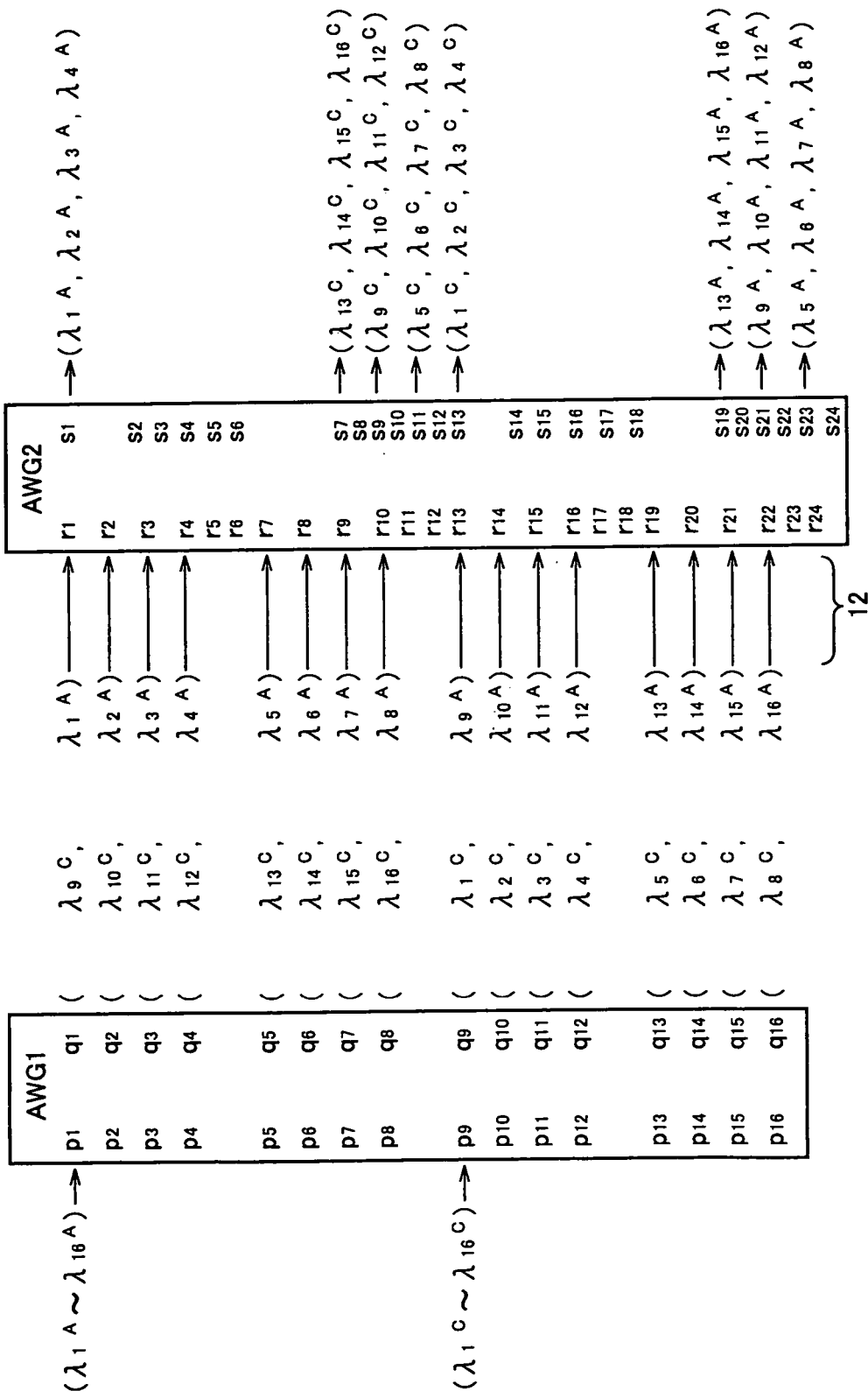
FIG. 15 is a view for explaining an arrangement of an optical waveband multiplexer/demultiplexer according to Embodiment 9 of the present invention.

The optical waveband multiplexer/demultiplexer 10 according to the embodiment of FIG. 15, which is similar to the embodiment of FIG. 6, includes the first array waveguide grating AWG1 and the second array waveguide grating AWG2. The first array waveguide grating AWG1 has 16 input ports $p_1$-$p_{16}$ and 16 output ports $q_1$-$q_{16}$ both corresponding to the 16 optical channels ($\lambda_1^A$-$\lambda_{16}^A$) of the first wavelength-division multiplexed light team WDM$^A$ or 16 optical channels ($\lambda_1^C$-$\lambda_{16}^C$) of the third wavelength-division multiplexed light team WDM$^C$. The first array waveguide grating AWG1 has a cyclic characteristic of wavelength response. The second array waveguide grating AWG2 has 24 input ports $r_1$-$r_{24}$ and 24 output ports $s_1$-$s_{24}$, the number of which is larger by eight than the number of the optical channels. The second array waveguide grating AWG2 has also a cyclic characteristic of wavelength response. In the present optical waveband multiplexer/demultiplexer 10, the optical connecting waveguides 12 are optical waveguides formed on the substrate 14, and connect the output ports $q_1$-$q_{16}$ of the first array waveguide grating AWG1 to the input ports $r_1$-$r_4$, $r_7$-$r_{10}$, $r_{13}$-$r_{16}$, and $r_{19}$-$r_{22}$ of the second array waveguide grating AWG2, in a plane. such that the optical connecting waveguides 12 do not intersect each other. The input ports $r_5, r_6, r_{11}, r_{12}, r_{17}, r_{18}, r_{23}, r_{24}$, and the output ports $s_2$-$s_6$. $s_8, s_{10}, s_{12}, s_{14}$-$s_{18}, s_{20}$. $s_{22}, s_{24}$ of the second array waveguide grating AWG2 are not used.

FIG. 15 indicates the demultiplexing function performed when the above-indicated two wavelength-division multiplexed light beams WDM$^A$ and WDM$^C$ are incident upon the optical waveband multiplexer/demultiplexer 10. When the first wavelength-division multiplexed light beams WDM$^A$ (optical channels ($\lambda_1^A$-$\lambda_{16}^A$) and the second wavelength-division multiplexed light beams WDM$^C$ (optical channels ($\lambda_1^A$-$\lambda_{16}^A$) are incident upon the input ports $p_1$ and $p_9$, respectively, these two wavelength-division multiplexed light beams WDM$^A$ and WDM$^C$ are transmitted through the first array waveguide grating AWG1 and the second array waveguide grating AWG2, and four wavebands WB are outputted from the respective output ports $s_1$. $s_{23}, s_{21}$, and $s_{19}$ of the second array waveguide grating AWG2, as indicated at (b) and (c) in FIG. 2. Each of the four wavebands WB is included in the wavelength-division multiplexed light beam WDM$^A$ incident upon the input port $p_1$, and each waveband WB includes four optical channels which are successively spaced apart from each other at a spacing of 100 GHz along an axis of wavelength. Further, four wavebands WB are outputted from the respective output ports $s_{13}$. $s_{11}, s_9$, and $s_7$ of the second array waveguide grating AWG2. Each of these four wavebands WB is included in the wavelength-division multiplexed light beam WDM$^C$ incident upon the input port $p_9$, and each waveband WB includes four optical channels which are successively spaced apart from each other at a spacing of 100 GHz along an axis of wavelength.

In the present optical waveband multiplexer/demultiplexer 10, selected pairs of two adjacent input ports of the second array wave guide grating AWG2 are not used so that adjacent groups of the used output ports of the second array waveguide grating AWG2 are not close to each other. This arrangement of use and non-use of the input and output ports is obtained by selecting the output ports of the first array waveguide grating AWG1 and the input ports of the second array waveguide grating AWG2 that are connected to each other by the optical connecting waveguides 12, such that differences between the numbers of the connected output and input ports are not continuous but change in steps, and by suitably selecting the used input ports of the first array waveguide grating AWG1. To satisfy these conditions, the output and input ports connected by the optical connecting waveguides 12, and the input ports of the first array waveguide grating AWG1 upon which the wavelength-division multiplexed light beams WDM$^A$ and WDM$_C$ are incident are suitably selected. The present optical waveband multiplexer/demultiplexer 10 has not only the same advantages as the preceding embodiments, but also an additional advantage that a spacing between the adjacent output waveguides connected to the output ports of the second array waveguide grating AWG2 can be made large, owing to a relatively large spacing between the adjacent groups of the used output ports of the second array waveguide grating AWG2. This additional advantage permits the output waveguides connected to the second array waveguide grating AWG2 to be formed with an increased width dimension for broadening the passband width of the output waveguides, or to be formed in a parabolic shape for flattening the optical spectrum.

Embodiment 10

Figure 16:
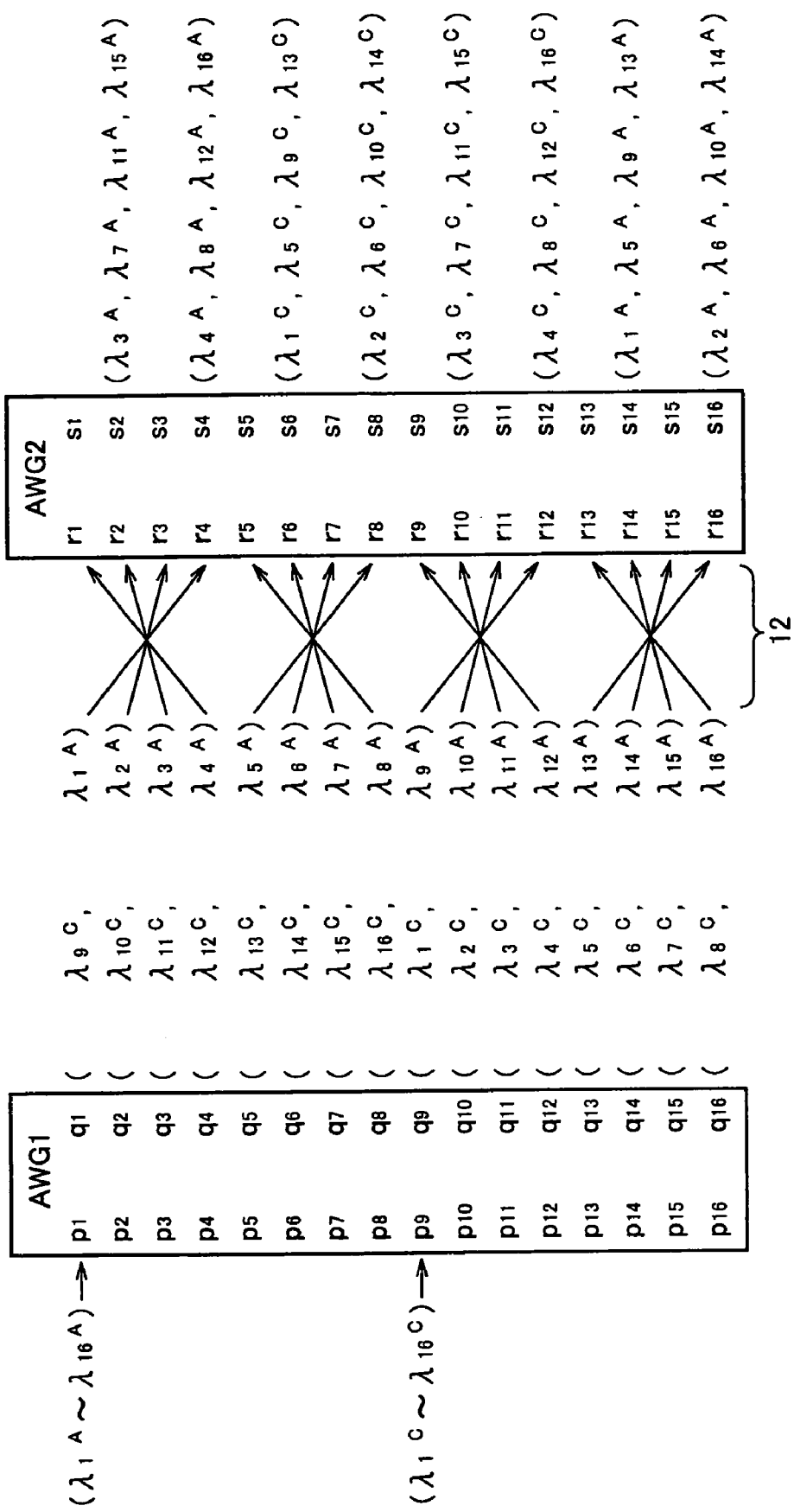
FIG. 16 is a view for explaining an arrangement of an optical waveband multiplexer/demultiplexer according to Embodiment 10 of the present invention.

The optical waveband multiplexer/demultiplexer 10 according to the embodiment of FIG. 16, which is similar to the embodiment of FIG. 7, includes the first array waveguide grating AWG1 and the second array waveguide grating AWG2. The first array waveguide grating AWG1 has 16 input ports $p_1$-$p_{16}$ and 16 output ports $q_1$-$q_{16}$ both corresponding to the 16 optical channels ($\lambda_1^A$-$\lambda_{16}^A$) of the first wavelength-division multiplexed light team WDM$^A$ or 16 optical channels ($\lambda_1^C$-$\lambda_{16}^C$) of the third wavelength-division multiplexed light team WDM$^C$. The first array waveguide grating AWG1 has a cyclic characteristic of wavelength response. Similarly, the second array waveguide grating AWG2 has 16 input ports $r_1$-$r_{16}$ and 16 output ports $s_1$-$s_{16}$ corresponding to the number of the optical channels. The second array waveguide grating AWG2 has also a cyclic characteristic of wavelength response. In the present optical waveband multiplexer/demultiplexer 10, the optical connecting waveguides 12 are optical fibers, or three-dimensional optical waveguides having a cross-over structure and formed on the substrate 14. The optical connecting waveguides 12 connect the output ports $q_1$-$q_4$, $q_5$-$q_8$, $q_9$-$q_{12}$, and $q_{13}$-$q_{16}$ of the first array waveguide grating AWG1 to the input ports $r_4$-$r_1$, $r_8$-$r_5$, $r_{12}$-$r_9$ and $r_{16}$-$r_{13}$ of the second array waveguide grating AWG2, such that the optical connecting waveguides 12 intersect each other. All of the input ports of the second array waveguide grating AWG2 are used, but every second or other output port is not used.

FIG. 16 indicates the demultiplexing function performed when the above-indicated two wavelength-division multiplexed light beams WDM$^A$ and WDM$^C$ are incident upon the optical waveband multiplexer/demultiplexer 10. When the first wavelength-division multiplexed light beams WDM$^A$ (optical channels ($\lambda_1^A$-$\lambda_{16}^A$) and the second wavelength-division multiplexed light beams WDM$^C$ (optical channels ($\lambda_1^C$-$\lambda_{16}^C$) are incident upon the input ports $p_1$ and $p_9$, respectively, these two wavelength-division multiplexed light beams WDM$^A$ and WDM$^C$ are transmitted through the first array waveguide grating AWG1 and the second array waveguide grating AWG2, and four wavebands WB are outputted from the respective output ports $s_{14}$. $s_{16}, s_2$, and $s_4$ of the second array waveguide grating AWG2, as indicated at (d) and (e) in FIG. 2. Each of the four wavebands WB is included in the wavelength-division multiplexed light beam WDM$^A$ incident upon the input port $p_1$, and each waveband WB includes four optical channels which are non-successively spaced apart from each other at a spacing of 100 GHz along an axis of wavelength. Further, four wavebands WB are outputted from the respective output ports $s_6$. $s_8, s_{10}$, and $s_{12}$ of the second array waveguide grating AWG2. Each of these four wavebands WB is included in the wavelength-division multiplexed light beam WDM$^C$ incident upon the input port $p_9$, and each waveband WB includes four optical channels which are non-successively spaced apart from each other at a spacing of 100 GHz along an axis of wavelength.

In the present optical waveband multiplexer/demultiplexer 10, the used input ports of the second array waveguide grating AWG2 are adjacent to each other so that so that the used output ports of the second array waveguide grating AWG2 are not adjacent to each other. This arrangement of use and non-use of the input and output ports is obtained by selecting the output ports of the first array waveguide grating AWG1 and the input ports of the second array waveguide grating AWG2 that are connected to each other by the optical connecting waveguides 12, such that differences between the numbers of the connected output and input ports are not continuous but change in steps, and by suitably selecting the used input ports of the first array waveguide grating AWG1. To satisfy these conditions, the output and input ports connected by the optical connecting waveguides 12, and the input ports of the first array waveguide grating AWG1 upon which the wavelength-division multiplexed light beams $WDM^A$ and $WDM_C$ are incident are suitably selected. The present optical waveband multiplexer/demultiplexer 10 has not only the same advantages as the preceding embodiments, but also an additional advantage that a spacing between the adjacent output waveguides connected to the output ports of the second array waveguide grating AWG2 can be made large, owing to the arrangement that the used output ports of the second array waveguide grating AWG2 are not adjacent to each other. This additional advantage permits the output waveguides connected to the second array waveguide grating AWG2 to be formed with an increased width dimension for broadening the passband width of the output waveguides, or to be formed in a parabolic shape for flattening the optical spectrum.

Embodiment 11

Figure 17:
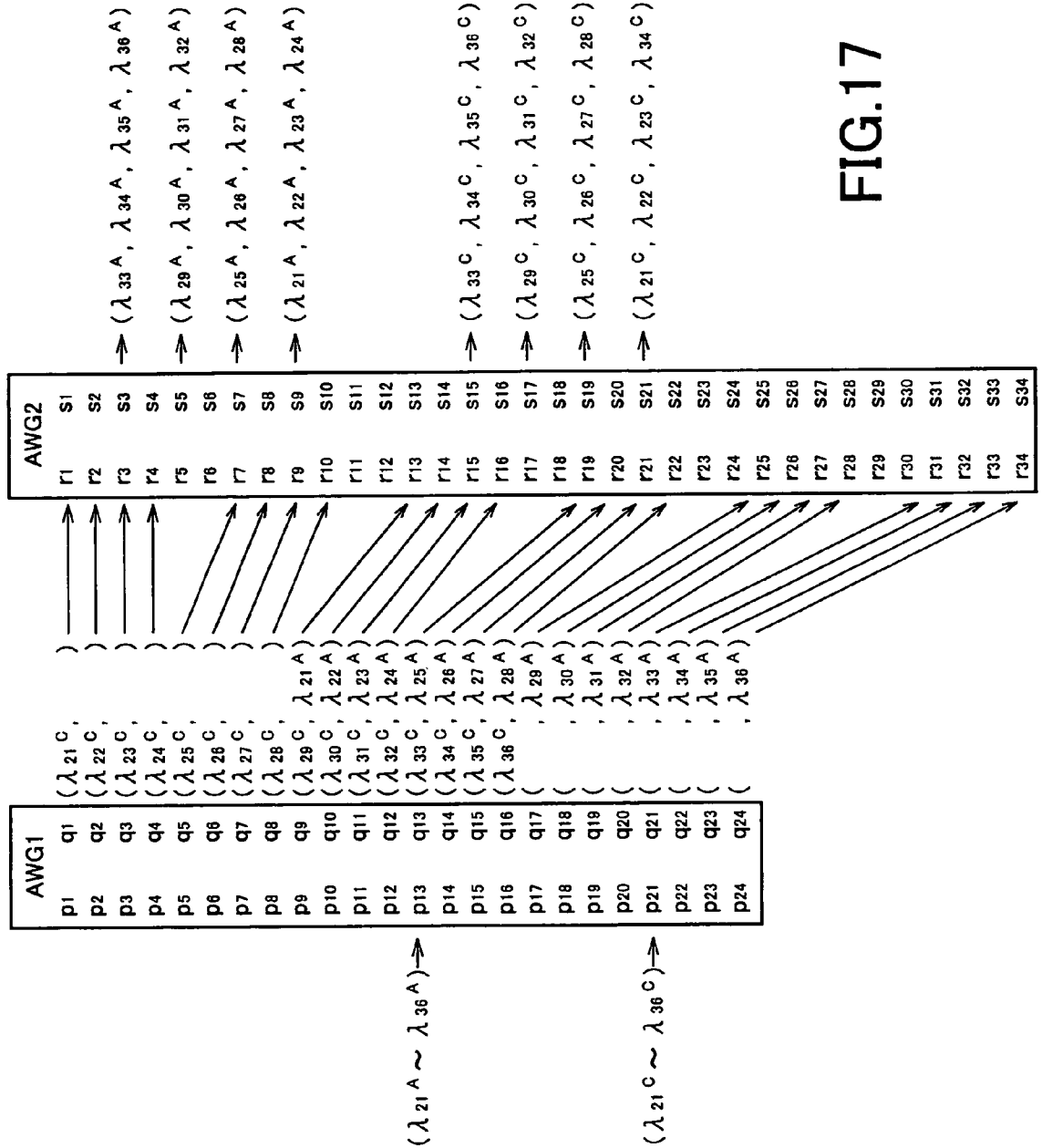
FIG. 17 is a view for explaining an arrangement of an optical waveband multiplexer/demultiplexer according to Embodiment 11 of the present invention.

The optical waveband multiplexer/demultiplexer 10 according to the embodiment of FIG. 17 includes the first array waveguide grating AWG1 and the second array waveguide grating AWG2. The first array waveguide grating AWG1 has 24 input ports $p_1$-$p_{24}$ and 24 output ports $q_1$-$q_{24}$, the number of which is larger than the number of the 16 optical channels ($\lambda_1^A$-$\lambda_{16}^A$) of the first wavelength-division multiplexed light team $WDM^A$ or 16 optical channels ($\lambda_1^C$-$\lambda_{16}^C$) of the third wavelength-division multiplexed light team $WDM^C$. The first array waveguide grating AWG1 does not have a cyclic characteristic of wavelength response. Similarly, the second array waveguide grating AWG2 has 34 input ports $r_1$-$r_{34}$ and 34 output ports $s_1$-$s_{34}$, the number of which is larger than the number of the 16 optical channels. The second array waveguide grating AWG2 does not have a cyclic characteristic of wavelength response, either. In the present optical waveband multiplexer/demultiplexer 10, the optical connecting waveguides 12 are optical formed in a plane on the substrate 14, so as to extend parallel to each other. The optical connecting waveguides 12 connect the output ports $q_1$-$q_{24}$ of the first array waveguide grating AWG1 to the input ports $r_1$-$r_4$, $r_7$-$r_{10}$, $r_{13}$-$r_{16}$, $r_{19}$-$r_{22}$, $r_{25}$-$r_{28}$ and $r_{31}$-$r_{34}$ of the second array waveguide grating AWG2, such that the optical connecting waveguides 12 extend in a plane in parallel to each other. The input ports $r_5$, $r_6$, $r_{11}$, $r_{12}$, $r_{17}$, $r_{18}$, $r_{23}$, $r_{24}$, $r_{28}$ and $r_{29}$ of the second array waveguide grating AWG2 are not used, and the output ports $s_1$ $s_2$, $s_4$, $s_6$, $s_8$, $s_{10}$-$s_{14}$, $s_{16}$, $s_{18}$, $s_{20}$, and $s_{22}$-$s_{34}$ are not used.

FIG. 17 indicates the demultiplexing function performed when the above-indicated two wavelength-division multiplexed light beams $WDM^A$ and $WDM^C$ are incident upon the optical waveband multiplexer/demultiplexer 10. When the first wavelength-division multiplexed light beams $WDM^A$ (optical channels ($\lambda_{21}^A$-$\lambda_{36}^A$) and the second wavelength-division multiplexed light beams $WDM^C$ (optical channels ($\lambda_{21}^A$-$\lambda_{36}^A$) are incident upon the input ports $p_{13}$ and $p_{21}$, respectively, these two wavelength-division multiplexed light beams $WDM^A$ and $WDM^C$ are transmitted through the first array waveguide grating AWG1 and the second array waveguide grating AWG2, and four wavebands WB are outputted from the respective output ports $s_9$. $s_7$, $s_5$, and $s_3$ of the second array waveguide grating AWG2, as indicated at (b) and (c) in FIG. 2. Each of the four wavebands WB is included in the wavelength-division multiplexed light beam $WDM^A$ incident upon the input port $p_{13}$, and each waveband WB includes four optical channels which are successively spaced apart from each other at a spacing of 100 GHz along an axis of wavelength. Further, four wavebands WB are outputted from the respective output ports $s_{21}$. $s_{19}$, $s_{17}$, and $s_{15}$ of the second array waveguide grating AWG2. Each of these four wavebands WB is included in the wavelength-division multiplexed light beam $WDM^C$ incident upon the input port $p_{21}$, and each waveband WB includes four optical channels which are successively spaced apart from each other at a spacing of 100 GHz along an axis of wavelength.

In the present optical waveband multiplexer/demultiplexer 10, selected pairs of two adjacent input ports of the second array waveguide grating AWG2 are not used so that adjacent groups of the used output ports of the second array waveguide grating AWG2 are not close to each other. This arrangement of use and non-use of the input and output ports is obtained by selecting the output ports of the first array waveguide grating AWG1 and the input ports of the second array waveguide grating AWG2 that are connected to each other by the optical connecting waveguides 12, such that differences between the numbers of the connected output and input ports are not continuous but change in steps, and by suitably selecting the used input ports of the first array waveguide grating AWG1. To satisfy these conditions, the output and input ports connected by the optical connecting waveguides 12, and the input ports of the first array waveguide grating AWG1 upon which the wavelength-division multiplexed light beams $WDM^A$ and $WDM_C$ are incident are suitably selected. The present optical waveband multiplexer/demultiplexer 10 has not only the same advantages as the preceding embodiments, but also an additional advantage that a spacing between the adjacent output waveguides connected to the output ports of the second array waveguide grating AWG2 can be made large, owing to a relatively large spacing between the adjacent groups of the used output ports of the second array waveguide grating AWG2. This additional advantage permits the output waveguides connected to the second array waveguide grating AWG2 to be formed with an increased width dimension for broadening the passband width of the output waveguides, or to be formed in a parabolic shape for flattening the optical spectrum.

Embodiment 12

Figure 18:
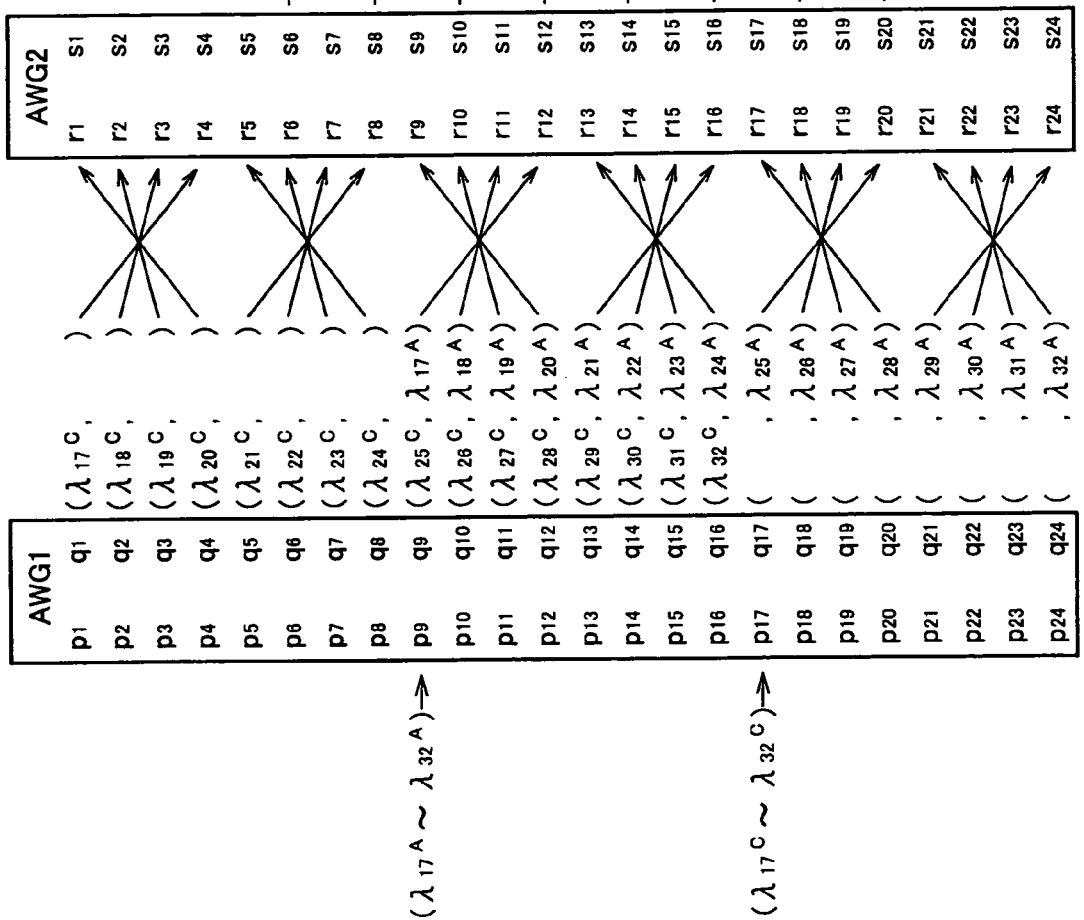
FIG. 18 is a view for explaining an arrangement of an optical waveband multiplexer/demultiplexer according to Embodiment 12 of the present invention.

The optical waveband multiplexer/demultiplexer 10 according to the embodiment of FIG. 18 includes the first array waveguide grating AWG1 and the second array waveguide grating AWG2. The first array waveguide grating AWG1 has 24 input ports $p_1$-$p_{24}$ and 24 output ports $q_1$-$q_{24}$, the number of which is larger than the number of the 16 optical channels ($\lambda_1^A$-$\lambda_{16}^A$) of the first wavelength-division multiplexed light team $WDM^A$ or 16 optical channels ($\lambda_1^C$-$\lambda_{16}^C$) of the third wavelength-division multiplexed light team $WDM^C$. The first array waveguide grating AWG1 does not have a cyclic characteristic of wavelength response. Similarly, the second array waveguide grating AWG2 has 24 input ports $r_1$-$r_{24}$ and 24 output ports $s_1$-$s_{24}$, the number of which is larger than the number of the optical channels. The second array waveguide grating AWG2 does not have a cyclic characteristic of wavelength response, either. In the present optical waveband multiplexer/demultiplexer 10, the optical connecting waveguides 12 are optical fibers, or three-dimensional optical waveguides having a cross-over structure and formed on the substrate 14. The optical connecting waveguides 12 connect the output ports $q_1$-$q_4$, $q_5$-$q_8$, $q_9$-$q_{12}$, $q_{13}$-$q_{16}$, $q_{17}$-$q_{20}$ and $q_{21}$-$q_{24}$ of the first array waveguide grating AWG1 to the input ports $r_4$-$r_1$, $r_8$-$r_5$, $r_{12}$-$r_9$, $r_{16}$-$r_{13}$ $r_{20}$-$r_{17}$ and $r_{24}$-$r_{21}$ of the second array waveguide grating AWG2, such that the optical connecting waveguides 12 intersect each other. All of the input ports of the second array waveguide grating AWG2 are used, but the output ports $s_1$-$s_5$, $s_7$, $s_9$, $s_{11}$, $s_{13}$, $s_{15}$, $s_{17}$, $s_{19}$ and $s_{21}$-$s_{24}$ are not used.

FIG. 18 indicates the demultiplexing function performed when the above-indicated two wavelength-division multiplexed light beams $WDM^A$ and $WDM^C$ are incident upon the optical waveband multiplexer/demultiplexer 10. When the first wavelength-division multiplexed light beams $WDM^A$ (optical channels $\lambda_{17}^A$-$\lambda_{32}^A$) and the second wavelength-division multiplexed light beams $WDM^C$ (optical channels $\lambda_{17}^C$-$\lambda_{32}^C$) are incident upon the input ports $p_9$ and $p_{17}$, respectively, these two wavelength-division multiplexed light beams $WDM^A$ and $WDM^C$ are transmitted through the first array waveguide grating AWG1 and the second array waveguide grating AWG2, and four wavebands WB are outputted from the respective output ports $s_6$, $s_8$, $s_{10}$ and $s_{12}$ of the second array waveguide grating AWG2, as indicated at (d) and (e) in FIG. 2. Each of the four wavebands WB is included in the wavelength-division multiplexed light beam $WDM^A$ incident upon the input port $p_9$, and each waveband WB includes four optical channels which are non-successively spaced apart from each other at a spacing of 100 GHz along an axis of wavelength. Further, four wavebands WB are outputted from the respective output ports $s_{14}$, $s_{16}$, $s_{18}$ and $s_{20}$ of the second array waveguide grating AWG2. Each of these four wavebands WB is included in the wavelength-division multiplexed light beam $WDM^C$ incident upon the input port $p_{17}$, and each waveband WB includes four optical channels which are non-successively spaced apart from each other at a spacing of 100 GHz along an axis of wavelength.

In the present optical waveband multiplexer/demultiplexer 10, the used input ports of the second array waveguide grating AWG2 are adjacent to each other so that so that the used output ports of the second array waveguide grating AWG2 are not adjacent to each other. This arrangement of use and non-use of the input and output ports is obtained by selecting the output ports of the first array waveguide grating AWG1 and the input ports of the second array waveguide grating AWG2 that are connected to each other by the optical connecting waveguides 12, such that differences between the numbers of the connected output and input ports are not continuous but change in steps, and by suitably selecting the used input ports of the first array waveguide grating AWG1. To satisfy these conditions, the output and input ports connected by the optical connecting waveguides 12, and the input ports of the first array waveguide grating AWG1 upon which the wavelength-division multiplexed light beams $WDM^A$ and $WDM_C$ are incident are suitably selected. The present optical waveband multiplexer/demultiplexer 10 has not only the same advantages as the preceding embodiments, but also an additional advantage that a spacing between the adjacent output waveguides connected to the output ports of the second array waveguide grating AWG2 can be made large, owing to the arrangement that the used output ports of the second array waveguide grating AWG2 are not adjacent to each other. This additional advantage permits the output waveguides connected to the second array waveguide grating AWG2 to be formed with an increased width dimension for broadening the passband width of the output waveguides, or to be formed in a parabolic shape for flattening the optical spectrum.

Embodiment 13

Figure 19:
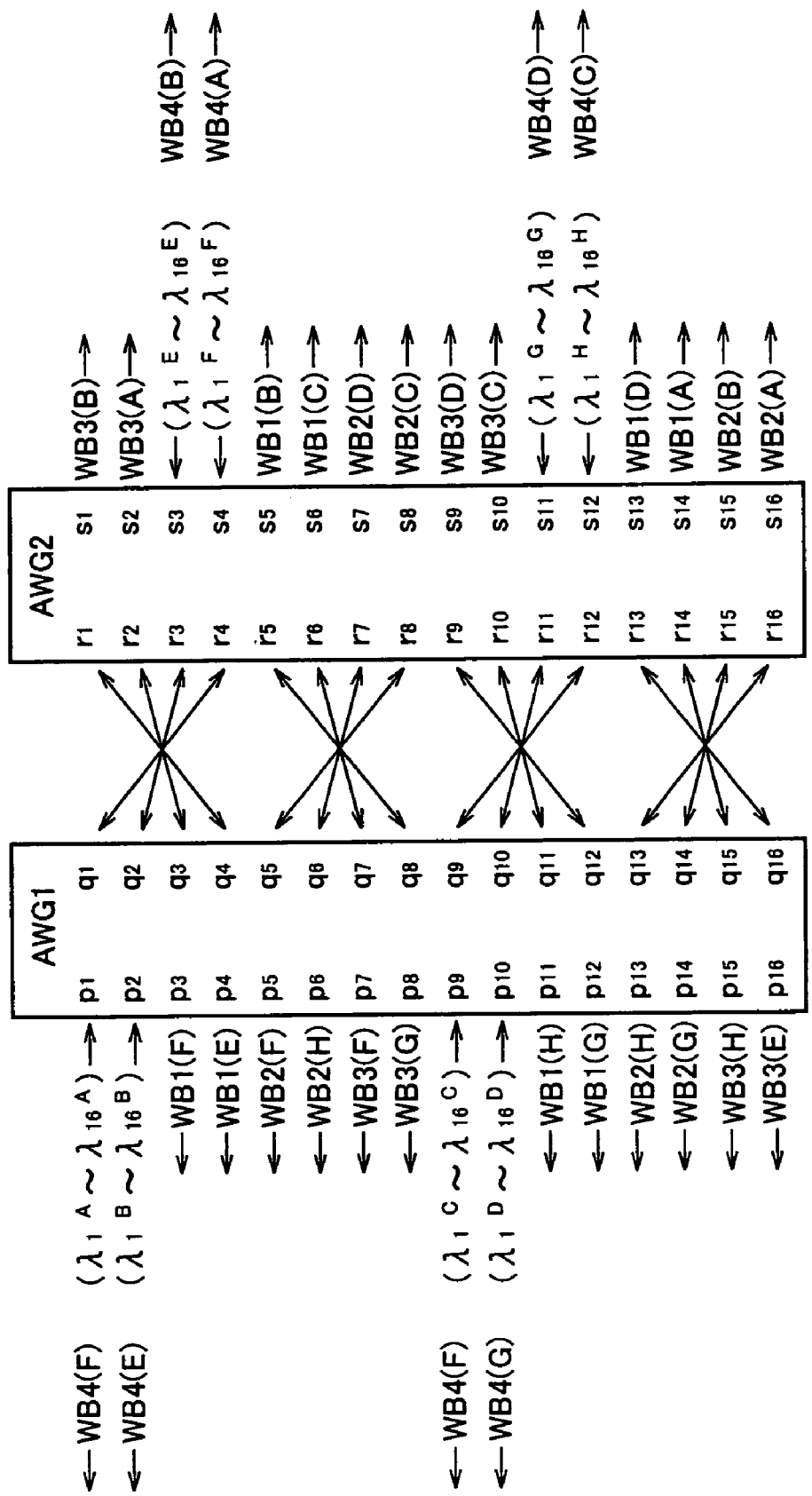
FIG. 19 is a view for explaining an arrangement of an optical waveband multiplexer/demultiplexer according to Embodiment 13 of the present invention.
Figure 20:
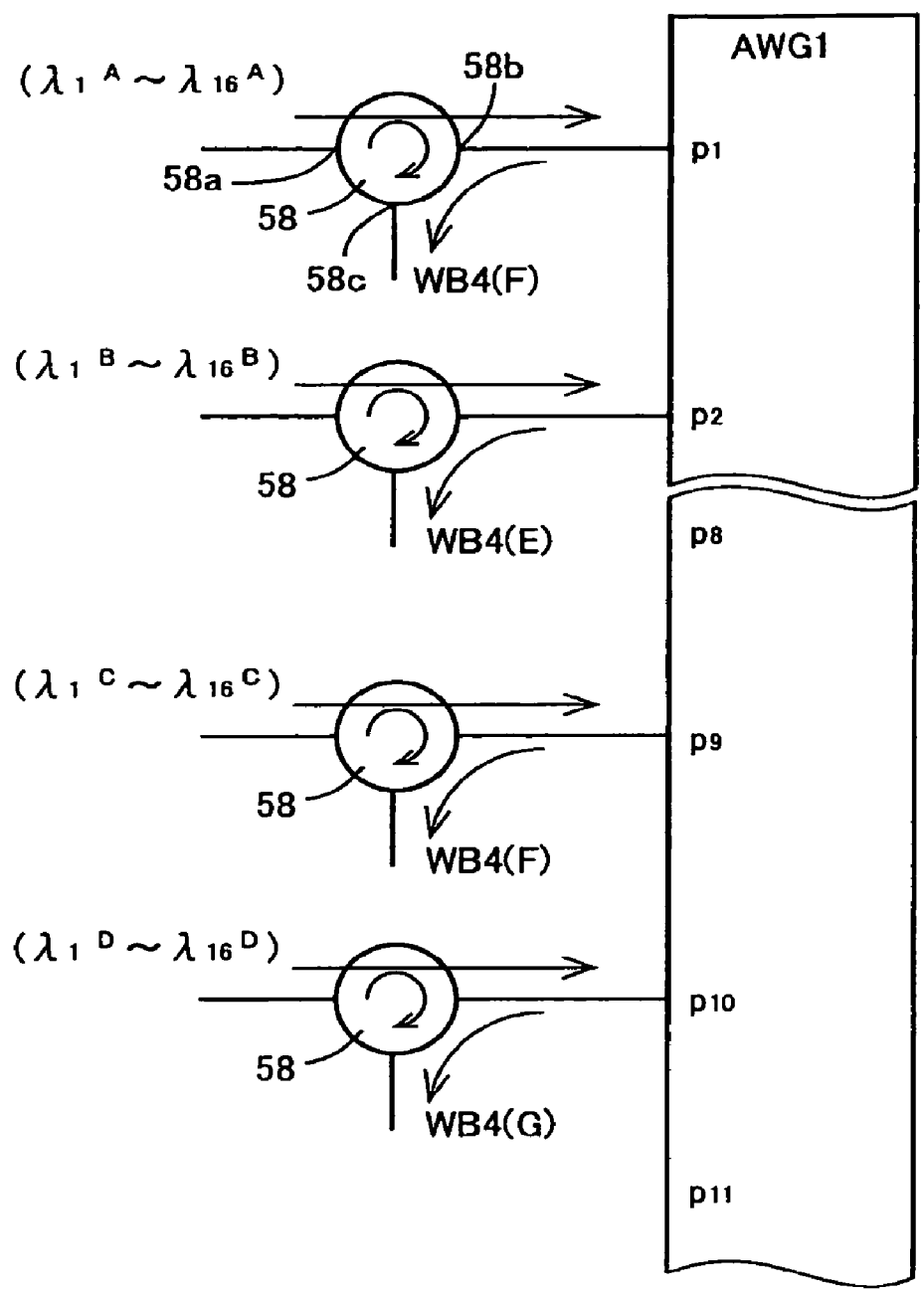
FIG. 20 is a view for explaining connection between optical circulators and a first array waveguide grating AWG1, in the Embodiment 13 of FIG. 19.
Figure 21:
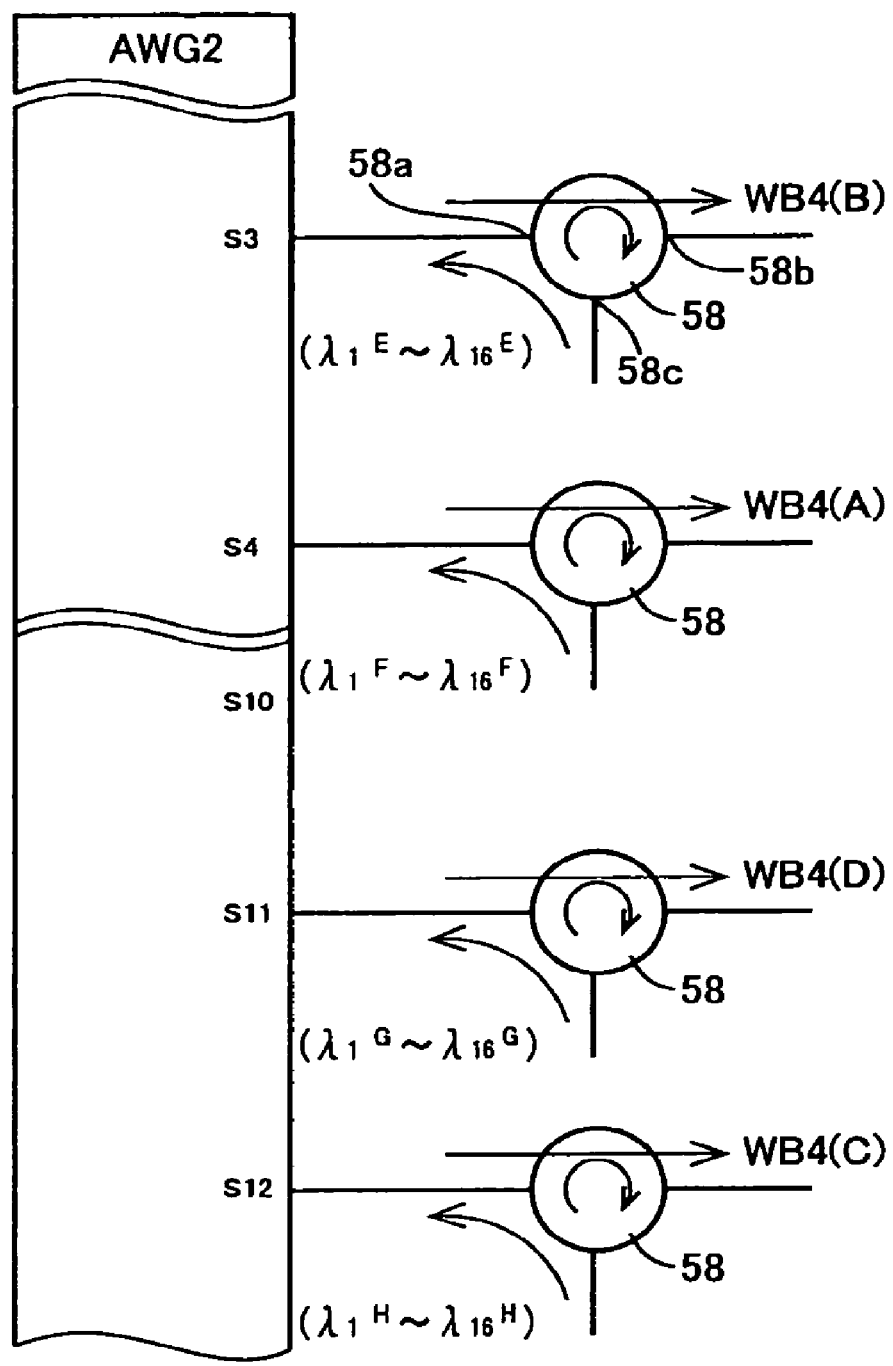
FIG. 21 is a view for explaining connection between optical circulators and a second array waveguide grating AWG1, in the Embodiment 13 of FIG. 19.

FIG. 19 shows the optical waveband multiplexer/demultiplexer 10 of FIGS. 10 and 11 modified to add eight optical circulators 58. Each optical circulator 58 is provided with a plurality of ports, for example, a first port 58a, a second port 58b and a third port 58c, and is configured such that a light beam incident upon any one of these three ports is outputted from the other port which is adjacent to the above-indicated one port in a direction indicated by an arrow. The optical circulators 58 are provided for the input ports $p_1$, $p_2$, $p_9$ and $p_{10}$ of the first array waveguide grating AWG1, as shown in FIG. 20, and for the output ports $s_3$, $s_4$, $s_{11}$ and $s_{12}$ of the second array waveguide grating AWG2, as shown in FIG. 21. In the presence of the optical circulators 58, it is not necessary to eliminate the optical channels $\lambda_4$, $\lambda_6$, $\lambda_{12}$ and $\lambda_{16}$ from the incident wavelength-division multiplexed light beams $WDM^A$ through $WDM^H$, for preventing the output ports $s_3$, $s_4$, $s_{11}$ and $s_{12}$ of the second array waveguide grating AWG2 from outputting the corresponding wavebands. Therefore, each of the incident wavelength-division multiplexed light beams $WDM^A$ through $WDM^H$ includes the 16 optical channels $\lambda_1$-$\lambda_{16}$.

Like the embodiment of FIGS. 10 and 11, the optical waveband multiplexer/demultiplexer 10 of the present embodiment functions as a bidirectional optical waveband demultiplexer and a bidirectional optical waveband multiplexer, and is not provided with unnecessary ports and is not required to eliminate the optical channels 4, $\lambda_6$, $\lambda_{12}$ and $\lambda_{16}$. Thus, the present multiplexer/demultiplexer 10 has an increased degree of utilization efficiency.

Further, the optical circulators 58 are formed integrally with the first and second array waveguide gratings AWG1, AWG2 and optical connecting waveguides 12, on the common substrate 14 of a quartz (or silica) or silicon material, for example, as a monolithic structure of a silica-based waveguide planar lightwave circuit (PLC) formed of a quartz (or silica) material, in a desired waveguide pattern of cladding and core, for example. Thus, the present optical waveband multiplexer/demultiplexer 10 can be further small-sized.

Embodiment 14

Referring next to FIGS. 23-30, there will be described optical waveband selective switches 60 each of which is provided with the optical waveband multiplexer/demultiplexer 10 according to any one of the preceding embodiments and which is configured such that desired ones of the wavebands separated from the incident wavelength-division multiplexed light beams are combined together into wavelength-division multiplexed light beams, and these multiplexed light beams are "routed" in desired directions. The optical waveband selective switches 60 are arranged (1) to utilize the characteristic of the array waveguide gratings AWG1, AWG2 that the output ports for outputting the separated wavebands are shifted by one position with the shifting of the input ports by one position, and (2) to enable the wavelength-division multiplexed light beams to be transmitted twice through the first and second array waveguide gratings AWG1, AWG2, and (3) to utilize optical switches for selecting the ports through which the wavelength-division multiplexed light beams are again transmitted twice through the array waveguide gratings AWG1, AWG2. These three arrangements permit selected combinations of desired wavebands to be outputted from the input ports or output ports of the array waveguide gratings AWG1, AWG2. These optical waveband selective switches 60 of FIGS. 23-30, which do not have mechanical movable portions and therefore do not require complicated adjustments, ensure a stable waveband selecting operation and is simple in construction and extremely small-sized.

Figure 23:
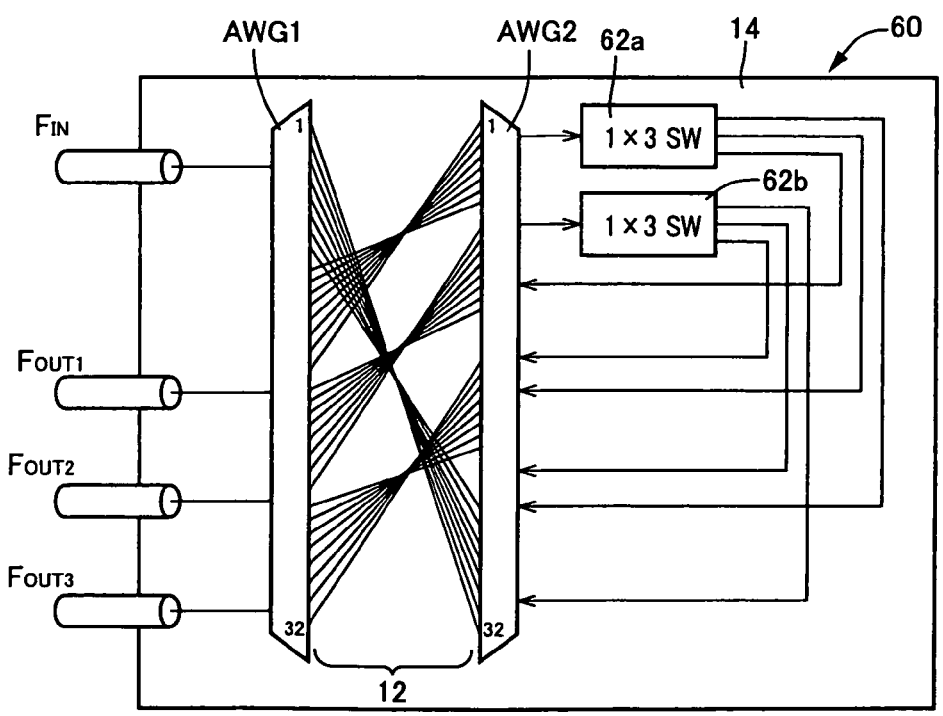
FIG. 23 is a schematic view for explaining an arrangement of an optical waveband selective switch according to another embodiment of this invention.
Figure 24:
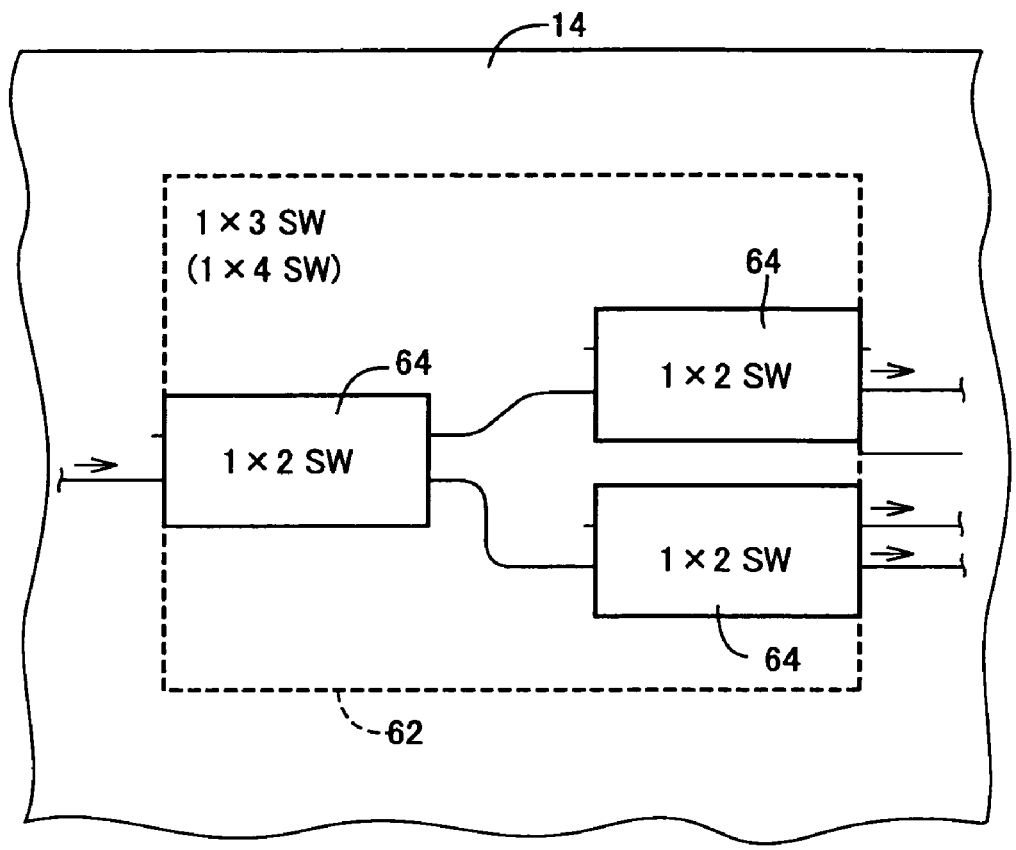
FIG. 24 is a schematic view for explaining an arrangement of an optical switch used in the optical waveband selective switch of FIG. 23.

The schematic view of FIG. 23 shows the optical waveband selective switch 60 of a 1-input 3-outputs merging type which is provided with the first and second array waveguide gratings AWG1, AWG2 connected to each other by 32 optical connecting waveguides 12 (32 wave paths) which are grouped into units each consisting of eight waveguides, as in the embodiment of FIG. 7. The selective switch 60 is further provided with two 1×3SW (1-input 3-outputs) type optical switches 62a, 62b upon which the wavebands outputted from the second array waveguide grating AWG2 are incident and from which the desired combinations of wavebands are outputted from the respective three output ports, where the first or second array waveguide grating AWG1, AWG2 demultiplexes the wavelength-division multiplexed light beams into eight wavebands WB1 through WB8 each consisting of a bundle of four wave paths. The selective switch 60 has one input fiber $F_{IN}$ and three output fibers $F_{OUT}$. Although the embodiment of FIG. 23 is provided with only two 1×3SW (1-input 3-outputs) optical switches 62a, 62b connected to the second array waveguide grating AWG2, the optical switch 62 may be connected to each of the eight ports of the second array waveguide grating AWG2 from which the respective eight wavebands WB1-WB8 are outputted. Where the 32 wave paths are grouped into four units corresponding to four wavebands WB1-WB4 each consisting of a bundle of eight wave paths, the selective switch 60 is of 1-input 7-outputs merging type. Where the bi-directional output fibers are used, the number of the output fibers is further increased. Where the 32 wave paths are selectively grouped into seven units corresponding to seven wavebands WB1-WB7 each consisting of a bundle of four wave paths, the selective switch 60 is of 1-input 7-outputs merging type, or of double 1-input 3-outputs merging type.

For example, each of the 1×3SW (1-input 3-outputs) optical switches 62a, 62b consists of three 1×2SW (1-input 2-outputs) fundamental optical switches 64 which are connected to each other such that one of the three 1×2SW fundamental optical switches 64 is connected at its outputs to the other two fundamental optical switches 64 arranged in parallel connection to each other. Similarly, a 1×4SW (1-input 4-outputs) optical switch 62 may be obtained. Further, a 1×5SW, a 1×6SW, a 1×7SW and a 1×8SW optical switch may be obtained by connecting a further fundamental optical switch or switches 64 to the output side of the three fundamental optical switches 64 one of which is connected at its outputs to the other two fundamental optical switches 64 arranged in parallel connection to each other.

Figure 25:
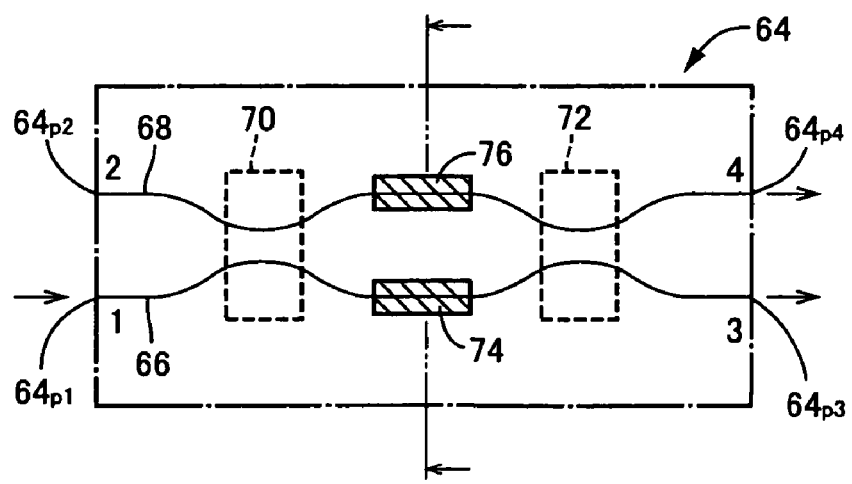
FIG. 25 is a view for explaining a fundamental optical switch used as the optical switch of FIG. 24.

As shown in FIG. 25, each fundamental optical switch 64 includes a first arm waveguide 66 extending from a first port $64p_1$ to a third port $64p_3$, a second arm waveguide 68 extending from a second port $64p_2$ to a fourth port $64p_4$, a pair of 3 dB directional couplers 70, 72 constituted by portions of the first and second arm waveguides 66, 68 which are located close to each other, and thin-film heaters 74, 76 which are disposed between the pair of 3 dB directional couplers 70, 72 and through which the first and second arm waveguides 66, 68 extend. In the fundamental optical switch 64, a Mach-Zehnder interferometer is basically constituted by the first and second arm waveguides 66, 68. The Mach-Zehnder interferometer is characterized in that the incident light is outputted through a cross path from the first port $64p_1$ to the fourth port $64p_4$ or from the second port $64p_2$ to the third port $64p_3$, when an optical path length difference ΔL of the first and second arm waveguides 66, 68 is zero, or through a bar path from the first port $64p_1$ to the third port $64p_3$ or from the second port $64p_2$ to the fourth port $64p_4$, when the optical path length difference ΔL is equal to a half wavelength. Therefore, the input optical signal can be outputted from either the third port $64p_3$ or the fourth port $p_4$, by controlling the optical path length difference ΔL by utilizing a thermo-optic effect achieved by heat generated by the thin-film heaters 74, 76 which function as an optical-path-length-difference changing device to change the optical path length difference ΔL. Thus, the 1-input 2-outputs optical switch (1×2SW) can be obtained.

Figure 26:
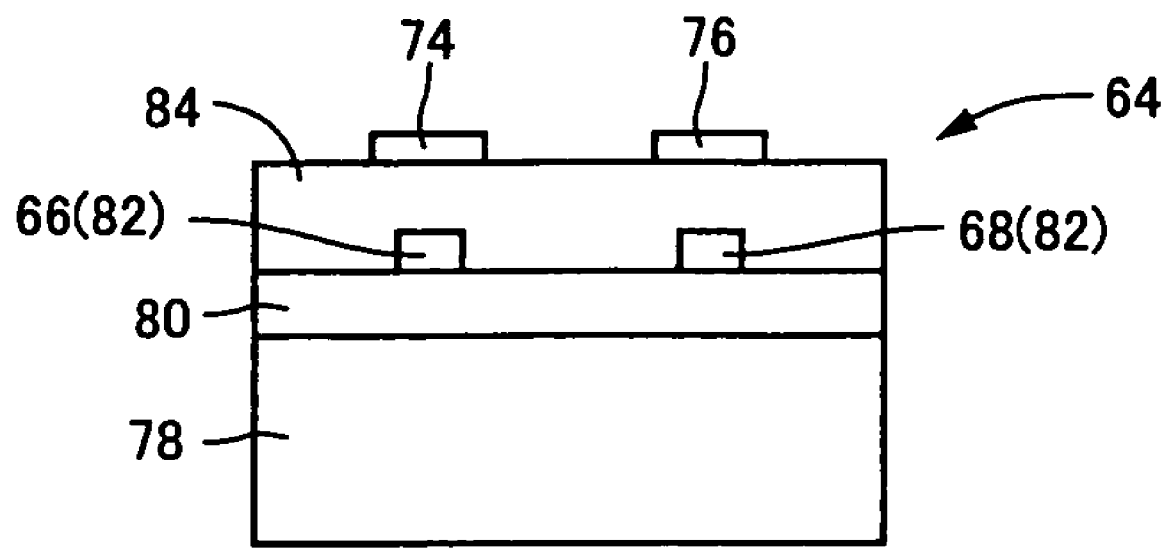
FIG. 26 is a cross sectional view for explaining an arrangement of the fundamental optical switch of FIG. 25.

The fundamental optical switch 64 is formed like the above-described silica-based waveguide planar lightwave circuit (PLC). Namely, a lower cladding layer 80 of about several tens of μm and a core layer 82 of about 10 μm indicated in FIG. 26 are formed by depositing on a Si substrate 78 fine particles of a quartz glass by a hydrolysis deposition process (FHD) and sintering a layer of the fine particles in an electric furnace. The first and second arm waveguides 66, 68 are formed in the desired pattern by subjecting the sintered layer to a combination of photolithography and reactive ion etching processes, and an upper cladding layer 84 is formed so as to cover the first and second arm waveguides 66, 68. Then, the thin-film heaters 74, 76 are formed in the desired pattern, by sputtering and etching, for example, in alignment with the first and second arm waveguides 66, 68.

The optical switches 62a, 62b constituted by the fundamental optical switches 64 are formed integrally with the first and second array waveguide gratings AWG1, AWG2 and optical connecting waveguides 12, on the common substrate 14 of a quartz or silicon material, for example, as a monolithic structure of a silica-based waveguide planar lightwave circuit (PLC) formed of a quartz material, in a desired waveguide pattern of cladding and core, for example. Thus, the present optical waveband selective switch 60 can be further small-sized.

Embodiment 15

Figure 27:
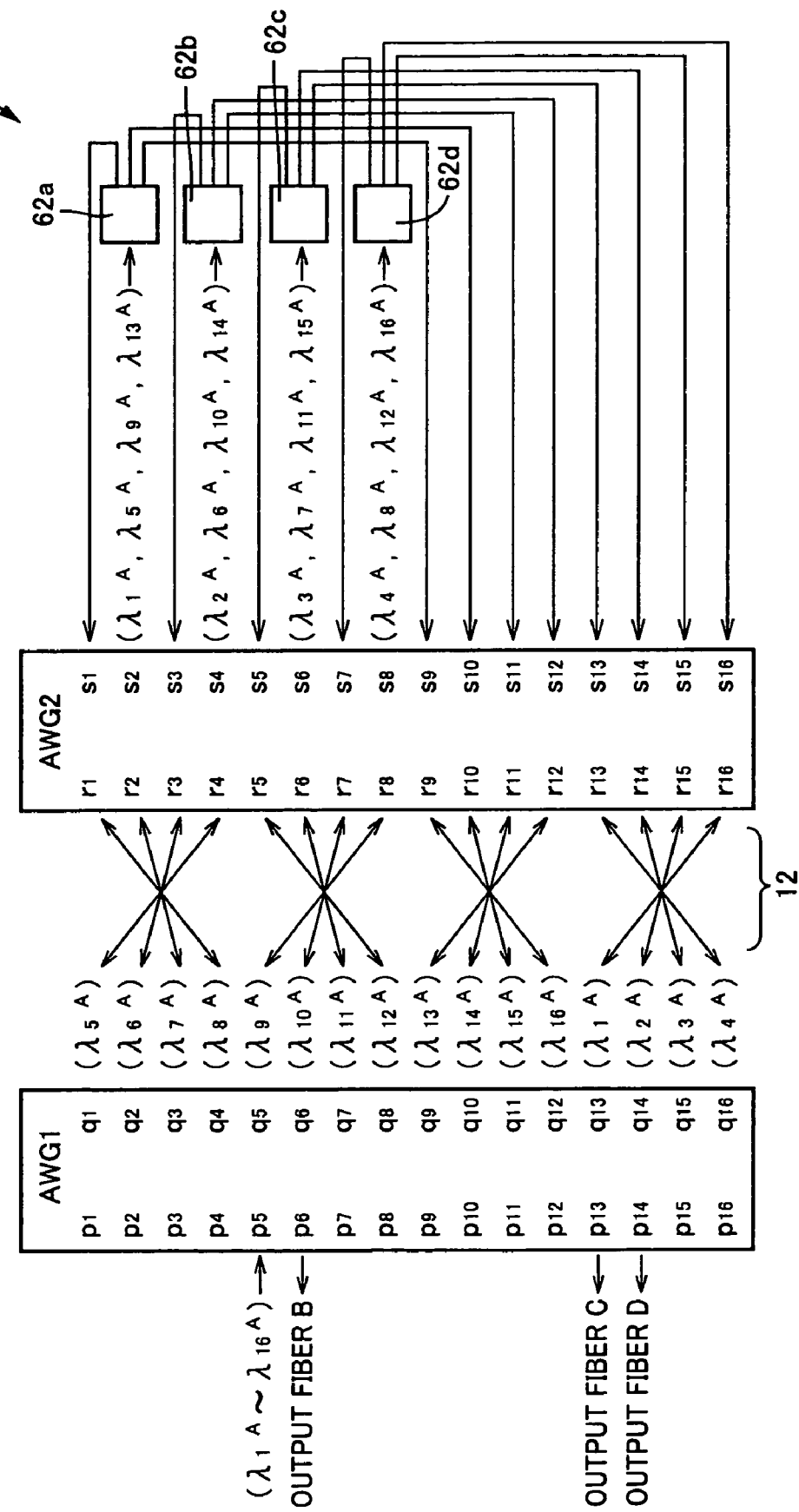
FIG. 27 is a schematic view for explaining an arrangement and an operation of an optical waveband selective switch according to a further embodiment of this invention.

FIG. 27 shows an embodiment of a 1-input 3-outputs type optical waveband selective switch configured to output wavebands of non-successive wave channel type. The optical waveband selective switch 60 of FIG. 27 includes the optical waveband multiplexer/demultiplexer 10 of Embodiment 4 of FIG. 8, and four optical switches 62a, 62b, 62c and 62d. In this optical waveband selective switch 60, the optical switch 62a selects one of the output ports $s_1$, $s_9$ and $s_{10}$ of the second array waveguide grating AWG2 through which the waveband ($\lambda_1^A$, $\lambda_5^A$, $\lambda_9^A$, $\lambda_{13}^A$) that includes the optical channels included in the first wavelength-division multiplexed light beam $WDM^A$ (optical channels $\lambda_1^A$-$\lambda_{16}^A$) incident upon the input port $p_5$ of the first array waveguide grating AWG1 and that is outputted from the output port $s_2$ is again incident upon the second array waveguide grating AWG2, and the optical switch 62b selects one of the output ports $s_3$, $s_{11}$ and $s_{12}$ of the second array waveguide grating AWG2 through which the waveband ($\lambda_2^A$, $\lambda_6^A$, $\lambda_{10}^A$, $\lambda_{14}^A$) outputted from the output port $s_4$ is again incident upon the second array waveguide grating AWG2. while the optical switch 62c selects one of the output ports $s_5$, $s_{13}$ and $s_{14}$ of the second array waveguide grating AWG2 through which the waveband ($\lambda_3^A$, $\lambda_7^A$, $\lambda_{11}^A$, $\lambda_{15}^A$) outputted from the output port $s_6$ is again incident upon the second array waveguide grating AWG2. Further, the optical switch 62d selects one of the output ports $s_7$, $s_{15}$ and $s_{16}$ of the second array waveguide grating AWG2 through which the waveband ($\lambda_4^A$, $\lambda_8^A$, $\lambda_{12}^A$, $\lambda_{16}^A$) outputted from the output port $s_8$ is again incident upon the second array waveguide grating AWG2. As a result, selected three of the wavebands WB1(A), WB2(A), WB3(A) and WB4(A) are outputted from the respective three input ports $p_6$, $p_{13}$ and $p_{14}$ of the first array waveguide grating AWG1. Each of these wavebands WB includes the selected four optical channels which are included in the first wavelength-division multiplexed light beam $WDM^A$ (optical channels $\lambda_1^A$-$\lambda_{16}^A$) and which are non-successively spaced apart from each other at an interval of 400 GHz along the axis of wavelength.

In the optical waveband selective switch 60 according to the present Embodiment 15, the input port $p_5$ selected from the input ports $p_5$, $p_6$, $p_{13}$ and $p_{14}$ upon which the first, second, third and fourth wavelength-division multiplexed light beams $WDM^A$-$WDM^D$ are incident in the optical waveband multiplexer/demultiplexer 10 of the Embodiment 4 of FIG. 8 is used as an input port of the selective switch, while the other three input ports $p_6$, $p_{13}$ and $p_{14}$ are used as selected-waveband output ports. The optical switches 62a, 62b, 62c and 62d are provided for the output ports $s_2$, $s_4$, $s_6$ and $s_8$ from which the optical channels ($\lambda_1^A$-$\lambda_{16}^A$) included in the first wavelength-division multiplexed light beam $WDM^A$ incident upon the input port $p_5$ used as the input port of the selective switch in the optical waveband multiplexer/demultiplexer 10 of the Embodiment 4 of FIG. 8 are outputted, so that the wavebands outputted from those output ports $s_2$, $s_4$, $s_6$ and $s_8$ are selectively inputted to the output ports ($s_1$, $s_9$, $s_{10}$), ($s_3$, $s_{11}$, $s_{12}$), ($s_5$, $s_{13}$, $s_{14}$), ($s_7$, $s_{15}$, $s_{16}$) from which the wavebands including the optical channels ($\lambda_1^B$-$\lambda_{16}^B$), ($\lambda_1^C$-$\lambda_{16}^C$), ($\lambda_1^D$-$\lambda_{16}^D$) included in the second, third and fourth wavelength-division multiplexed light beams $WDM^B$, $WDM^C$ and $WDM^D$ are outputted when these light beams are incident upon the above-indicated other input ports $p_6$, $p_{13}$ and $p_{14}$.

Embodiment 16

Figure 28:
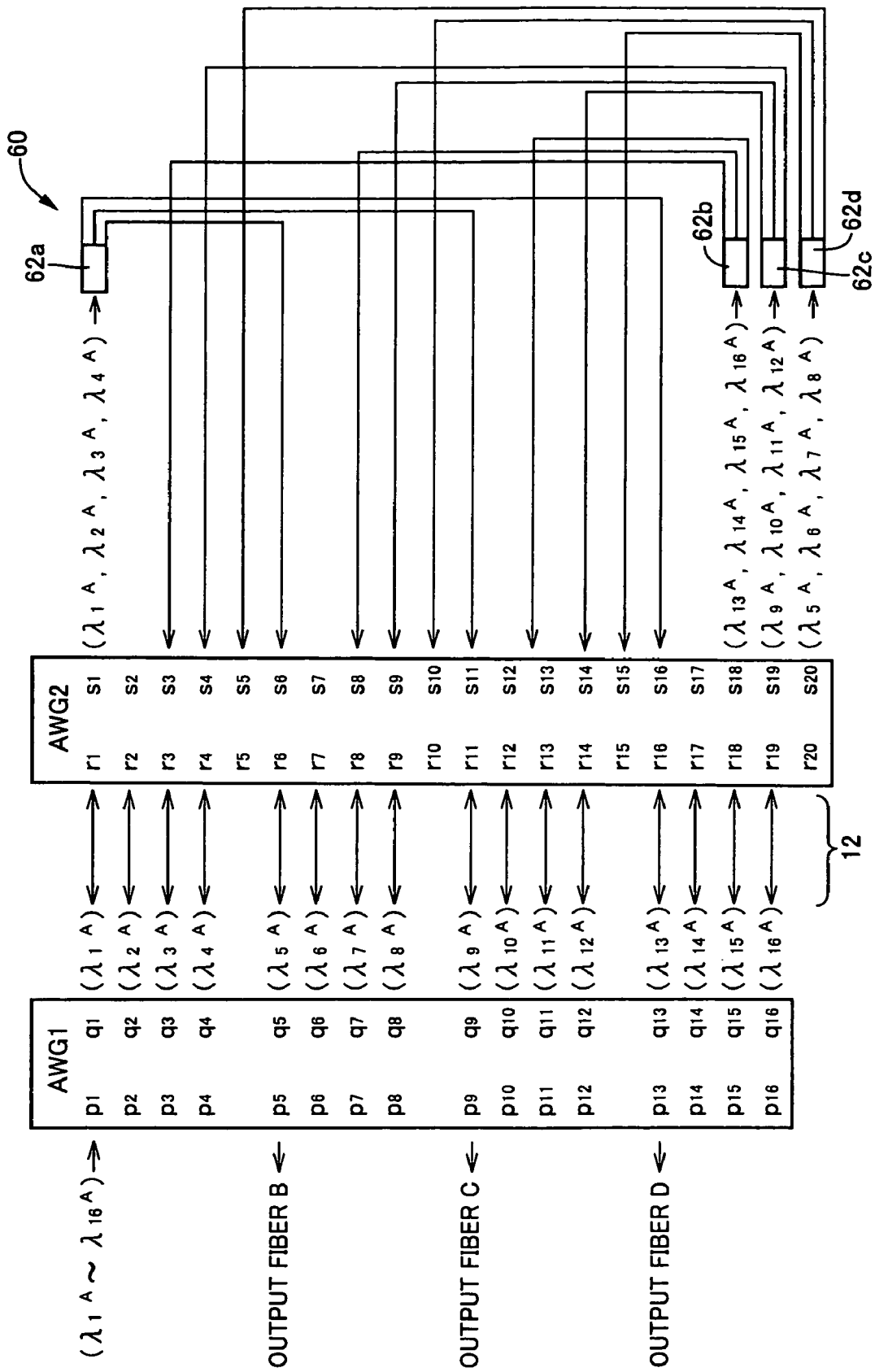
FIG. 28 is a schematic view for explaining an arrangement and an operation of an optical waveband selective switch according to a further embodiment of this invention.

FIG. 28 shows an embodiment of a 1-input 3-outputs type optical waveband selective switch configured to output wavebands of successive wave channel type. The optical waveband selective switch 60 of FIG. 28 includes the optical waveband multiplexer/demultiplexer 10 of Embodiment 2 of FIG. 6, and four 1×3SW optical switches 62a, 62b, 62c and 62d. In this optical waveband selective switch 60, the optical switch 62a selects one of the output ports $s_6$, $s_{18}$ and $s_{16}$ of the second array waveguide grating AWG2 through which the waveband ($\lambda_1^A$, $\lambda_2^A$, $\lambda_3^A$, $\lambda_4^A$) that includes the optical channels included in the first wavelength-division multiplexed light beam $WDM^A$ (optical channels $\lambda_1^A$-$\lambda_{16}^A$) incident upon the input port $p_1$ of the first array waveguide grating AWG1 and that is outputted from the output port $s_1$ is again incident upon the second array waveguide grating AWG2, and the optical switch 62b selects one of the output ports $s_3$, $s_8$ and $s_{13}$ of the second array waveguide grating AWG2 through which the waveband ($\lambda_{13}^A$, $\lambda_{14}^A$, $\lambda_{15}^A$, $\lambda_{16}^A$) outputted from the output port S18 is again incident upon the second array waveguide grating AWG2. while the optical switch 62c selects one of the output ports $s_4$, $s_9$ and $s_{14}$ of the second array waveguide grating AWG2 through which the waveband ($\lambda_9^A$, $\lambda_{10}^A$, $\lambda_{11}^A$, $\lambda_{12}^A$) outputted from the output port $s_{19}$ is again incident upon the second array wave guide grating AWG2. Further, the optical switch 62d selects one of the output ports $s_{15}$, $s_{10}$ and $s_{15}$ of the second array waveguide grating AWG2 through which the waveband ($\lambda_5^A$, $\lambda_6^A$, $\lambda_7^A$, $\lambda_8^A$) outputted from the output port $s_{20}$ is again incident upon the second array waveguide grating AWG2. As a result, selected the wavebands WB1(A), WB2(A) and WB3(A) are outputted from the respective three input ports $p_2$, $p_9$ and $p_{13}$ of the first array waveguide grating AWG1. Each of these wavebands WB includes the selected four optical channels which are included in the first wavelength-division multiplexed light beam $WDM^A$ (optical channels $\lambda_1^A$-$\lambda_{16}^A$) and which are successively spaced apart from each other at an interval of 100 GHz along the axis of wavelength.

In the optical waveband selective switch 60 according to the present Embodiment 16, the input port $p_1$ selected from the input ports $p_1$, $p_5$, $p_9$ and $p_{13}$ upon which the first, second, third and fourth wavelength-division multiplexed light beams $WDM^A$-$WDM^D$ are incident is used as an input port of the selective switch in the optical waveband multiplexer/demultiplexer 10 of the Embodiment 2 of FIG. 6, while the other three input ports $p_5$, $p_9$ and $p_{13}$ are used as selected-waveband output ports. The optical switches 62a, 62b, 62c and 62d are provided for the output ports $s_1$, $s_{18}$, $s_{19}$ and $s_{20}$ from which the optical channels ($\lambda_1^A$-$\lambda_{16}^A$) included in the first wavelength-division multiplexed light beam $WDM^A$ incident upon the input port $p_1$ used as the input port of the selective switch in the optical waveband multiplexer/demultiplexer 10 of the Embodiment 2 of FIG. 6 are outputted, so that the wavebands outputted from those output ports $s_1$, $s_{18}$, $s_{19}$ and $s_{20}$ are selectively inputted to the output ports ($s_6$, $s_{11}$, $s_{16}$), ($s_3$, $s_8$, $s_{13}$), ($s_4$, $s_9$, $s_{14}$), ($s_5$, $s_{10}$, $s_{15}$) from which the wavebands including the optical channels ($\lambda_1^B$-$\lambda_{16}^B$), ($\lambda_1^C$-$\lambda_{16}^C$), ($\lambda_1^D$-$\lambda_{16}^D$) included in the second, third and fourth wavelength-division multiplexed light beams $WDM^B$, $WDM^C$ and $WDM^D$ are outputted when these light beams are incident upon the above-indicated other input ports $p_5$, $p_9$ and $p_{13}$.

Embodiment 17

Figure 29:
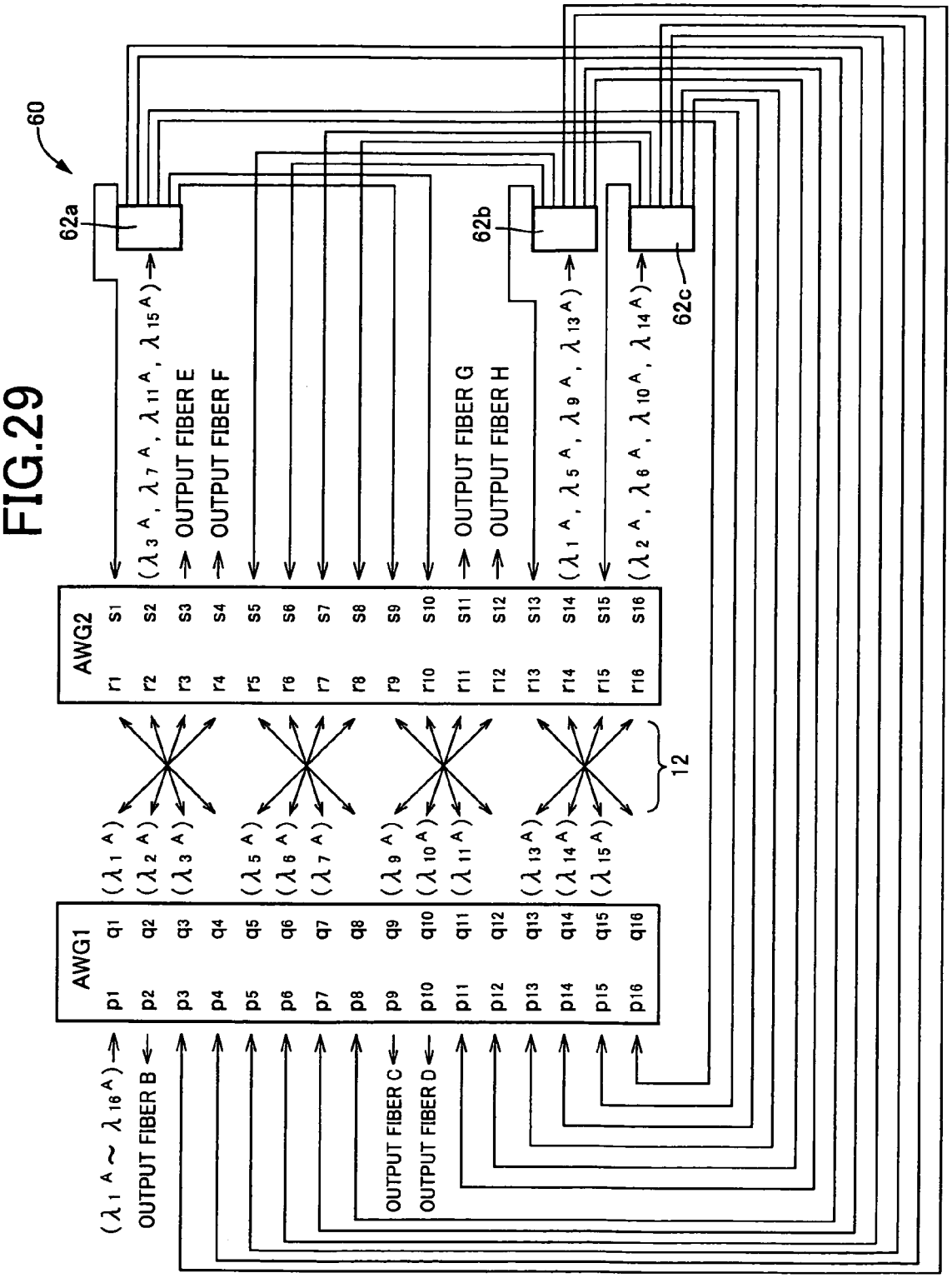
FIG. 29 is a schematic view for explaining an arrangement and an operation of an optical waveband selective switch according to a further embodiment of this invention.

FIG. 29 shows an embodiment of a 1-input 7-outputs type optical waveband selective switch configured to output wavebands of non-successive wave channel type. The optical waveband selective switch 60 of FIG. 29 includes the optical waveband multiplexer/demultiplexer 10 of Embodiment 6 of FIGS. 10 and 11, and three 1×7SW optical switches 62a, 62b and 62c. In this optical waveband selective switch 60, the optical switch 62a selects one of the output ports $s_1$, $s_{10}$ and $s_9$ of the second array waveguide grating AWG2 and the input ports $p_8$, $p_7$, $p_{16}$ and $p_{15}$ of the first array waveguide grating AWG1 through which the waveband ($\lambda_3^A$, $\lambda_7^A$, $\lambda_1^A$, $\lambda_{16}^A$) that includes the optical channels included in the first wavelength-division multiplexed light beam $WDM^A$ (optical channels $\lambda_1^A$-$\lambda_{16}^A$) incident upon the input port $p_1$ of the first array waveguide grating AWG1 and that is outputted from the output port $s_2$ is again incident upon the second array waveguide grating AWG2 or the first array waveguide grating AWG1, and the optical switch 62b selects one of the output ports $s_{13}$, $s_6$ and $s_5$ of the second array waveguide grating AWG2 and the input ports $p_3$, $p_4$, $p_{11}$ and $p_{12}$ of the first array waveguide grating AWG1 through which the waveband ($\lambda_1^A$, $\lambda_5^A$, $\lambda_9^A$, $\lambda_{13}^A$) outputted from the output port $s_{14}$ is again incident upon the second array waveguide grating AWG2 or first array waveguide grating AWG1. while the optical switch 62c selects one of the output ports $s_{15}$, $s_8$ and $s_7$ of the second array waveguide grating AWG2 and the input ports $p_5$, $p_6$, $p_{13}$ and $p_{14}$ of the first array waveguide grating AWG1 through which the waveband ($\lambda_1^A$, $\lambda_6^A$, $\lambda_{10}^A$, $\lambda_{14}^A$) outputted from the output port $s_{16}$ is again incident upon the second array waveguide grating AWG2 or the first array waveguide grating AWG1. As a result, selected three of the wavebands WB1(A), WB2(A), WB3(A), WB4(A), WB5(A), WB6) and WB7(A) are outputted from the respective three input ports $p_2$, $p_4$ and $p_{10}$ of the first array waveguide grating AWG1. Each of these wavebands WB includes the selected four optical channels which are included in the first wavelength-division multiplexed light beam $WDM^A$ (optical channels $\lambda_1^A$-$\lambda_{16}^A$) and which are non-successively spaced apart from each other at an interval of 400 GHz along the axis of wavelength.

In the optical waveband selective switch 60 according to the present Embodiment 17, the input port $p_1$ which is selected from the input ports $p_1$, $p_2$, $s_9$ and $p_{10}$ upon which the first, second, third, fourth, fifth, sixth, seventh and eighth wavelength-division multiplexed light beams $WDM^A$-$WDM^H$ are incident and from the input ports (output ports) $s_3$, $s_4$, $s_{11}$ and $s_{12}$ upon which the fifth, sixth, seventh and eighth wavelength-division multiplexed light beams $WDM^E$-$WDM^H$ are incident in the reverse direction is used as an input port of the selective switch in the optical waveband multiplexer/demultiplexer 10 of the Embodiment 6 of FIGS. 10 and 11, while the other seven input ports $p_2$, $p_9$, $p_{10}$, $s_3$, $s_4$, $s_{11}$ and $s_{12}$ are used as selected-waveband output ports. The 1×7SW optical switches 62a, 62b and 62c are provided for the output port $s_2$, $s_{14}$ and $s_{16}$ from which the optical channels ($\lambda_1^A$-$\lambda_{16}^A$) included in the first wavelength-division multiplexed light beam $WDM^A$ incident upon the input port $p_1$ used as the input port of the selective switch in the optical waveband multiplexer/demultiplexer 10 of the Embodiment 6 of FIGS. 10 and 11 are outputted, so that the wavebands outputted from those output ports $s_2$, $s_{14}$ and $s_{16}$ are selectively inputted to the output ports ($s_1$, $s_{10}$, $s_9$, $s_8$, $s_7$, $s_{16}$, $s_{15}$), ($s_{13}$, $s_6$, $s_5$, $s_3$, $s_4$, $s_1$, $s_{12}$), ($s_{15}$, $s_8$, $s_7$, $s_5$, $s_6$, $s_{13}$, $s_{14}$) from which the wavebands including the optical channels ($\lambda_1^B$-$\lambda_{16}^B$), ($\lambda_1^C$-$\lambda_{16}^C$), ($\lambda_1^D$-$\lambda_{16}^D$) ($\lambda_1^E$-$\lambda_{16}^E$), ($\lambda_1^F$-$\lambda_{16}^F$), ($\lambda_1^G$-$\lambda_{16}^G$) ($\lambda_1^H$-$\lambda_{16}^H$) included in the second, third, fourth, fifth, sixth, seventh and eighth wavelength-division multiplexed light beams $WDM^B$, $WDM^C$, $WDM^D$, $WDM^E$, $WDM^F$, $WDM^G$ and $WDM^H$ are outputted when these light beams are incident upon the above-indicated other input ports $p_2$, $p_9$, $p_{10}$. $s_3$, $s_4$, $s_{11}$ and $s_{12}$.

Embodiment 18

Figure 30:
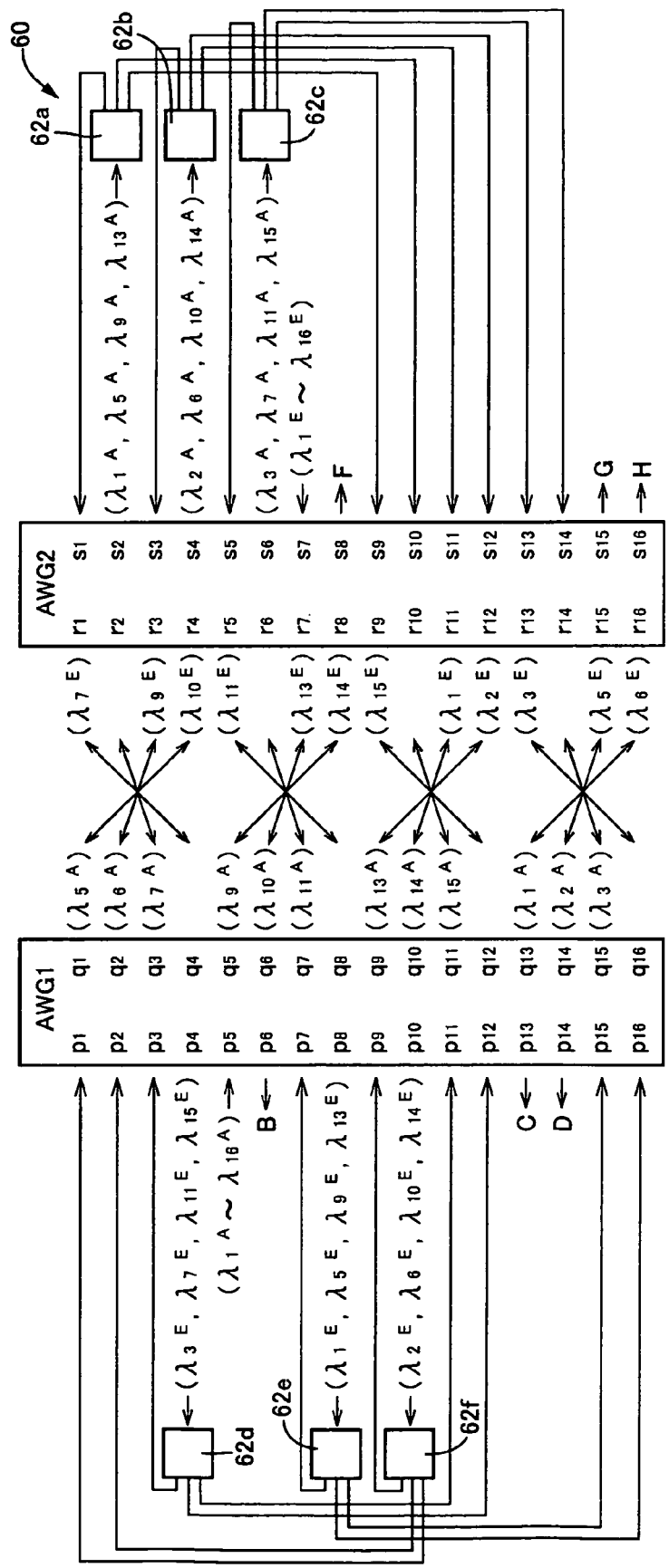
FIG. 30 is a schematic view for explaining an arrangement and an operation of an optical waveband selective switch according to a further embodiment of this invention.

FIG. 30 shows an embodiment of a double 1-input 3-outputs type optical waveband selective switch configured to output wavebands of non-successive wave channel type. The optical waveband selective switch 60 of FIG. 30 includes the optical waveband multiplexer/demultiplexer 10 of Embodiment 4 of FIG. 8, and six optical switches 62a, 62b, 62c, 62d, 64e and 64f. In this optical waveband selective switch 60, the optical switch 62a selects one of the output ports $s_1$, $s_{10}$ and $s_9$ of the second array waveguide grating AWG2 through which the waveband ($\lambda_1^A$, $\lambda_5^A$, $\lambda_9^A$, $\lambda_{13}^A$) that includes the optical channels included in the first wavelength-division multiplexed light beam $WDM^A$ (optical channels $\lambda_1^A$-$\lambda_{16}^A$) incident upon the input port $p_5$ of the first array waveguide grating AWG1 and that is outputted from the output port $s_2$ is again incident upon the second array waveguide grating AWG2, and the optical switch 62b selects one of the output ports $s_3$, $s_{12}$ and $s_{11}$ of the second array waveguide grating AWG2 through which the waveband ($\lambda_2^A$, $\lambda_6^A$, $\lambda_{10}^A$, $\lambda_{14}^A$) outputted from the output port $s_6$ is again incident upon the second array waveguide grating AWG2. while the optical switch 62c selects one of the output ports $s_5$, $s_{14}$ and $s_{13}$ of the second array waveguide grating AWG2 through which the waveband ($\lambda_3^A$, $\lambda_7^A$, $\lambda_{11}^A$, $\lambda_{15}^A$) outputted from the output port $s_6$ is again incident upon the second array waveguide grating AWG2. As a result, wavebands WB1(A), WB2(A) and WB3(A) are outputted from the respective three input ports $p_6$, $p_{13}$ and $p_{14}$ of the first array waveguide grating AWG1. Each of these wavebands WB includes the selected four optical channels which are included in the first wavelength-division multiplexed light beam $WDM^A$ (optical channels $\lambda_1^A$-$\lambda_{16}^A$) and which are non-successively spaced apart from each other at an interval of 400 GHz along the axis of wavelength.

Further, the optical switch 62d selects one of the output ports $p_3$, $p_{12}$ and $p_{11}$ of the first array waveguide grating AWG1 through which the waveband ($\lambda_3^E$, $\lambda_7^E$, $\lambda_{11}^E$, $\lambda_{15}^E$) outputted from the input port $p_4$ is incident upon the first array waveguide grating AWG1, and the optical switch 62e selects one of the output ports $p_7$, $p_{16}$ and $p_{15}$ of the first array waveguide grating AWG1 through which the waveband ($\lambda_1^E$, $\lambda_5^E$, $\lambda_9^E$, $\lambda_{13}^E$) outputted from the input port $p_8$ is incident upon the first array waveguide grating AWG1. while the optical switch 62f selects one of the output ports $p_p$, $s_2$ and $s_1$ of the first array waveguide grating AWG1 through which the waveband ($\lambda_2^E$, $\lambda_6^E$, $\lambda_{10}^E$, $\lambda_{14}^E$) outputted from the input port p60 is incident upon the first array waveguide grating AWG1. As a result, wavebands WB1(E), WB2(E) and WB3(E) are outputted from the respective three input ports $s_8$, $s_{15}$ and $s_{16}$ of the second array waveguide grating AWG2. Each of these wavebands WB includes the selected four optical channels which are included in the first wavelength-division multiplexed light beam $WDM^A$ (optical channels $\lambda_1^E$-$\lambda_{16}^E$) and which are non-successively spaced apart from each other at an interval of 400 GHz along the axis of wavelength.

In the optical waveband selective switch 60 according to the present Embodiment 18, the input ports $p_5$ and $s_7$ selected from the input ports $p_5$, $p_6$, $p_{13}$ and $p_{14}$ upon which the first, second, third and fourth wavelength-division multiplexed light beams $WDM^A$-$WDM^D$ are incident and from the input ports (output ports) $s_7$, $s_8$, $s_{15}$ and $s_{16}$ upon which the fifth, sixth, seventh and eighth wavelength-division multiplexed light beams $WDM^E$-$WDM^H$ are incident in the reverse direction are as two input ports of the selective switch in the optical waveband multiplexer/demultiplexer 10 of the Embodiment of FIG. 8, while the other six input ports $p_6$, $p_{13}$, $p_{14}$, $s_8$, $s_{15}$, $s_{16}$, are used as selected-waveband output ports. The optical switches 62a, 62b and 62c are provided for the output ports $s_2$, $s_4$ and $s_6$ from which the optical channels ($\lambda_1^A$-$\lambda_{16}^A$) included in the first wavelength-division multiplexed light beam $WDM^A$ incident upon the input port $p_5$ used as the input port of the selective switch in the optical waveband multiplexer/demultiplexer 10 of the Embodiment 4 of FIG. 8 are outputted, so that the wavebands outputted from those output ports $s_2$, $s_4$ and $s_6$ are selectively inputted to the output ports ($s_1$, $s_9$, $s_{10}$), ($s_3$, $s_{11}$, $s_{12}$), ($s_5$, $s_{13}$, $s_{14}$) from which the wavebands including the optical channels ($\lambda_1^B$-$\lambda_{16}^B$), ($\lambda_1^C$-$\lambda_{16}^C$), ($\lambda_1^D$-$\lambda_{16}^D$) included in the second, third and fourth wavelength-division multiplexed light beams $WDM^B$, $WDM^C$ and $WDM^D$ are outputted when these light beams are incident upon the above-indicated other input ports $p_6$, $p_{13}$ and $p_{14}$. Further, the optical switches 62d, 62e and 62f are provided for the output ports $p_4$, $p_8$ and $s_{10}$ from which the optical channels ($\lambda_1^E$-$\lambda_{16}^E$) included in the fifth wavelength-division multiplexed light beam $WDM^E$ incident upon the input port $p_7$ used as the input port of the selective switch in the optical waveband multiplexer/demultiplexer 10 of the Embodiment 4 of FIG. 8 are outputted, so that the wavebands outputted from those output ports $p_4$, $p_8$ and $p_{10}$ are selectively inputted to the output ports ($p_3$, $p_{11}$, $p_{12}$), ($p_7$, $p_{15}$, $p_{16}$), ($p_9$, $p_1$, $p_2$) from which the wavebands including the optical channels ($\lambda_1^F$-$\lambda_{16}^F$), ($\lambda_1^G$-$\lambda_{16}^G$), ($\lambda_1^H$-$\lambda_{16}^H$) included in the sixth, seventh and eighth wavelength-division multiplexed light beams $WDM^F$, $WDM^G$ and $WDM^H$ are outputted when these light beams are incident upon the above-indicated other input ports $p_8$, $p_{15}$ and $p_{16}$.

Embodiment 19

Figure 31:
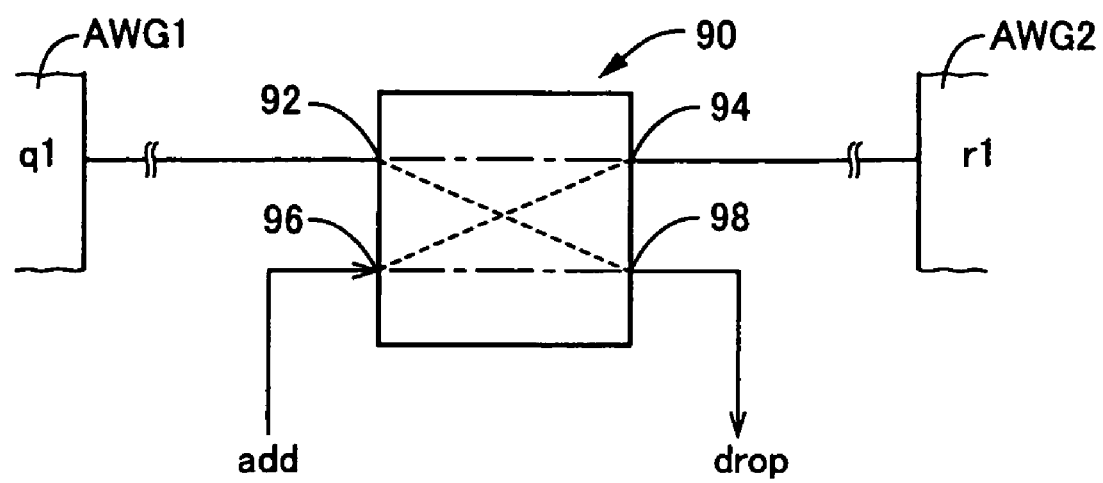
FIG. 31 is a view for explaining an optical switch provided in an optical waveband selective switch according to a further embodiment of this invention.
Figure 32:
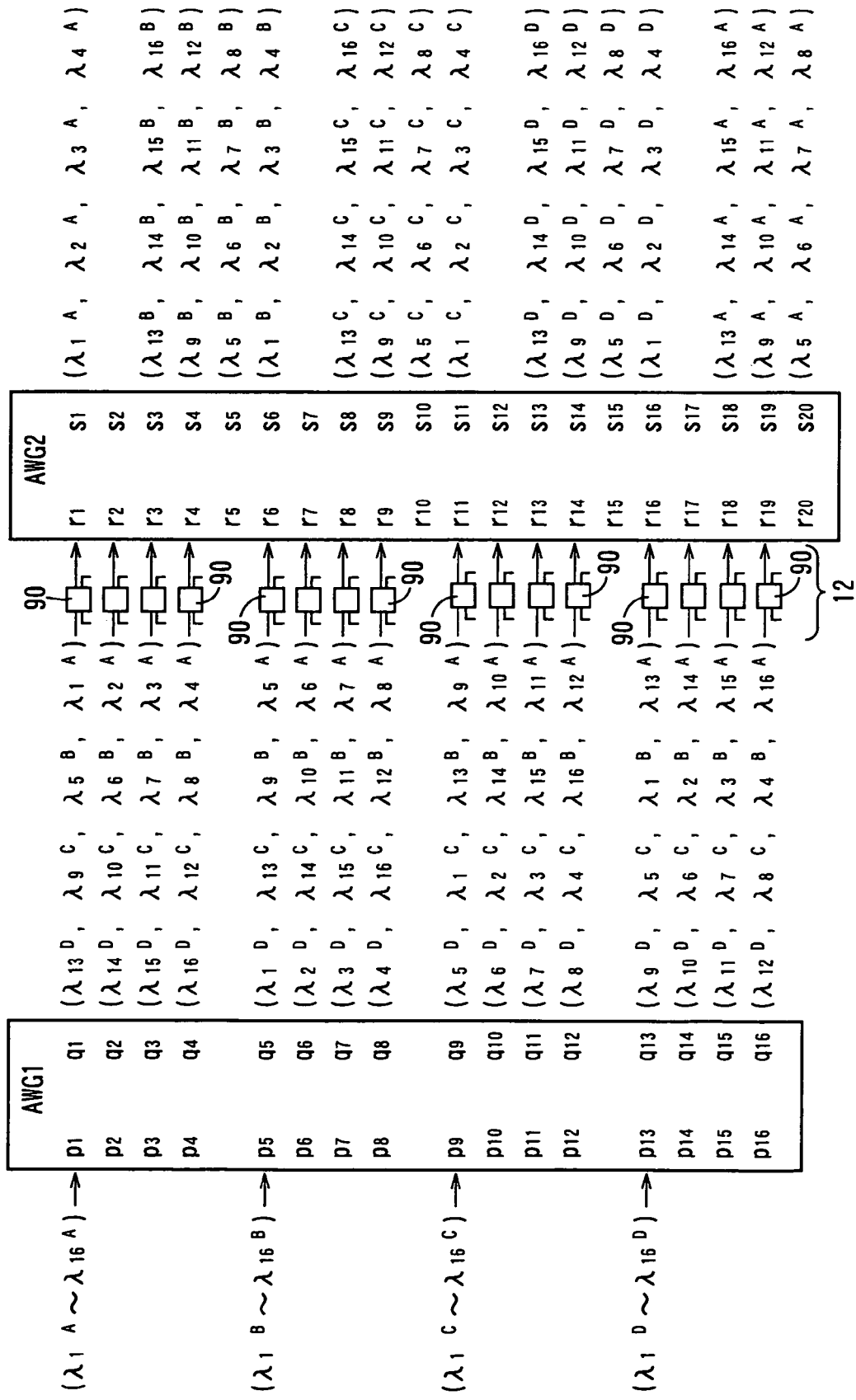
FIG. 32 is a view for explaining an exemplary arrangement of an optical waveband multiplexer/demultiplexer provided with the optical switches of FIG. 31.

A plurality of optical switches 90 each configured as shown in FIG. 31 by way of example may be provided in the respective optical connecting waveguides 12 in the form of optical fibers or three-dimensional optical waveguides having a cross-over structure, between the first and second array waveguide gratings AWG1 and AWG2 of the preceding embodiments. FIG. 32 shows an embodiment wherein the optical switches 90 are provided for the optical waveband multiplexer/demultiplexer of FIG. 6. The optical switches 90 are 2×2SW optical switches disposed between the respective output ports q1-q16 of the first array waveguide grating AWG1 and the respective input ports $r_1$-$r_4$, $r_6$-$r_9$, $r_{11}$-$r_{14}$, $r_{16}$-$r_{19}$ of the second array waveguide grating AWG2. However, the optical switches 90 may be provided in only selected ones of the optical connecting waveguides 12. As shown in FIG. 31, each optical switch 90 has an input port 92 and an output port 94, an add port 96 for receiving an added optical signal to be outputted from the output port 94, and a drop port 98 for dropping an incident optical signal incident upon the input port 92. The optical switch 90 is operable utilizing a thermo-optic effect, in a selected one of a go-through state and an add-drop state. In the go-through state, the optical signal incident upon the input port 92 is transmitted to the output port 94, as indicated by one-dot chain line. In the add-drop state, on the other hand, the optical signal incident upon the input port 92 is dropped out from the drop port 98 while at the same time the added optical signal, which has been received through the add port 96 and the wavelength of which is the same as or different from that of the dropped incident optical signal, is outputted from the output port 94, in place of the optical signal incident upon the input port 92, as indicated by broken lines. Preferably, the optical switch 90 is integrated together with the first and second array waveguide gratings AWG1, AWG2 in the silica-based waveguide planar lightwave circuit (PLC).

In the present embodiment, it is possible to drop desired ones of the wavebands outputted from the selected output ports $q_1$-$q_{16}$ of the first array waveguide grating AWG1, or selected optical channels of the desired wavebands, when the wavelength-division multiplexed light beams are incident upon the first array waveguide grating AWG1, and at the same time insert the desired added optical signals in the form of wavebands or optical channels the wavelength of which is the same as or different from that of the dropped optical signal.

Although the embodiments of the present invention have been described above by reference to the drawings, it is to be understood that the present invention may be otherwise embodied.

In the preceding embodiments, each of the plurality of optical channels $\lambda_1$-$\lambda_k$ included in each of the wavelength-division multiplexed light beams $WDM_i$-$WDM_j$ has one frequency, each wave channel may consists of a group of a plurality of sub-channels. In this case, the group of sub-channels of each wave channel is concurrently subject to a switching operation.

It is to be understood that the present invention may be embodied with various other changes not illustrated therein, which may occur without departing from the spirit of the invention.

The invention claimed is:

1. An optical waveband demultiplexer operable to separate a wavelength-division multiplexed light beam consisting of a plurality of wavebands each including a plurality of optical channels, into a predetermined plurality of wavebands, and to output the separated plurality of wavebands from a plurality of output ports, respectively, said optical waveband demultiplexer comprising:

a first array waveguide grating through which said wavelength-division multiplexed light beam is transmitted and which is capable of performing demultiplexing and multiplexing functions with a resolution corresponding to wavelengths of said optical channels, said first array waveguide grating having a characteristic of sequentially shifting its output ports by one position with shifting of its input ports by one position, and a characteristic of outputting signals of the plurality of optical channels transmitted through one fiber connected to each of the input ports such that the signals are outputted from the respective different output ports; and a second array waveguide grating through which said wavelength-division multiplexed light beam is then transmitted and which is capable of performing demultiplexing and multiplexing functions with a resolution corresponding to the wavelengths of said optical channels, said second array waveguide grating having a characteristic of sequentially shifting its output ports by one position with shifting of its input ports by one position, whereby said wavelength-division multiplexed light beam incident upon predetermined ones of the input ports of said first array waveguide grating is separated into a plurality of wavebands each including the mutually different optical channels which are selected from the optical channels included in the wavelength-division multiplexed light beam incident upon the predetermined input ports and which are different from the optical channels incident upon the other input ports, and the separated plurality of wavebands are respectively outputted concurrently from the plurality of output ports of said second array waveguide grating.

2. The optical waveband demultiplexer according to claim 1, wherein a plurality of mutually different wavelength-division multiplexed light beams which are respectively incident upon the plurality of input ports are separated into the optical channels belonging to the wavebands included in the wavelength-division multiplexed light beams, and the separated optical channels are multiplexed into a predetermined plurality of wavebands, which are outputted from the respective different output ports.

3. The optical waveband demultiplexer according to claim 1, further comprising optical connecting waveguides which connect the output ports of the first array waveguide grating and the input ports of the second array waveguide grating.

4. The optical waveband demultiplexer according to claim 3, wherein said optical connecting waveguides consist of a plurality of waveguides formed in a plane such that the plurality of waveguides do not intersect each other.

5. The optical waveband demultiplexer according to claim 3, wherein each of said first array waveguide grating and said second array waveguide grating is provided with input ports and output ports the number of which is equal to the number of the optical channels included in each of the plurality of wavebands of said wavelength-division multiplexed light beam.

6. The optical waveband demultiplexer according to claim 3, wherein at least one wavelength-division multiplexed light beam is incident upon at least one of the output ports of said second array waveguide grating, in a reverse direction, and each incident wavelength-division multiplexed light beam is separated into predetermined wavebands each included in the multiplexed light beam and having predetermined optical channels, the separated wavebands being outputted from input ports of said first array waveguide grating, which input ports are not used to receive said wavelength-division multiplexed light beam, whereby two demultiplexing functions are performed when the wavelength-division multiplexed light beams are incident bidirectionally, to separate the wavelength-division multiplexed light beams into the wavebands each including the mutually different optical channels included in the incident wavelength-division multiplexed light beams.

7. The optical waveband demultiplexer according to claim 3, wherein at least one of said first array waveguide grating and said second array waveguide grating has a cyclic characteristic of wavelength response such that an output position at which the wavelength-division multiplexed light beam incident upon one of a plurality of input waveguides is output is cyclically shifted by one position with shifting of said one of the plurality of input waveguides by one position.

8. The optical waveband demultiplexer according to claim 3, wherein said first array waveguide grating, said second array waveguide grating, and the optical connecting waveguides connecting the output ports of the first array waveguide grating and the input ports of the second array waveguide grating are integrally provided on a common substrate.

9. The optical waveband demultiplexer according to claim 8, wherein each of said first array waveguide rating and said second array waveguide grating comprises:
   a plurality of array waveguides having respective different optical path lengths;
   an input lens waveguide for distributing the wavelength-division multiplexed light beam incident upon said input ports, to input-side ends of the plurality of array waveguides, respectively; and
   an output lens waveguide for separating the wavelength-division multiplexed light beam outputted from output-side ends of the plurality of array waveguides, into the plurality of optical channels included in the outputted wavelength-division multiplexed light beam, on the basis of a difference of the optical path lengths of the plurality of array waveguides, and for distributing the plurality of optical channels to the predetermined respective output ports.

10. The optical waveband demultiplexer according to claim 8, further comprising an optical switch inserted in each of at least one of the optical connecting waveguides connecting the output ports of the first array waveguide grating and the input ports of the second array waveguide grating, said optical switch being operable to drop an optical signal outputted from the corresponding output port of the first array waveguide grating and to output an added optical signal a wavelength of which is the same as or different from that of the dropped optical signal.

11. The optical waveband demultiplexer according to claim 3, further comprising an optical switch inserted in each of at least one of the optical connecting waveguides connecting the output ports of the first array waveguide grating and the input ports of the second array waveguide grating, said optical switch being operable to drop an optical signal outputted from the corresponding output port of the first array waveguide grating and to output an added optical signal a wavelength of which is the same as or different from that of the dropped optical signal.

12. The optical waveband demultiplexer according to claim 1, wherein said first and second array waveguide gratings are constituted by:
   a single array waveguide grating having a plurality of input ports and a plurality of output ports and configured such that said wavelength-division multiplexed light beam incident upon predetermined ones of the input ports is separated into the plurality of wavebands each including the mutually different optical channels which are selected from the plurality of optical channels included in the incident wavelength-division multiplexed light beam, and the separated plurality of wavebands are outputted from predetermined ones of the output ports; and
   return waveguides connecting the other ones of said plurality of output ports to the other ones of said plurality of input ports, for returning a plurality of optical signals of the wavebands separated from said wavelength-division multiplexed light beam incident upon said predetermined ones of the input ports, from said other ones of the output ports back to said other ones of the input ports, whereby one wavelength-division multiplexed light beam or a plurality of different wavelength-division multiplexed light beams incident upon said predetermined ones of the input ports is/are separated into the plurality of wavebands which are included in said incident wavelength-division multiplexed light beam or beams and each of which includes the mutually different optical channels selected from the plurality of optical channels included in the incident wavelength-division multiplexed light beam or beams, the separated wavebands being outputted from the respective different output ports.

13. The optical waveband demultiplexer according to claim 1, wherein each of the wavebands outputted from the respective output ports consists of the optical channels which are successively spaced apart from each other along an axis of wavelength.

14. The optical waveband demultiplexer according to claim 1, wherein each of the wavebands outputted from the respective output ports consists of the optical channels which are non-successively spaced apart from each other along an axis of wavelength.

15. An optical waveband selective switch, comprising:
   an optical waveband demultiplexer according to claim 1; and
   an optical switch configured to input each of at least one waveband outputted from said optical waveband demultiplexer, to any one of input and output ports of the optical waveband demultiplexer, and wherein a combination of wavebands selected from said at least one waveband is outputted from selected ones of the output ports of the optical waveband demultiplexer.

16. The optical waveband selective switch according to claim 15, wherein a part of a plurality of input ports of said optical waveband demultiplexer upon which a plurality of wavelength-division multiplexed light beams are incident is used as at least one input port of the optical waveband selective switch, while another part of said plurality of input ports is used as selected-waveband output ports from which combinations of wavebands selected from the wavebands included in the wavelength-division multiplexed light beams incident upon said part of the plurality of input ports are outputted.

17. The optical waveband selective switch according to claim 16, wherein said optical switch is provided for each of the plurality of output ports of the optical waveband demultiplexer from which the wavebands included in the wavelength-division multiplexed light beams incident upon said at least one input port of the optical waveband selective switch are outputted, and the optical switch is configured to input the wavebands outputted from said plurality of output ports, selectively to a plurality of output ports from which wavebands included in other wavelength-division multiplexed light beams incident upon said selected-waveband output ports are outputted when said other wavelength-division multiplexed light beams are incident upon said selected-waveband output ports.

18. The optical waveband selective switch according to claim 16, wherein said optical switch is provided for each of the plurality of output ports of the optical waveband demultiplexer from which the wavebands included in the wavelength-division multiplexed light beams incident upon said at least one input port of the optical waveband selective switch are outputted, and the optical switch is configured to input the wavebands outputted from said plurality of output ports, selectively to a plurality of output ports from which the same wavebands included in other wavelength-division multiplexed light beams incident upon said selected-waveband output ports are outputted when said other wavelength-division multiplexed light beams are incident upon said selected-waveband output ports.

19. The optical waveband selective switch according to claim 15, wherein said optical switch is provided on a common substrate, integrally with said first array waveguide grating, said second array waveguide grating and optical connecting waveguides connecting the output ports of the first array waveguide grating and the input ports of the second array waveguide grating of said optical waveband demultiplexer.

20. The optical waveband selector switch according to claim 15, wherein said optical switch includes a fundamental optical switch having a pair of arm waveguides one of which receives an incident light beam, a directional coupler formed locally between said pair of arm waveguides, and an optical-path-length-difference changing device operable to change a difference between optical path lengths of the pair of arm waveguides, for outputting the incident light beam incident upon said one of said pair of arm waveguides, from the other of said pair of arm waveguides.

21. An optical waveband demultiplexer operable to separate a wavelength-division multiplexed light beam consisting of a plurality of wavebands each including a plurality of optical channels, into a predetermined plurality of wavebands, and to output the separated plurality of wavebands from a plurality of output ports, respectively, said optical waveband demultiplexer comprising:
  a first array waveguide grating through which said wavelength-division multiplexed light beam is transmitted and which is capable of performing demultiplexing and multiplexing functions with a resolution corresponding to wavelengths of said optical channels, said first array waveguide grating having a characteristic of sequentially shifting its output ports by one position with shifting of its input ports by one position, and a characteristic of outputting the signals of the plurality of optical channels transmitted through one fiber connected to each of the input ports such that the plurality of optical channels spaced apart from each other at a spacing determined by cyclic characteristic of wavelength response are not concurrently outputted from the same output ports; and
  a second array waveguide grating through which said wavelength-division multiplexed light beam is then transmitted and which is capable of performing demultiplexing and multiplexing functions with a resolution corresponding to the wavelengths of said optical channels, said second array waveguide grating having a characteristic of sequentially shifting its output ports by one position with shifting of its input ports by one position, whereby said wavelength-division multiplexed light beam incident upon predetermined ones of the input ports of said first array waveguide grating is separated into a plurality of wavebands each including the mutually different optical channels which are selected from the optical channels included in the wavelength-division multiplexed light beam incident upon the predetermined input ports and which are different from the optical channels incident upon the other input ports, and the separated plurality of wavebands are respectively outputted concurrently from the plurality of output ports of said second array waveguide grating.

22. The optical waveband demultiplexer according to claim 21, wherein a plurality of mutually different wavelength-division multiplexed light beams which are respectively incident upon the plurality of input ports are separated into the optical channels belonging to the wavebands included in the wavelength-division multiplexed light beams, and the separated optical channels are multiplexed into a predetermined plurality of wavebands, which are outputted from the respective different output ports.

23. The optical waveband demultiplexer according to claim 21, further comprising optical connecting waveguides which connect the output ports of the first array waveguide grating and the input ports of the second array waveguide grating.

24. The optical waveband demultiplexer according to claim 23, wherein said optical connecting waveguides consist of a plurality of waveguides formed in a plane such that the plurality of waveguides do not intersect each other.

25. The optical waveband demultiplexer according to claim 23, wherein each of said first array waveguide grating and said second array waveguide grating is provided with input ports and output ports the number of which is equal to the number of the optical channels included in each of the plurality of wavebands of said wavelength-division multiplexed light beam.

26. The optical waveband demultiplexer according to claim 23, wherein at least one wavelength-division multiplexed light beam is incident upon at least one of the output ports of said second array waveguide grating, in a reverse direction, and each incident wavelength-division multiplexed light beam is separated into predetermined wavebands each included in the multiplexed light beam and having predetermined optical channels, the separated wavebands being outputted from input ports of said first array waveguide grating, which input ports are not used to receive said wavelength-division multiplexed light beam, whereby two demultiplexing functions are performed when the wavelength-division multiplexed light beams are incident bidirect6ionally, to separate the wavelength-division multiplexed light beams into the wavebands each including the mutually different optical channels included in the incident wavelength-division multiplexed light beams.

27. The optical waveband demultiplexer according to claim 23, wherein at least one of said first array waveguide grating and said second array waveguide grating has a cyclic characteristic of wavelength response such that an output position at which the wavelength-division multiplexed light beam incident upon one of a plurality of input waveguides is output is cyclically shifted by one position with shifting of said one of the plurality of input waveguides by one position.

28. The optical waveband demultiplexer according to claim 23, wherein said first array waveguide grating, said second array waveguide grating, and the optical connecting waveguides connecting the output ports of the first array waveguide grating and the input ports of the second array waveguide grating are provided on a common substrate.

29. The optical waveband demultiplexer according to claim 28, wherein each of said first array waveguide rating and said second array waveguide grating comprises:
  a plurality of array waveguides having respective different optical path lengths;
  an input lens waveguide for distributing the wavelength-division multiplexed light beam incident upon said input ports, to input-side ends of the plurality of array waveguides, respectively; and an output lens waveguide for separating the wavelength-division multiplexed light beam outputted from output-side ends of the plurality of array waveguides, into the plurality of optical channels included in the outputted wavelength-division multiplexed light beam, on the basis of a difference of the optical path lengths of the plurality of array waveguides, and for distributing the plurality of optical channels to the predetermined respective output ports.

30. The optical waveband demultiplexer according to claim 28, further comprising an optical switch inserted in each of at least one of the optical connecting waveguides connecting the output ports of the first array waveguide grating and the input ports of the second array waveguide grating, said optical switch being operable to drop an optical signal outputted from the corresponding output port of the first array waveguide grating and to output an added optical signal a wavelength of which is the same as or different from that of the dropped optical signal.

31. The optical waveband demultiplexer according to claim 23, further comprising an optical switch inserted in each of at least one of the optical connecting waveguides connecting the output ports of the first array waveguide grating and the input ports of the second array waveguide grating, said optical switch being operable to drop an optical signal outputted from the corresponding output port of the first array waveguide grating and to output an added optical signal a wavelength of which is the same as or different from that of the dropped optical signal.

32. The optical waveband demultiplexer according to claim 21, wherein said first and second array waveguide gratings are constituted by:
a single array waveguide grating having a plurality of input ports and a plurality of output ports and configured such that said wavelength-division multiplexed light beam incident upon predetermined ones of the input ports is separated into the plurality of wavebands each including the mutually different optical channels which are selected from the plurality of optical channels included in the incident wavelength-division multiplexed light beam, and the separated plurality of wavebands are outputted from predetermined ones of the output ports; and
return waveguides connecting the other ones of said plurality of output ports to the other ones of said plurality of input ports, for returning a plurality of optical signals of the wavebands separated from said wavelength-division multiplexed light beam incident upon said predetermined ones of the input ports, from said other ones of the output ports back to said other ones of the input ports, whereby one wavelength-division multiplexed light beam or a plurality of different wavelength-division multiplexed light beams incident upon said predetermined ones of the input ports is/are separated into the plurality of wavebands which are included in said incident wavelength-division multiplexed light beam or beams and each of which includes the mutually different optical channels selected from the plurality of optical channels included in the incident wavelength-division multiplexed light beam or beams, the separated wavebands being outputted from the respective different output ports.

33. The optical waveband demultiplexer according to claim 21, wherein each of the wavebands outputted from the respective output ports consists of the optical channels which are successively spaced apart from each other along an axis of wavelength.

34. The optical waveband demultiplexer according to claim 21, wherein each of the wavebands outputted from the respective output ports consists of the optical channels which are non-successively spaced apart from each other along an axis of wavelength.

35. An optical waveband selective switch, comprising:
an optical waveband demultiplexer according to claim 21; and
an optical switch configured to input each of at least one waveband outputted from said optical waveband demultiplexer, to any one of input and output ports of the optical waveband demultiplexer, and wherein a combination of wavebands selected from said at least one waveband is outputted from selected ones of the output ports of the optical waveband demultiplexer.

36. The optical waveband selective switch according to claim 35, wherein a part of a plurality of input ports of said optical waveband demultiplexer upon which a plurality of wavelength-division multiplexed light beams are incident is used as at least one input port of the optical waveband selective switch, while another part of said plurality of input ports is used as selected-waveband output ports from which combinations of wavebands selected from the wavebands included in the wavelength-division multiplexed light beams incident upon said part of the plurality of input ports are outputted.

37. The optical waveband selective switch according to claim 36, wherein said optical switch is provided for each of the plurality of output ports of the optical waveband demultiplexer from which the wavebands included in the wavelength-division multiplexed light beams incident upon said at least one input port of the optical waveband selective switch are outputted, and the optical switch is configured to input the wavebands outputted from said plurality of output ports, selectively to a plurality of output ports from which wavebands included in other wavelength-division multiplexed light beams incident upon said selective-waveband output ports are outputted when said other wavelength-division multiplexed light beams are incident upon said selected-waveband output ports.

38. The optical waveband selective switch according to claim 36, wherein said optical switch is provided for each of the plurality of output ports of the optical waveband demultiplexer from which the wavebands included in the wavelength-division multiplexed light beams incident upon said at least one input port of the optical waveband selective switch are outputted, and the optical switch is configured to input the wavebands outputted from said plurality of output ports, selectively to a plurality of output ports from which the same wavebands included in other wavelength-division multiplexed light beams incident upon said selected-waveband output ports are outputted when said other wavelength-division multiplexed light beams are incident upon said selected-waveband output ports.

39. The optical waveband selective switch according to claim 35, wherein said optical switch is provided on a common substrate, integrally with said first array waveguide grating, said second array waveguide grating and optical connecting waveguides connecting the output ports of the first array waveguide grating and the input ports of the second array waveguide grating of said optical waveband demultiplexer.

40. The optical waveband selector switch according to claim 35, wherein said optical switch includes a fundamental optical switch having a pair of arm waveguides one of which receives an incident light beam, a directional coupler formed locally between said pair of arm waveguides, and an optical-path-length-difference changing device operable to change a difference between optical path lengths of the pair of arm waveguides, for outputting the incident light beam incident upon said one of said pair of arm waveguides, from the other of said pair of arm waveguides.

41. An optical waveband multiplexer operable to combine together a plurality of wavebands incident through a plurality of input ports and each including a plurality of optical channels, into a wavelength-division multiplexed light beam consisting of the plurality of wavebands, and to output the wavelength-division multiplexed light beam from output ports, said optical waveband multiplexer comprising:
  a first array waveguide grating through which said plurality of wavebands are transmitted through an array waveguide grating capable of performing demultiplexing and multiplexing functions with a resolution corresponding to wavelengths of said optical channels and having a characteristic of sequentially shifting its output ports by one position with shifting of its input ports by one position, and a characteristic of outputting signals of the plurality of optical channels transmitted through one fiber connected to each of the input ports such that the signals are outputted from the respective different output ports; and
  a second array waveguide grating through which said plurality of wavebands are then transmitted and which is capable of performing demultiplexing and multiplexing functions with a resolution corresponding to the wavelengths of said optical channels, said second array waveguide grating having a characteristic of sequentially shifting its output ports by one position with shifting of its input ports by one position, whereby said plurality of wavebands which are incident upon respective groups of the input ports of said first array waveguide grating and transmitted through the two array waveguide gratings and which include respective groups of optical channels having respective different wavelength positions are combined together into a wavelength-division multiplexed light beam, which is outputted from one of the plurality of output ports of said second array waveguide grating.

42. The optical waveband multiplexer according to claim 41, wherein the optical channels belonging to the wavebands incident upon the plurality of input ports are combined together into a plurality of wavelength-division multiplexed light beams each including a plurality of predetermined wavebands, which are respectively outputted from the respective output ports.

43. The optical waveband multiplexer according to claim 41, further comprising optical connecting waveguides which connect the output ports of the first array waveguide grating and the input ports of the second array waveguide grating.

44. The optical waveband multiplexer according to claim 43, wherein said optical connecting waveguides consist of a plurality of waveguides formed in a plane such that the plurality of waveguides do not intersect each other.

45. The optical waveband multiplexer according to claim 43, wherein each of said first array waveguide grating and said second array waveguide grating is provided with input ports and output ports the number of which is equal to the number of the optical channels included in each of the plurality of wavebands of said wavelength-division multiplexed light beam.

46. The optical waveband multiplexer according to claim 43, wherein at least one of said first array waveguide grating and said second array waveguide grating has a cyclic characteristic of wavelength response such that an output position at which the wavelength-division multiplexed light beam incident upon one of a plurality of input waveguides is output is cyclically shifted by one position with shifting of said one of the plurality of input waveguides by one position.

47. The optical waveband multiplexer according to claim 43, wherein said first array waveguide grating, said second array waveguide grating, and the optical connecting waveguides connecting the output ports of the first array waveguide grating and the input ports of the second array waveguide grating are integrally provided on a common substrate.

48. The optical waveband multiplexer according to claim 47, wherein each of said first array waveguide rating and said second array waveguide grating comprises:
  a plurality of array waveguides having respective different optical path lengths;
  an input lens waveguide for distributing the wavelength-division multiplexed light beam incident upon said input ports, to input-side ends of the plurality of array waveguides, respectively; and
  an output lens waveguide for separating the wavelength-division multiplexed light beam outputted from output-side ends of the plurality of array waveguides, into the plurality of optical channels included in the outputted wavelength-division multiplexed light beam, on the basis of a difference of the optical path lengths of the plurality of array waveguides, and for distributing the plurality of optical channels to the predetermined respective output ports.

49. The optical waveband multiplexer according to claim 41, wherein said first and second array waveguide gratings are constituted by:
  a single array waveguide grating having a plurality of input ports and a plurality of output ports and configured such that said wavelength-division multiplexed light beam incident upon predetermined ones of the input ports is separated into the plurality of wavebands each including the mutually different optical channels which are selected from the plurality of optical channels included in the incident wavelength-division multiplexed light beam, and the separated plurality of wavebands are outputted from predetermined ones of the output ports; and
  return waveguides connecting the other ones of said plurality of output ports to the other ones of said plurality of input ports, for returning a plurality of optical signals of the wavebands separated from said wavelength-division multiplexed light beam incident upon said predetermined ones of the input ports, from said other ones of the output ports back to said other ones of the input ports, whereby one wavelength-division multiplexed light beam or a plurality of different wavelength-division multiplexed light beams incident upon said predetermined ones of the input ports is/are separated into the plurality of wavebands which are included in said incident wavelength-division multiplexed light beam or beams and each of which includes the mutually different optical channels selected from the plurality of optical channels included in the incident wavelength-division multiplexed light beam or beams, the separated wavebands being outputted from the respective different output ports.

50. The optical waveband multiplexer according to claim 41, wherein each of the wavebands outputted from the respective output ports consists of the optical channels which are successively spaced apart from each other along an axis of wavelength.

51. The optical waveband multiplexer according to claim 41, wherein each of the wavebands outputted from the respective output ports consists of the optical channels which are non-successively spaced apart from each other along an axis of wavelength.

52. The optical waveband multiplexer according to claim 41, further comprising an optical switch inserted in each of at least one of the optical connecting waveguides connecting the output ports of the first array waveguide grating and the input ports of the second array waveguide grating, said optical switch being operable to drop an optical signal outputted from the corresponding output port of the first array waveguide grating and to output an added optical signal a wavelength of which is the same as or different from that of the dropped optical signal.

53. An optical waveband multiplexer operable to combine together a plurality of wavebands incident through a plurality of input ports and each including a plurality of optical channels, into a wavelength-division multiplexed light beam consisting of the plurality of wavebands, and to output the wavelength-division multiplexed light beam from output ports, said optical waveband multiplexer comprising:
- a first array waveguide grating through which said plurality of wavebands are transmitted through an array waveguide grating capable of performing demultiplexing and multiplexing functions with a resolution corresponding to wavelengths of said optical channels and having a characteristic of sequentially shifting its output ports by one position with shifting of its input ports by one position, and a characteristic of outputting the signals of the plurality of optical channels transmitted through one fiber connected to each of the input ports such that the plurality of optical channels spaced apart from each other at a spacing determined by cyclic characteristic of wavelength response are not concurrently outputted from the same output ports; and
- a second array waveguide grating through which said plurality of wavebands are then transmitted and which is capable of performing demultiplexing and multiplexing functions with a resolution corresponding to the wavelengths of said optical channels, said second array waveguide grating having a characteristic of sequentially shifting its output ports by one position with shifting of its input ports by one position, whereby said plurality of wavebands which are incident upon respective groups of the input ports of said first array waveguide grating and transmitted through the two array waveguide gratings and which include respective groups of optical channels having respective different wavelength positions are combined together into a wavelength-division multiplexed light beam, which is outputted from one of the plurality of output ports of said second array waveguide grating.

54. The optical waveband multiplexer according to claim 53, wherein the optical channels belonging to the wavebands incident upon the plurality of input ports are combined together into a plurality of wavelength-division multiplexed light beams each including a plurality of predetermined wavebands, which are respectively outputted from the respective output ports.

55. The optical waveband multiplexer according to claim 53, further comprising optical connecting waveguides which connect the output ports of the first array waveguide grating and the input ports of the second array waveguide grating.

56. The optical waveband multiplexer according to claim 55, wherein said optical connecting waveguides consist of a plurality of waveguides formed in a plane such that the plurality of waveguides do not intersect each other.

57. The optical waveband multiplexer according to claim 55, wherein each of said first array waveguide grating and said second array waveguide grating is provided with input ports and output ports the number of which is equal to the number of the optical channels included in each of the plurality of wavebands of said wavelength-division multiplexed light beam.

58. The optical waveband multiplexer according to claim 55, wherein at least one of said first array waveguide grating and said second array waveguide grating has a cyclic characteristic of wavelength response such that an output position at which the wavelength-division multiplexed light beam incident upon one of a plurality of input waveguides is output is cyclically shifted by one position with shifting of said one of the plurality of input waveguides by one position.

59. The optical waveband multiplexer according to claim 55, wherein said first array waveguide grating, said second array waveguide grating, and the optical connecting waveguides connecting the output ports of the first array waveguide grating and the input ports of the second array waveguide grating are integrally provided on a common substrate.

60. The optical waveband multiplexer according to claim 59, wherein each of said first array waveguide rating and said second array waveguide grating comprises:
- a plurality of array waveguides having respective different optical path lengths;
- an input lens waveguide for distributing the wavelength-division multiplexed light beam incident upon said input ports, to input-side ends of the plurality of array waveguides, respectively; and
- an output lens waveguide for separating the wavelength-division multiplexed light beam outputted from output-side ends of the plurality of array waveguides, into the plurality of optical channels included in the outputted wavelength-division multiplexed light beam, on the basis of a difference of the optical path lengths of the plurality of array waveguides, and for distributing the plurality of optical channels to the predetermined respective output ports.

61. The optical waveband multiplexer according to claim 53, wherein said first and second array waveguide gratings are constituted by:
- a single array waveguide grating having a plurality of input ports and a plurality of output ports and configured such that said wavelength-division multiplexed light beam incident upon predetermined ones of the input ports is separated into the plurality of wavebands each including the mutually different optical channels which are selected from the plurality of optical channels included in the incident wavelength-division multiplexed light beam, and the separated plurality of wavebands are outputted from predetermined ones of the output ports; and
- return waveguides connecting the other ones of said plurality of output ports to the other ones of said plurality of input ports, for returning a plurality of optical signals of the wavebands separated from said wavelength-division multiplexed light beam incident upon said predetermined ones of the input ports, from said other ones of the output ports back to said other ones of the input ports, whereby one wavelength-division multiplexed light beam or a plurality of different wavelength-division multiplexed light beams incident upon said predetermined ones of the input ports is/are separated into the plurality of wavebands which are included in said incident wavelength-division multiplexed light beam or beams and each of which includes the mutually different optical channels selected from the plurality of optical channels included in the incident wavelength-division multiplexed light beam or beams, the separated wavebands being outputted from the respective different output ports.

62. The optical waveband multiplexer according to claim 53, wherein each of the wavebands outputted from the respective output ports consists of the optical channels which are successively spaced apart from each other along an axis of wavelength.

63. The optical waveband multiplexer according to claim 53, wherein each of the wavebands outputted from the respective output ports consists of the optical channels which are non-successively spaced apart from each other along an axis of wavelength.

64. The optical waveband multiplexer according to claim 53, further comprising an optical switch inserted in each of at least one of the optical connecting waveguides connecting the output ports of the first array waveguide grating and the input ports of the second array waveguide grating, said optical switch being operable to drop an optical signal outputted from the corresponding output port of the first array waveguide grating and to output an added optical signal a wavelength of which is the same as or different from that of the dropped optical signal.

* * * * *

UNITED STATES PATENT AND TRADEMARK OFFICE
CERTIFICATE OF CORRECTION

| | |
|---|---|
| PATENT NO. | : 8,244,133 B2 |
| APPLICATION NO. | : 12/226453 |
| DATED | : August 14, 2012 |
| INVENTOR(S) | : Ken-ichi Sato et al. |

It is certified that error appears in the above-identified patent and that said Letters Patent is hereby corrected as shown below:

On the Title Page, please amend the first assignee's name as follows:

Item (73), please change "National University Corporation" to "National University Corporation Nagoya University"

Signed and Sealed this
Twenty-fourth Day of December, 2013

Margaret A. Focarino
*Commissioner for Patents of the United States Patent and Trademark Office*